(12) United States Patent
Kohno et al.

(10) Patent No.: US 6,456,443 B2
(45) Date of Patent: *Sep. 24, 2002

(54) ZOOM LENS SYSTEM

(75) Inventors: Tetsuo Kohno, Toyonaka; Genta Yagyu, Sakai, both of (JP)

(73) Assignee: Minolta Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/810,245

(22) Filed: Mar. 19, 2001

Related U.S. Application Data

(62) Division of application No. 09/468,366, filed on Dec. 21, 1999, now Pat. No. 6,229,655.

(30) Foreign Application Priority Data

| Dec. 22, 1998 | (JP) | ............................................. 10-363664 |
| Jan. 12, 1999 | (JP) | ............................................. 11-005056 |

(51) Int. Cl.⁷ ............................. G02B 15/14; G02B 9/12

(52) U.S. Cl. ........................ 359/689; 359/684; 359/784

(58) Field of Search ................................ 359/689, 684, 359/784

(56) References Cited

U.S. PATENT DOCUMENTS

| 5,969,874 | A | | 10/1999 | Moskovich | .................. 359/651 |
| 6,229,655 | B1 | * | 5/2001 | Kohno | ........................ 359/689 |

FOREIGN PATENT DOCUMENTS

| JP | 5-27175 | 2/1993 |
| JP | 6-273670 | 9/1994 |
| JP | 7-261083 | 10/1995 |
| JP | 9-21950 | 1/1997 |
| JP | 10-20194 | 1/1998 |
| JP | 10-48521 | 2/1998 |
| JP | 10-213745 | 8/1998 |
| JP | 10-293253 | 11/1998 |

* cited by examiner

*Primary Examiner*—Georgia Epps
*Assistant Examiner*—Tim Thompson
(74) *Attorney, Agent, or Firm*—Burns, Doane, Swecker & Mathis, LLP

(57) ABSTRACT

A zoom lens system has, from the object side, a first lens unit, a second lens unit and a third lens unit. The first lens unit has a negative optical power as a whole. The second and third lens units have a positive optical power as a whole. In the zoom lens system, zooming is achieved by varying the distance between the first and second lens units, and at least one of the lens elements is a plastic lens element.

20 Claims, 23 Drawing Sheets

FNO=2.96
(W)
—— d
---- SC
-0.1  0.1
SPHERICAL ABERRATION
SINE CONDITION

Y'=3.3
---- DM
—— DS
-0.1  0.1
ASTIGMATISM

Y'=3.3
-5.0  5.0
DISTORTION %

FNO=3.24
(M)
—— d
---- SC
-0.1  0.1
SPHERICAL ABERRATION
SINE CONDITION

Y'=3.3
---- DM
—— DS
-0.1  0.1
ASTIGMATISM

Y'=3.3
-5.0  5.0
DISTORTION %

FNO=3.60
(T)
—— d
---- SC
-0.1  0.1
SPHERICAL ABERRATION
SINE CONDITION

Y'=3.3
---- DM
—— DS
-0.1  0.1
ASTIGMATISM

Y'=3.3
-5.0  5.0
DISTORTION %

FNO=2.96
(W)

—— d
----- SC

-0.1  0.1
SPHERICAL ABERRATION
SINE CONDITION

Y'=3.3

----- DM
—— DS

-0.1  0.1
ASTIGMATISM

Y'=3.3

-5.0  5.0
DISTORTION %

FNO=3.24
(M)

—— d
----- SC

-0.1  0.1
SPHERICAL ABERRATION
SINE CONDITION

Y'=3.3

----- DM
—— DS

-0.1  0.1
ASTIGMATISM

Y'=3.3

-5.0  5.0
DISTORTION %

FNO=3.60
(T)

—— d
----- SC

-0.1  0.1
SPHERICAL ABERRATION
SINE CONDITION

Y'=3.3

----- DM
—— DS

-0.1  0.1
ASTIGMATISM

Y'=3.3

-5.0  5.0
DISTORTION %

FNO=2.96
(W)
—— d
----- SC
-0.1  0.1
SPHERICAL ABERRATION
SINE CONDITION

Y'=3.3
----- DM
—— DS
-0.1  0.1
ASTIGMATISM

Y'=3.3
-5.0  5.0
DISTORTION %

FNO=3.24
(M)
—— d
----- SC
-0.1  0.1
SPHERICAL ABERRATION
SINE CONDITION

Y'=3.3
----- DM
—— DS
-0.1  0.1
ASTIGMATISM

Y'=3.3
-5.0  5.0
DISTORTION %

FNO=3.60
(T)
—— d
----- SC
-0.1  0.1
SPHERICAL ABERRATION
SINE CONDITION

Y'=3.3
----- DM
—— DS
-0.1  0.1
ASTIGMATISM

Y'=3.3
-5.0  5.0
DISTORTION %

FNO=2.90

(W)

—— d
---- SC

-0.1    0.1
SPHERICAL ABERRATION
SINE CONDITION

Y'=3.3

---- DM
—— DS

-0.1    0.1
ASTIGMATISM

Y'=3.3

-5.0    5.0
DISTORTION %

FNO=3.25

(M)

—— d
---- SC

-0.1    0.1
SPHERICAL ABERRATION
SINE CONDITION

Y'=3.3

---- DM
—— DS

-0.1    0.1
ASTIGMATISM

Y'=3.3

-5.0    5.0
DISTORTION %

FNO=3.60

(T)

—— d
---- SC

-0.1    0.1
SPHERICAL ABERRATION
SINE CONDITION

Y'=3.3

---- DM
—— DS

-0.1    0.1
ASTIGMATISM

Y'=3.3

-5.0    5.0
DISTORTION %

FNO=3.18
(W)

Y'=3.3

Y'=3.3

FNO=3.55
(M)

Y'=3.3

Y'=3.3

FNO=4.08
(T)

Y'=3.3

Y'=3.3

FIG. 20A
(W) FNO=2.74

—— d
---- SC

-0.2   0.2
SPHERICAL ABERRATION
SINE CONDITION

-0.2   0.2
ASTIGMATISM

FIG. 20C
Y'=3.3

-5.0   5.0
DISTORTION %

FIG. 20D
(M) FNO=3.11

—— d
---- SC

-0.2   0.2
SPHERICAL ABERRATION
SINE CONDITION

-0.2   0.2
ASTIGMATISM

FIG. 20F
Y'=3.3

-5.0   5.0
DISTORTION %

FIG. 20G
(T) FNO=3.60

—— d
---- SC

-0.2   0.2
SPHERICAL ABERRATION
SINE CONDITION

-0.2   0.2
ASTIGMATISM

FIG. 20I
Y'=3.3

-5.0   5.0
DISTORTION %

FNO=2.73

(W)
— d
----- SC

-0.2  0.2
SPHERICAL ABERRATION
SINE CONDITION

Y'=3.3

----- DM
— DS

-0.2  0.2
ASTIGMATISM

Y'=3.3

-5.0  5.0
DISTORTION %

FNO=3.10

(M)
— d
----- SC

-0.2  0.2
SPHERICAL ABERRATION
SINE CONDITION

Y'=3.3

----- DM
— DS

-0.2  0.2
ASTIGMATISM

Y'=3.3

-5.0  5.0
DISTORTION %

FNO=3.60

(T)
— d
----- SC

-0.2  0.2
SPHERICAL ABERRATION
SINE CONDITION

Y'=3.3

----- DM
— DS

-0.2  0.2
ASTIGMATISM

Y'=3.3

-5.0  5.0
DISTORTION %

FNO=2.75
(W)
—— d
----- SC
SPHERICAL ABERRATION
SINE CONDITION

Y'=3.3
----- DM
—— DS
ASTIGMATISM

Y'=3.3
DISTORTION %

FNO=3.10
(M)
—— d
----- SC
SPHERICAL ABERRATION
SINE CONDITION

Y'=3.3
----- DM
—— DS
ASTIGMATISM

Y'=3.3
DISTORTION %

FNO=3.60
(T)
—— d
----- SC
SPHERICAL ABERRATION
SINE CONDITION

Y'=3.3
----- DM
—— DS
ASTIGMATISM

Y'=3.3
DISTORTION %

FNO=2.73
(W)
—— d
---- SC
-0.2   0.2
SPHERICAL ABERRATION
SINE CONDITION

Y'=3.3
---- DM
—— DS
-0.2   0.2
ASTIGMATISM

Y'=3.3
-5.0   5.0
DISTORTION %

FNO=3.10
(M)
—— d
---- SC
-0.2   0.2
SPHERICAL ABERRATION
SINE CONDITION

Y'=3.3
---- DM
—— DS
-0.2   0.2
ASTIGMATISM

Y'=3.3
-5.0   5.0
DISTORTION %

FNO=3.60
(T)
—— d
---- SC
-0.2   0.2
SPHERICAL ABERRATION
SINE CONDITION

Y'=3.3
---- DM
—— DS
-0.2   0.2
ASTIGMATISM

Y'=3.3
-5.0   5.0
DISTORTION %

FNO=2.75

(W)

—— d
---- SC

-0.2  0.2
SPHERICAL ABERRATION
SINE CONDITION

Y'=3.3

---- DM
—— DS

-0.2  0.2
ASTIGMATISM

Y'=3.3

-5.0  5.0
DISTORTION %

FNO=3.11

(M)

—— d
---- SC

-0.2  0.2
SPHERICAL ABERRATION
SINE CONDITION

Y'=3.3

---- DM
—— DS

-0.2  0.2
ASTIGMATISM

Y'=3.3

-5.0  5.0
DISTORTION %

FNO=3.60

(T)

—— d
---- SC

-0.2  0.2
SPHERICAL ABERRATION
SINE CONDITION

Y'=3.3

---- DM
—— DS

-0.2  0.2
ASTIGMATISM

Y'=3.3

-5.0  5.0
DISTORTION %

FNO=2.97

(W)

—— d
---- SC

−0.2   0.2
SPHERICAL ABERRATION
SINE CONDITION

Y'=3.3

---- DM
—— DS

−0.2   0.2
ASTIGMATISM

Y'=3.3

−5.0   5.0
DISTORTION %

FNO=3.27

(M)

—— d
---- SC

−0.2   0.2
SPHERICAL ABERRATION
SINE CONDITION

Y'=3.3

---- DM
—— DS

−0.2   0.2
ASTIGMATISM

Y'=3.3

−5.0   5.0
DISTORTION %

FNO=3.60

(T)

—— d
---- SC

−0.2   0.2
SPHERICAL ABERRATION
SINE CONDITION

Y'=3.3

---- DM
—— DS

−0.2   0.2
ASTIGMATISM

Y'=3.3

−5.0   5.0
DISTORTION %

FNO=2.55
(W)
—— d
---- SC
-0.2  0.2
SPHERICAL ABERRATION
SINE CONDITION

Y'=3.3
---- DM
—— DS
-0.2  0.2
ASTIGMATISM

Y'=3.3
-5.0  5.0
DISTORTION %

FNO=2.95
(M)
—— d
---- SC
-0.2  0.2
SPHERICAL ABERRATION
SINE CONDITION

Y'=3.3
---- DM
—— DS
-0.2  0.2
ASTIGMATISM

Y'=3.3
-5.0  5.0
DISTORTION %

FNO=3.60
(T)
—— d
---- SC
-0.2  0.2
SPHERICAL ABERRATION
SINE CONDITION

Y'=3.3
---- DM
—— DS
-0.2  0.2
ASTIGMATISM

Y'=3.3
-5.0  5.0
DISTORTION %

FNO=2.34

(W)

−0.2  0.2
SPHERICAL ABERRATION
SINE CONDITION

Y'=3.3

−0.2  0.2
ASTIGMATISM

Y'=3.3

−5.0  5.0
DISTORTION %

FNO=2.84

(M)

−0.2  0.2
SPHERICAL ABERRATION
SINE CONDITION

Y'=3.3

−0.2  0.2
ASTIGMATISM

Y'=3.3

−5.0  5.0
DISTORTION %

FNO=3.60

(T)

−0.2  0.2
SPHERICAL ABERRATION
SINE CONDITION

Y'=3.3

−0.2  0.2
ASTIGMATISM

Y'=3.3

−5.0  5.0
DISTORTION %

FNO=2.08
(W)
— d
----- SC
-0.2　0.2
SPHERICAL ABERRATION
SINE CONDITION

Y'=3.3
----- DM
— DS
-0.2　0.2
ASTIGMATISM

Y'=3.3
-5.0　5.0
DISTORTION %

FNO=2.48
(M)
— d
----- SC
-0.2　0.2
SPHERICAL ABERRATION
SINE CONDITION

Y'=3.3
----- DM
— DS
-0.2　0.2
ASTIGMATISM

Y'=3.3
-5.0　5.0
DISTORTION %

FNO=3.60
(T)
— d
----- SC
-0.2　0.2
SPHERICAL ABERRATION
SINE CONDITION

Y'=3.3
----- DM
— DS
-0.2　0.2
ASTIGMATISM

Y'=3.3
-5.0　5.0
DISTORTION %

FNO=2.57
(W)
— d
---- SC
-0.05  0.05
SPHERICAL ABERRATION
SINE CONDITION

Y'=3.3
---- DM
— DS
-0.05  0.05
ASTIGMATISM

Y'=3.3
-2.0  2.0
DISTORTION %

FNO=3.04
(M)
— d
---- SC
-0.05  0.05
SPHERICAL ABERRATION
SINE CONDITION

Y'=3.3
---- DM
— DS
-0.05  0.05
ASTIGMATISM

Y'=3.3
-2.0  2.0
DISTORTION %

FNO=4.20
(T)
— d
---- SC
-0.05  0.05
SPHERICAL ABERRATION
SINE CONDITION

Y'=3.3
---- DM
— DS
-0.05  0.05
ASTIGMATISM

Y'=3.3
-2.0  2.0
DISTORTION %

ZOOM LENS SYSTEM

This application is a divisional, of application Ser. No. 09/468,366, filed Dec. 21, 1999 now U.S. Pat. No. 6,229,655.

This disclosure is based on applications No. H10-363664 filed in Japan on Dec. 22, 1998 and No. H11-005056 filed in Japan on Jan. 12, 1999, the entire contents of which are hereby incorporated by reference.

BACKGROUND OF THE INVENTION

1. Field of the Invention

The present invention relates to a zoom lens system, and more particularly to a compact and inexpensive zoom lens system particularly suited for use in digital still cameras.

2. Description of the Prior Art

In recent years, as personal computers become more prevalent, digital still cameras that allow easy storage of image data on a recording medium such as a floppy disk have been coming into wider use. This trend has created an increasing demand for more inexpensive digital still cameras. This in turn has created an increasing demand for further cost reduction in imaging optical systems. On the other hand, photoelectric conversion devices have come to have an increasingly large number of pixels year by year, which accordingly demands imaging optical systems that offer higher and higher performance. To comply with such requirements, it is necessary to produce a high-performance imaging optical system at comparatively low cost.

To achieve this objective, for example, Japanese Laid-open Patent Applications Nos. H1-183615 and H9-311273 propose optical systems having a first lens unit of a negative-negative-positive configuration and a second lens unit of a positive-negative-positive configuration. Moreover, the optical systems proposed in Japanese Laid-open Patent Applications Nos. H7-113956, H6-300969, and H7-63991 have a second lens unit including a doublet lens element formed by cementing together negative lens elements; and the optical system proposed in Japanese Laid-open Patent Application No. H5-93858 has a second lens unit including a doublet lens element formed by cementing together, from the object side, a positive lens element and a negative lens element. If a doublet lens element is considered to be a single lens element, it is assumed that those optical systems are each composed of a first lens unit of a negative-negative-positive configuration and a second lens unit of a positive-negative-positive configuration.

Furthermore, Japanese Laid-open Patent Applications Nos. H6-201993 and H1-191820 propose optical systems that are composed of a first lens unit having a negative optical power, a second lens unit having a positive optical power, and a third lens unit having a positive optical power and employ a plastic lens element.

In the optical systems proposed in the above-mentioned patent applications, however, there is still plenty of room for improvement from the viewpoint of miniaturization, high performance, and cost reduction.

SUMMARY OF THE INVENTION

An object of the present invention is to provide a compact, high-resolution, and low-cost zoom lens system suitable, in particular, for use in a digital still camera by arranging plastic lens elements effectively in a two-unit zoom lens system of a negative-positive configuration.

To achieve the above object, according to one aspect of the present invention, a zoom lens system includes, from the object side, a first lens unit and a second lens unit. The first lens unit is composed of a negative, a negative, and a positive lens element and has a negative optical power as a whole. The second lens unit is composed of a positive, a negative, and a positive lens element and has a positive optical power as a whole. In the zoom lens system, zooming is achieved by varying the distance between the first and second lens units, and at least one of those lens elements is a plastic lens element.

According to another aspect of the present invention, a zoom lens system includes, from the object side, a first lens unit having a negative optical power and a second lens unit having a positive optical power. In the zoom lens system, zooming is achieved by varying the distance between the first and second lens units, and at least a negative lens element and a positive lens element of the lens elements included in the lens units are plastic lens elements that fulfill the following condition:

$$-1.2 < \phi Pi/\phi W \times hi < 1.2$$

where $\phi W$ represents the optical power of the entire zoom lens system at the wide-angle end;

$\phi Pi$ represents the optical power of the ith plastic lens element; and $hi$ represents the height of incidence at which a paraxial ray enters the object-side surface of the ith plastic lens element at the telephoto end, assuming that the initial values of the converted inclination $\alpha 1$ and the height $h1$, for paraxial tracing, are 0 and 1, respectively.

According to another aspect of the present invention, an image taking apparatus is composed of a zoom lens system, a photoelectric conversion device, and an optical low-pass filter. The photoelectric conversion device has a light sensing surface on which an image is formed by the zoom lens system. The optical low-pass filter is disposed on the object side of the photoelectric conversion device. The zoom lens system is composed of, from the object side, a first lens unit and a second lens unit. The first lens unit is composed of a negative, a negative, and a positive lens element, and has a negative optical power as a whole. The second lens unit is composed of a positive, a negative, and a positive lens element, and has a positive optical power as a whole. In the zoom lens system, zooming is achieved by varying the distance between the first and second lens units, and at least one of those lens elements is a plastic lens element.

According to another aspect of the present invention, a zoom lens system is composed of, from the object side, a first lens unit, a second lens unit, and a third lens unit. The first lens unit has a negative optical power. The second lens unit is composed of at least a positive and a negative lens element, and has a positive optical power. The third lens unit has a positive optical power. In the zoom lens system, zooming is achieved by moving at least two lens units so as to vary the distance between the first and second lens units and the distance between the second and third lens units, and at least one of the lens elements included in the lens units is a plastic lens element that fulfills the following conditions:

$$-0.8 < Cp \times (N'-N)/\phi W < 0.8$$

$$-0.45 < M3/M2 < 0.90 \text{(where } \phi T/\phi W > 1.6\text{)}$$

where

Cp represents the curvature of the plastic lens element;

$\phi W$ represents the optical power of the entire zoom lens system at the wide-angle end;

N' represents the refractive index of the object-side medium of the aspherical surface for the d line;

N represents the refractive index of the image-side medium of the aspherical surface for the d line;

M3 represents the amount of movement of the third lens unit (the direction pointing to the object side is negative with respect to the wide-angle end);

M2 represents the amount of movement of the second lens unit (the direction pointing to the object side is negative with respect to the wide-angle end); and φT represents the optical power of the entire zoom lens system at the telephoto end.

According to another aspect of the present invention, a zoom lens system is composed of, from the object side, a first lens unit, a second lens unit, and a third lens unit. The first lens unit is composed of at least a positive and a negative lens element, and has a negative optical power. The second and third lens units have a positive optical power. In the zoom lens system, zooming is achieved by moving at least two lens units so as to vary the distance between the first and second lens units and the distance between the second and third lens units, and at least one of the lens elements included in the first lens unit is a plastic lens element that fulfills the following conditions:

$$|\phi P/\phi 1|<1.20$$

$$0.20<|\phi 1/\phi W|<0.70$$

$$-0.45<M3/M2<0.90 \text{(where } \phi T/\phi W>1.6\text{)}$$

where

φP represents the optical power of the plastic lens element;

φ1 represents the optical power of the first lens unit;

φW represents the optical power of the entire zoom lens system at the wide-angle end;

M3 represents the amount of movement of the third lens unit (the direction pointing to the object side is negative with respect to the wide-angle end);

M2 represents the amount of movement of the second lens unit (the direction pointing to the object side is negative with respect to the wide-angle end); and φT represents the optical power of the entire zoom lens system at the telephoto end.

According to another aspect of the present invention, a zoom lens system is composed of, from the object side, a first lens unit, a second lens unit, and a third lens unit. The first lens unit has a negative optical power. The second lens unit is composed of at least a positive and a negative lens element, and has a positive optical power. The third lens unit has a positive optical power. In the zoom lens system, zooming is achieved by varying the distance between the first and second lens units and the distance between the second and third lens units, and at least one of the lens elements included in the second lens unit is a plastic lens element that fulfills the following conditions:

$$|\phi P/\phi 2|<2.5$$

$$0.25<\phi 2/\phi W<0.75$$

where

φP represents the optical power of the plastic lens element;

φ2 represents the optical power of the second lens unit; and

φW represents the optical power of the entire zoom lens system at the wide-angle end.

According to another aspect of the present invention, a zoom lens system is composed of, from the object side, a first lens unit, a second lens unit, and a third lens unit. The first lens unit has a negative optical power. The second and third lens units have a positive optical power. In the zoom lens system, zooming is achieved by moving at least two lens units so as to vary the distance between the first and second lens units and the distance between the second and third lens units, and at least one of the lens elements included in the third lens unit is a plastic lens element that fulfills the following conditions:

$$-0.30<M3/M2<0.90$$

$$|\phi P/\phi 3|<1.70$$

$$0.1<\phi 3/\phi W<0.60$$

where

M3 represents the amount of movement of the third lens unit (the direction pointing to the object side is negative with respect to the wide-angle end);

M2 represents the amount of movement of the second lens unit (the direction pointing to the object side is negative with respect to the wide-angle end);

φP represents the optical power of the plastic lens element;

φ3 represents the optical power of the third lens unit; and

φW represents the optical power of the entire zoom lens system at the wide-angle end.

According to another aspect of the present invention, a zoom lens system is composed of, from the object side, a first lens unit, a second lens unit, and a third lens unit. The first lens unit has a negative optical power. The second and third lens units have a positive optical power. In the zoom lens system, zooming is achieved by moving at least two lens units so as to vary the distance between the first and second lens units and the distance between the second and third lens units, and at least one of the lens elements included in the first lens unit and at least one of the lens elements included in the second lens unit are plastic lens elements that fulfill the following conditions:

$$-1.4<\phi Pi/\phi W \times hi<1.4$$

$$0.5<\log(\beta 2T/\beta 2W)/\log Z<2.2$$

where

φPi represents the optical power of the ith plastic lens element;

φW represents the optical power of the entire zoom lens system at the wide-angle end;

hi represents the height of incidence at which a paraxial ray enters the object-side surface of the ith plastic lens element at the telephoto end, assuming that the initial values of the converted inclination α1 and the height h1, for paraxial tracing, are 0 and 1, respectively;

β2W represents the lateral magnification of the second lens unit at the wide-angle end;

β2T represents the lateral magnification of the second lens unit at the telephoto end;

Z represents the zoom ratio; and log represents a natural logarithm (since the condition defines a proportion, the base does not matter).

According to another aspect of the present invention, a zoom lens system is composed of, from the object side, a first lens unit, a second lens unit, and a third lens unit. The first lens unit has a negative optical power. The second lens unit is composed of at least a positive and a negative lens element, and has a positive optical power. The third lens unit has a positive optical power. In the zoom lens system, zooming is achieved by moving at least two lens units so as to vary the distance between the first and second lens units and the distance between the second and third lens units, and at least one of the lens elements included in the first lens unit and at least one of the lens elements included in the third lens unit are plastic lens elements that fulfill the following conditions:

$$-1.4 < \phi Pi/\phi W \times hi < 1.4$$

$$-1.2 < \log(\beta 3T/\beta 3W)/\log Z < 0.5$$

where $\phi Pi$ represents the optical power of the ith plastic lens element;

$\phi W$ represents the optical power of the entire zoom lens system at the wide-angle end;

hi represents the height of incidence at which a paraxial ray enters the object-side surface of the ith plastic lens element at the telephoto end, assuming that the initial values of the converted inclination a 1 and the height h1, for paraxial tracing, are 0 and 1, respectively;

$\beta 3W$ represents the lateral magnification of the third lens unit at the wide-angle end;

$\beta 3T$ represents the lateral magnification of the third lens unit at the telephoto end;

Z represents the zoom ratio; and log represents a natural logarithm (since the condition defines a proportion, the base does not matter).

According to still another aspect of the present invention, a zoom lens system is composed of, from the object side, a first lens unit, a second lens unit, and a third lens unit. The first lens unit has a negative optical power. The second lens unit is composed of at least a positive and a negative lens element, and has a positive optical power. The third lens unit has a positive optical power. In the zoom lens system, zooming is achieved by moving at least two lens units so as to vary the distance between the first and second lens units and the distance between the second and third lens units, and at least one of the lens elements included in the second lens unit and at least one of the lens elements included in the third lens unit are plastic lens elements that fulfill the following conditions:

$$-1.4 < \phi Pi/\phi W \times hi < 1.4$$

$$-0.75 < \log(\beta 3T/\beta 3W)/\log(\beta 2T/\beta 2W) < 0.65$$

where $\phi Pi$ represents the optical power of the ith plastic lens element;

$\phi W$ represents the optical power of the entire zoom lens system at the wide-angle end;

hi represents the height of incidence at which a paraxial ray enters the object-side surface of the ith plastic lens element at the telephoto end, assuming that the initial values of the converted inclination $\alpha 1$ and the height h1, for paraxial tracing, are 0 and 1, respectively;

$\beta 2W$ represents the lateral magnification of the second lens unit at the wide-angle end;

$\beta 2T$ represents the lateral magnification of the second lens unit at the telephoto end;

$\beta 3W$ represents the lateral magnification of the third lens unit at the wide-angle end;

$\beta 3T$ represents the lateral magnification of the third lens unit at the telephoto end; and log represents a natural logarithm (since the condition defines a proportion, the base does not matter).

BRIEF DESCRIPTION OF THE DRAWINGS

The objects and features of this invention will become clear from the following description, taken in conjunction with the preferred embodiments with reference to the accompanied drawings in which:

FIGS. 20A to 20I are graphic representations of the aberrations observed in an infinite-distance shooting condition in the zoom lens system of Example 6;

DESCRIPTION OF THE PREFERRED EMBODIMENTS

Embodiments 1 to 5

Hereinafter, zoom lens systems embodying the present invention will be described with reference to the drawings. FIGS. 1 to 5 are lens arrangement diagrams of the zoom lens systems of a first, a second, a third, a fourth, and a fifth embodiment, respectively. In each diagram, the left-hand side corresponds to the object side, and the right-hand side corresponds to the image side. Note that, in each diagram, arrows schematically indicate the movement of the lens units during zooming from the wide-angle end to the telephoto end. Moreover, each diagram shows the lens arrangement of the zoom lens system during zooming, as observed at the wide-angle end. As shown in these diagrams, the zoom lens systems of the embodiments are each built as a two-unit zoom lens system of a negative-positive configuration that is composed of, from the object side, a first lens unit Gr1 and a second lens unit Gr2. Both the first and second lens units (Gr1 and Gr2) are movably disposed in the zoom lens system.

Figure 31:
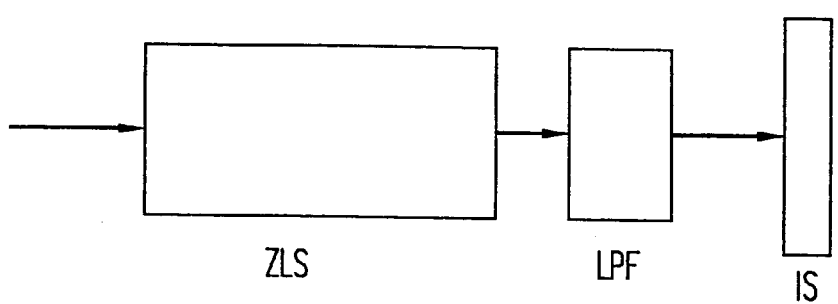
FIG. 31 is a schematic illustration of the optical components of a digital camera.
Figure 30A:
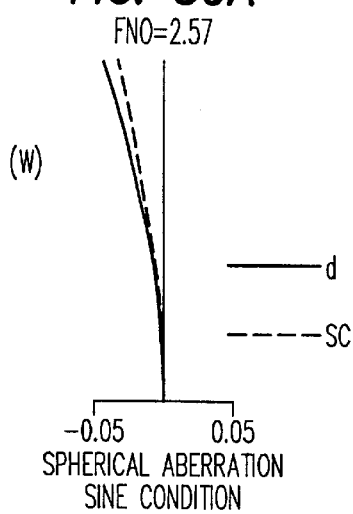
FIGS. 30A to 30I are graphic representations of the aberrations observed in an infinite-distance shooting condition in the zoom lens system of Example 15.
Figure 30B:
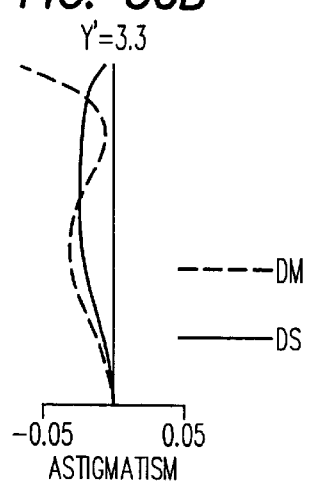
Figure 30C:
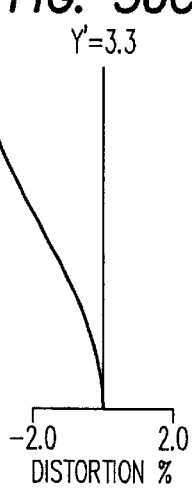
Figure 30D:
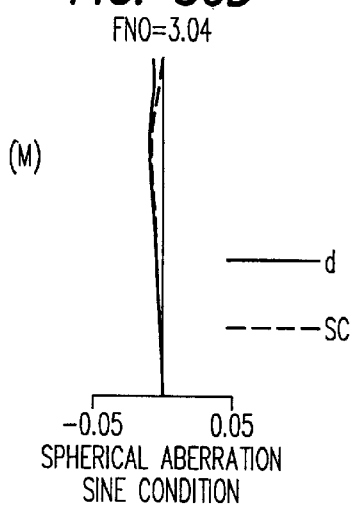
Figure 30E:
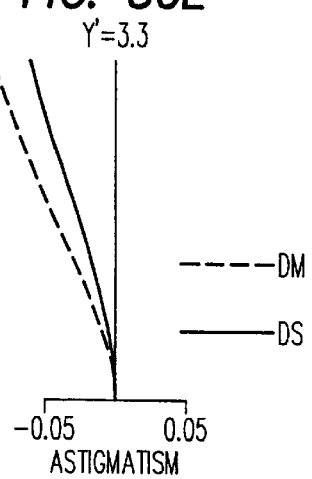
Figure 30F:
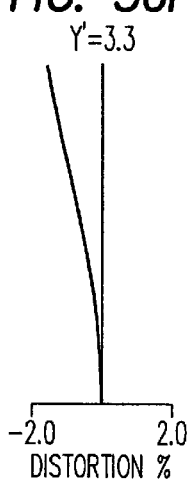
Figure 30G:
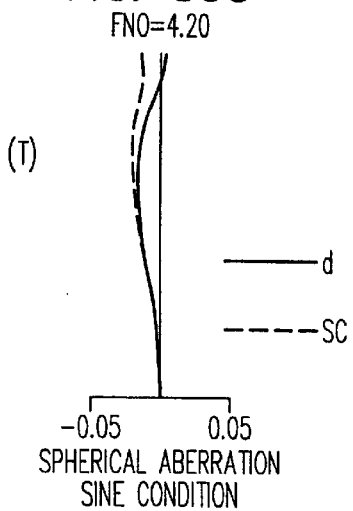
Figure 30H:
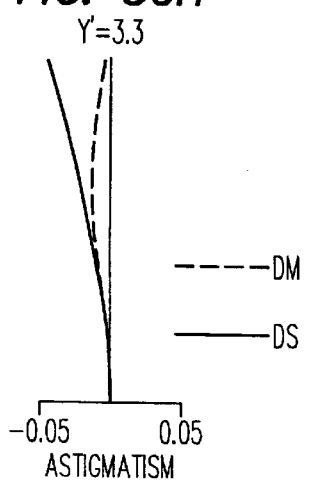
Figure 30I:
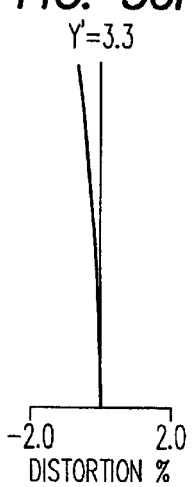

The first lens unit Gr1 is composed of, from the object side, a negative lens element, a negative lens element, and a positive lens element and has a negative optical power as a whole. The second lens unit Gr2 is composed of an aperture stop S, a positive lens element, a negative lens element, and a positive lens element and has a positive optical power as a whole. In the zoom lens system, the first to sixth lens elements counted from the object side are represented as G1 to G6, respectively. Note that a flat plate disposed at the image-side end of the zoom lens system is a low-pass filter LPF. As illustrated in FIG. 31, within a digital camera the low-pass filter LPP is disposed between the zoom lens system ZLS and a photoelectric image sensor is having a light-sensing surface on which an image is formed by the zoom lens system.

Figure 1:
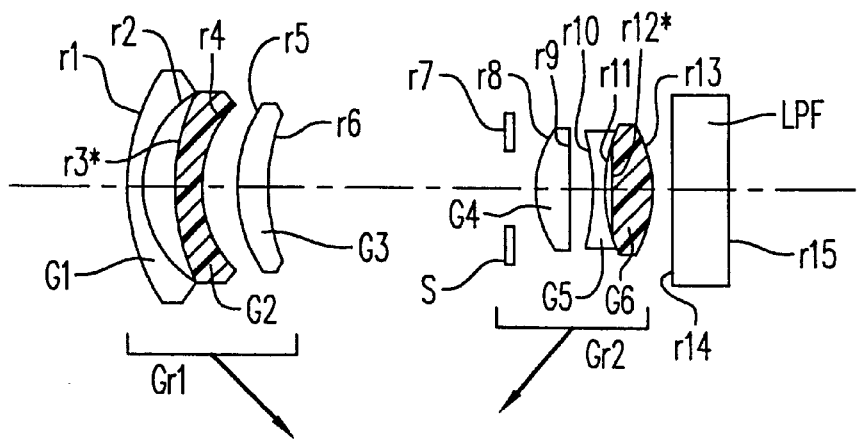
FIG. 1 is a lens arrangement diagram of the zoom lens system of a first embodiment (Example 1) of the present invention.
Figure 2:
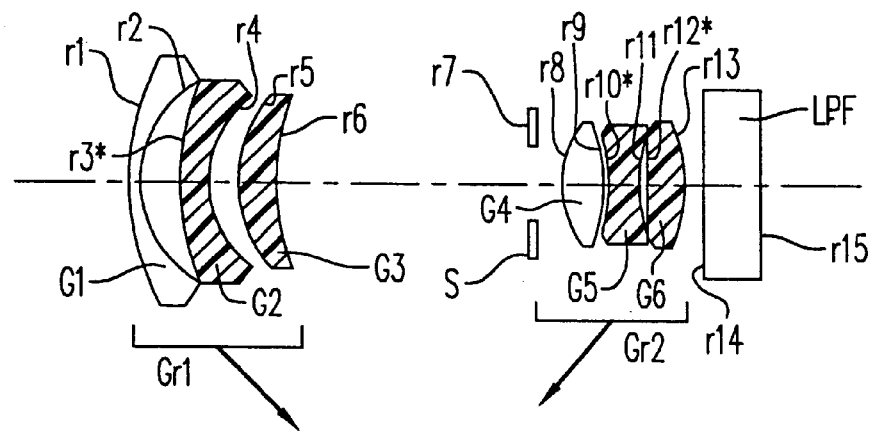
FIG. 2 is a lens arrangement diagram of the zoom lens system of a second embodiment (Example 2) of the present invention.

As shown in FIG. 1, in the first embodiment, the second and sixth lens elements (G2 and G6) counted from the object side (hatched in the figure) are plastic lens elements. As shown in FIG. 2, in the second embodiment, the second, third, fifth, and sixth lens elements (G2, G3, G5, and G6) counted from the object side (hatched in the figure) are plastic lens elements.

Figure 3:
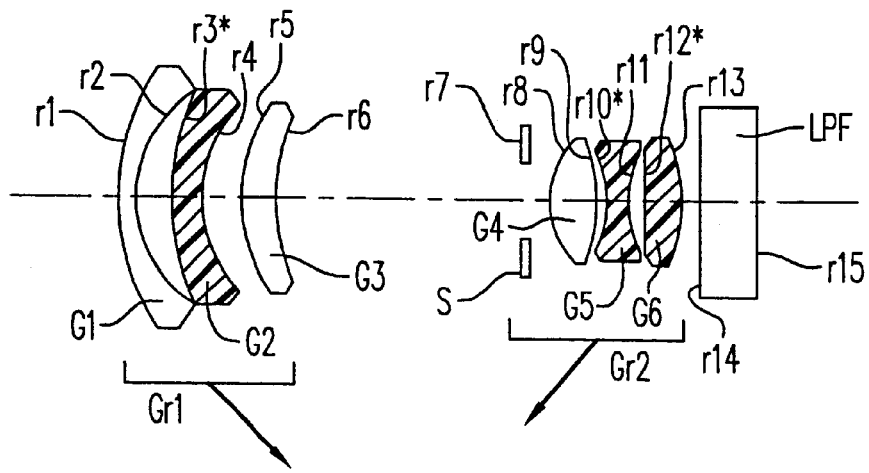
FIG. 3 is a lens arrangement diagram of the zoom lens system of a third embodiment (Example 3) of the present invention.
Figure 4:
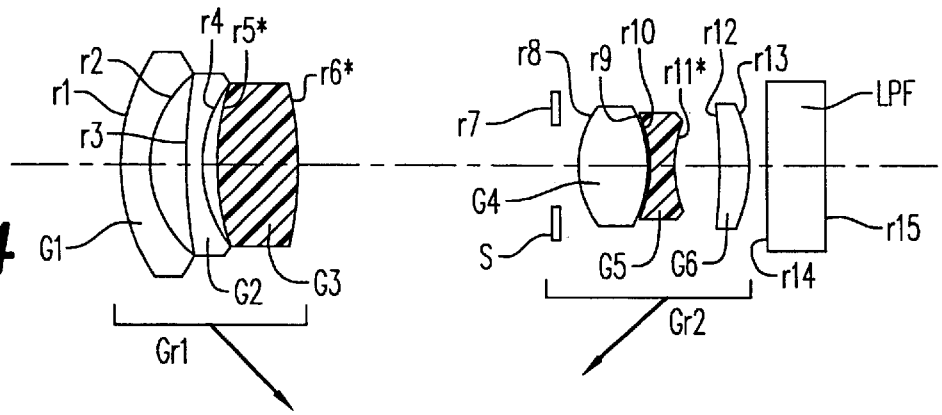
FIG. 4 is a lens arrangement diagram of the zoom lens system of a fourth embodiment (Example 4) of the present invention.
Figure 5:
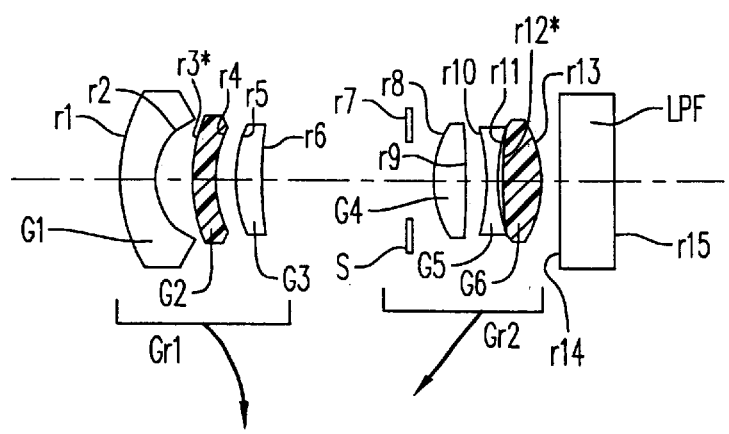
FIG. 5 is a lens arrangement diagram of the zoom lens system of a fifth embodiment (Example 5) of the present invention.
Figure 6A:
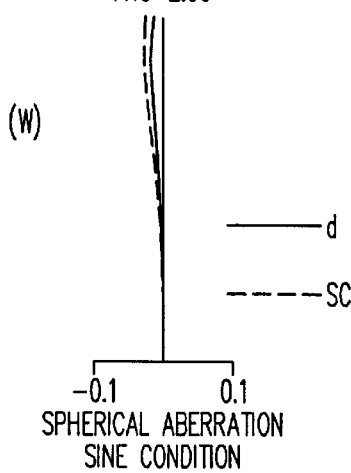
FIGS. 6A to 6I are graphic representations of the aberrations observed in an infinite-distance shooting condition in the zoom lens system of Example 1.
Figure 6B:
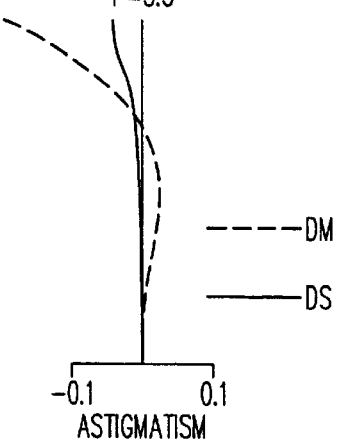
Figure 6C:
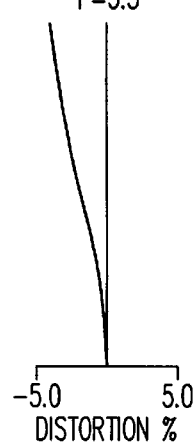
Figure 6D:
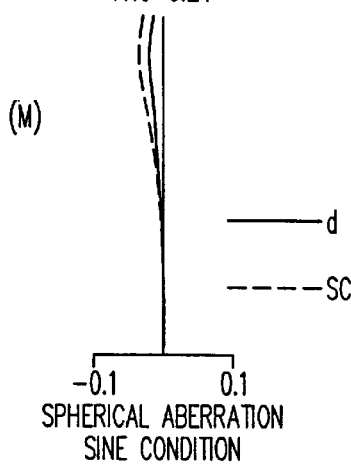
Figure 6E:
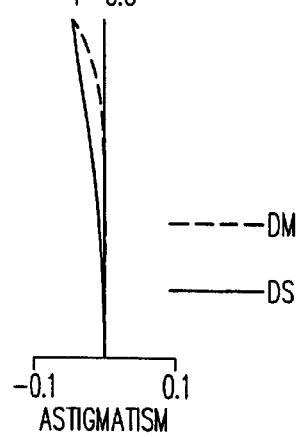
Figure 6F:
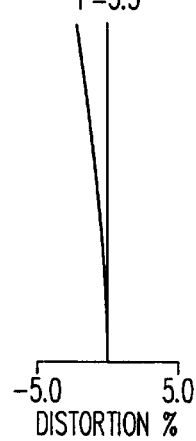
Figure 6G:
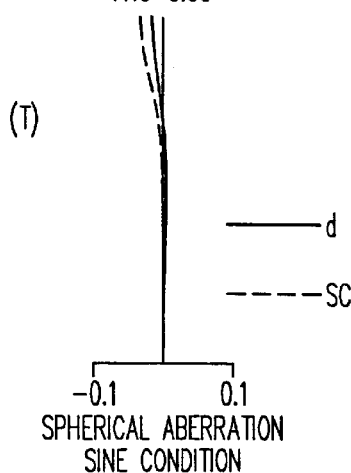
Figure 6H:
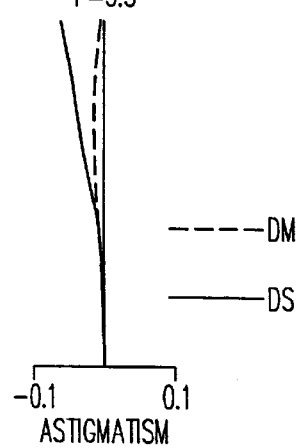
Figure 6I:
Figure 7A:
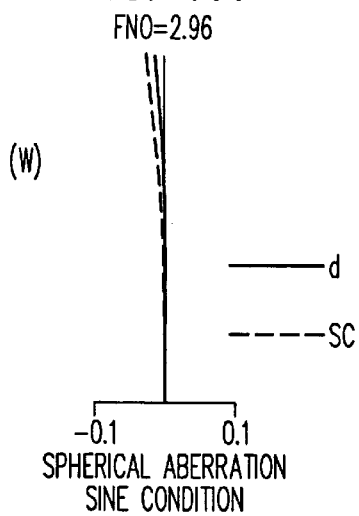
FIGS. 7A to 7I are graphic representations of the aberrations observed in an infinite-distance shooting condition in the zoom lens system of Example 2.
Figure 7B:
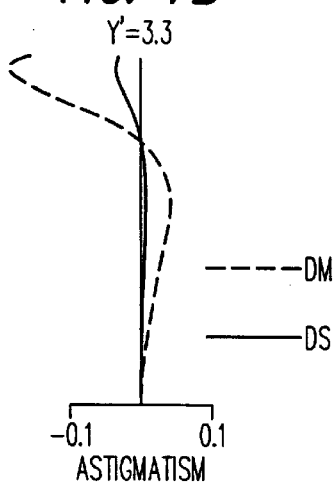
Figure 7C:
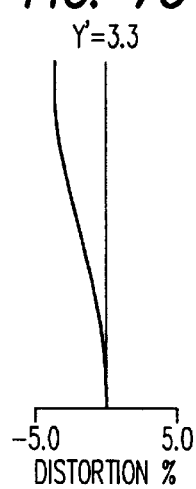
Figure 7D:
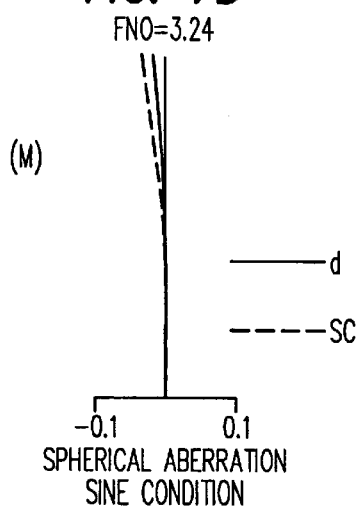
Figure 7E:
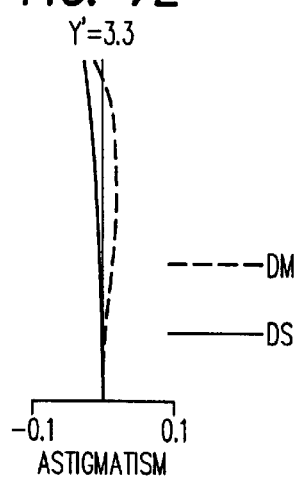
Figure 7F:
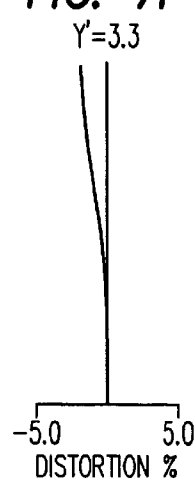
Figure 7G:
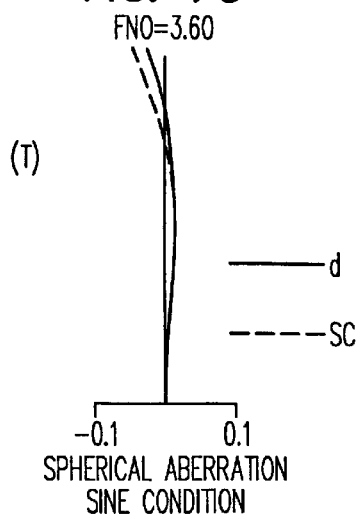
Figure 7H:
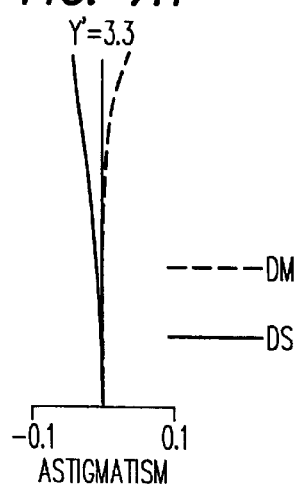
Figure 7I:
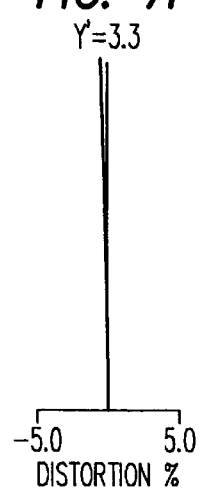
Figure 8A:
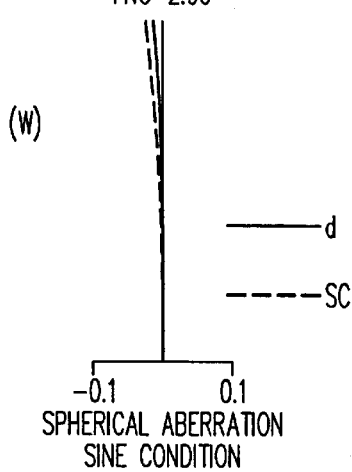
FIGS. 8A to 8I are graphic representations of the aberrations observed in an infinite-distance shooting condition in the zoom lens system of Example 3.
Figure 8B:
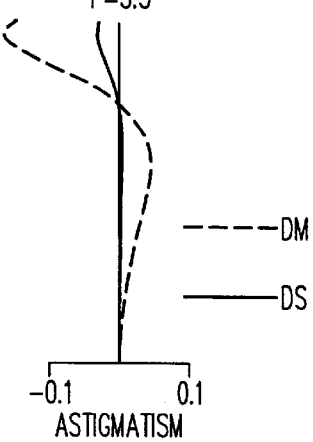
Figure 8C:
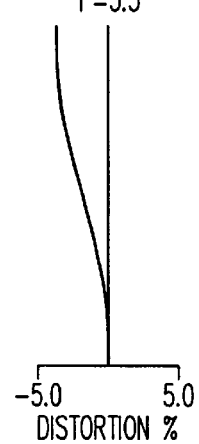
Figure 8D:
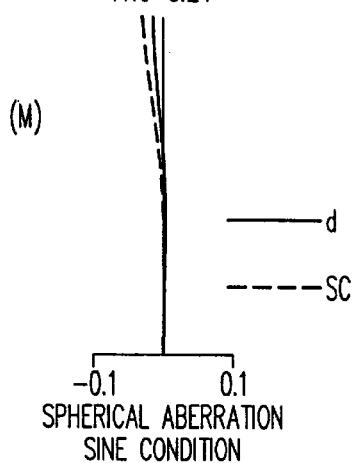
Figure 8E:
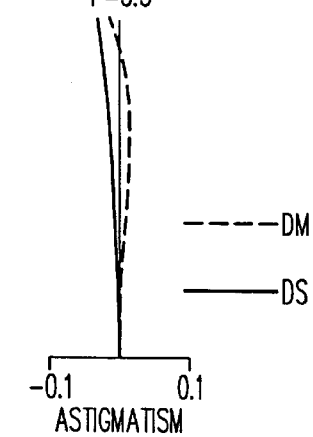
Figure 8F:
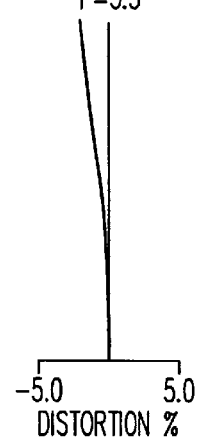
Figure 8G:
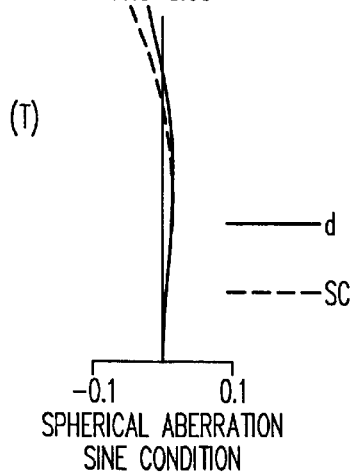
Figure 8H:
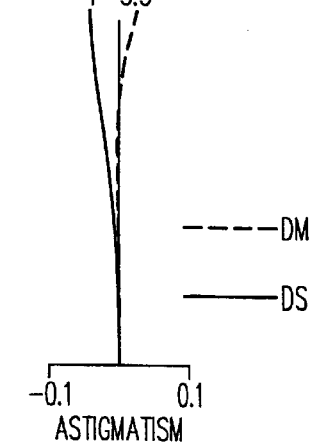
Figure 8I:
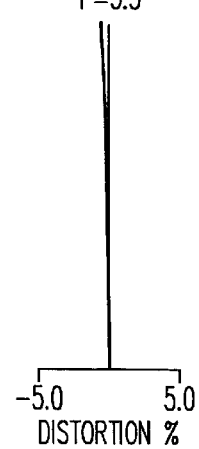
Figure 9A:
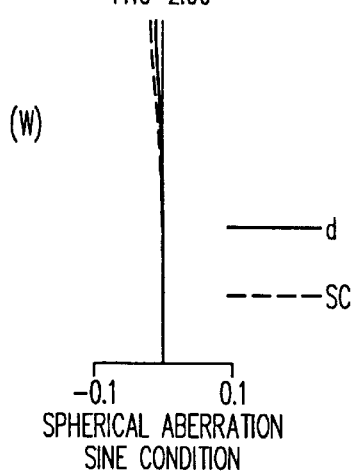
FIGS. 9A to 9I are graphic representations of the aberrations observed in an infinite-distance shooting condition in the zoom lens system of Example 4.
Figure 9B:
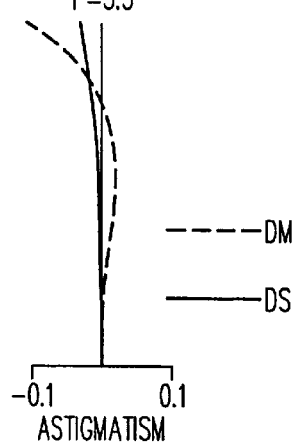
Figure 9C:
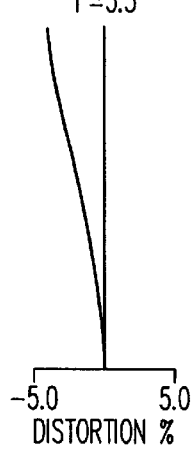
Figure 9D:
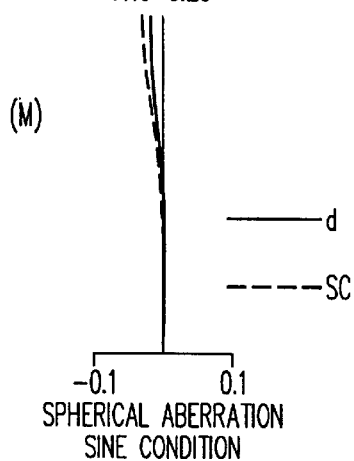
Figure 9E:
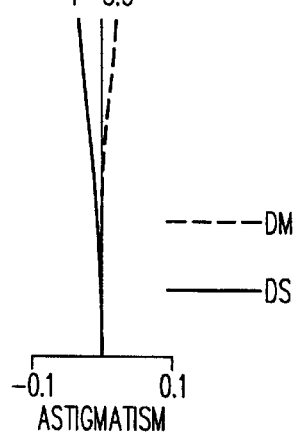
Figure 9F:
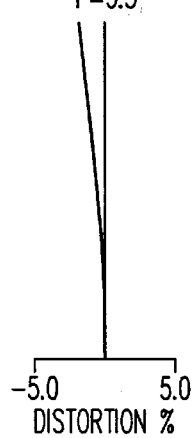
Figure 9G:
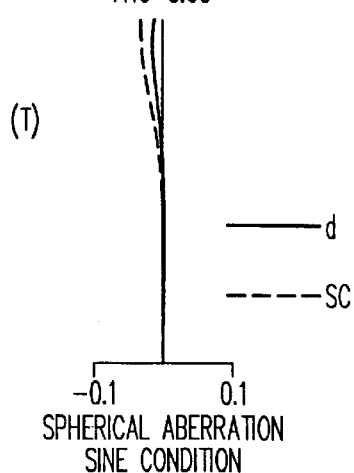
Figure 9H:
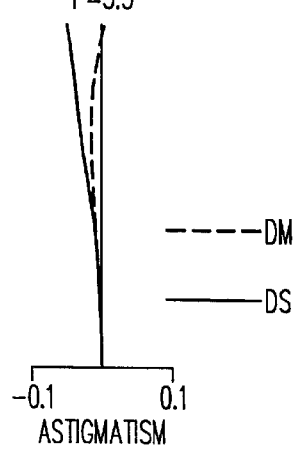
Figure 9I:
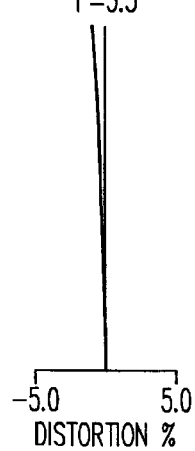
Figure 10A:
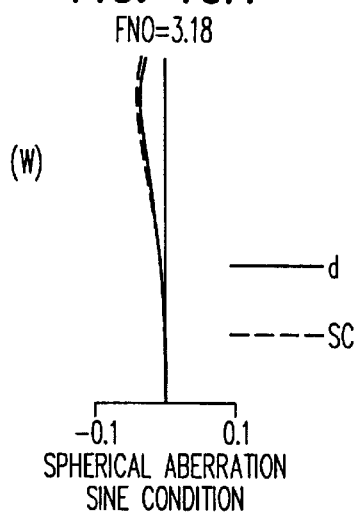
FIGS. 10A to 10I are graphic representations of the aberrations observed in an infinite-distance shooting condition in the zoom lens system of Example 5.
Figure 10B:
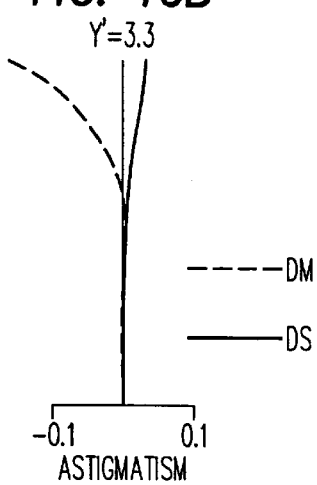
Figure 10C:
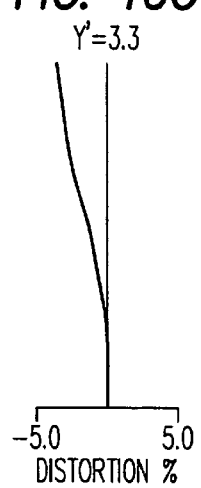
Figure 10D:
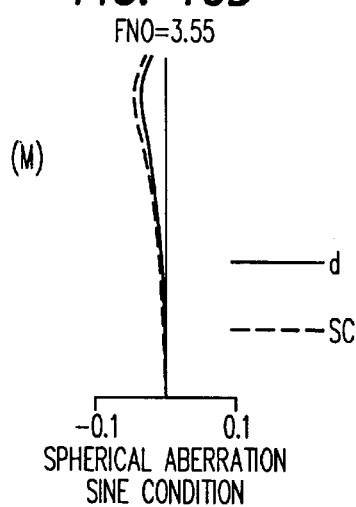
Figure 10E:
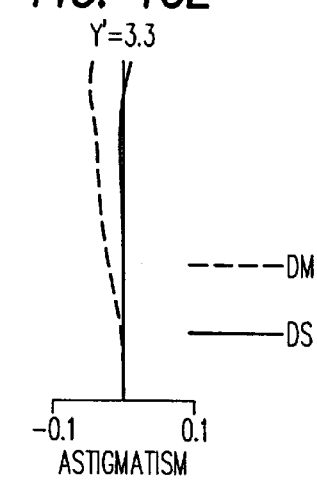
Figure 10F:
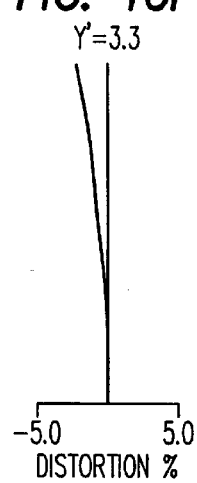
Figure 10G:
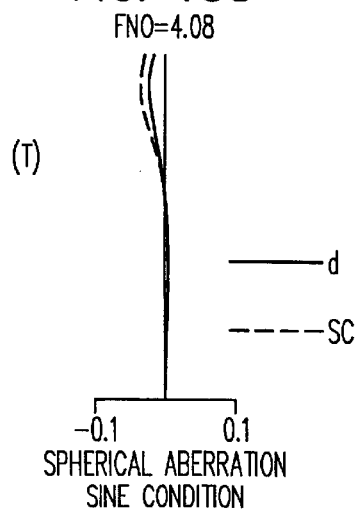
Figure 10H:
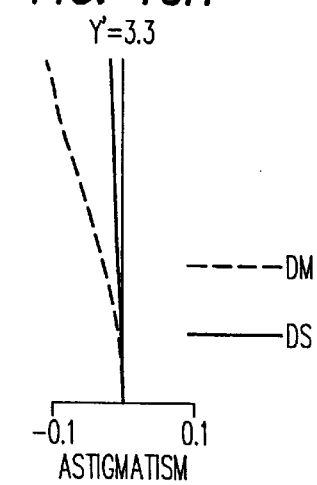
Figure 10I:
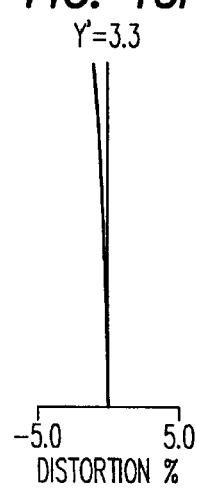

Moreover, as shown in FIG. 3, in the third embodiment, the second, fifth, and sixth lens elements (G2, G5, and G6) counted from the object side (hatched in the figure) are plastic lens elements. As shown in FIG. 4, in the fourth embodiment, the third and fifth lens elements (G3 and G5) counted from the object side (hatched in the figure) are plastic lens elements. Lastly, as shown in FIG. 5, in the fifth embodiment, the second and sixth lens elements (G2 and G6) counted from the object side (hatched in the figure) are plastic lens elements.

The conditions to be preferably fulfilled by an optical system will be described below. It is preferable that the zoom lens systems of the embodiments fulfill Condition (1) below.

$$0.25 < |\phi 1/\phi W 51| < 0.80 \quad (1)$$

where $\phi 1$ represents the optical power of the first lens unit; and $\phi W$ represents the optical power of the entire zoom lens system at the wide-angle end.

Condition (1) defines, in the form of the optical power of the first lens unit, the condition to be fulfilled to achieve proper correction of aberrations and keep the size of the zoom lens system appropriate. If the value of Condition (1) is equal to or less than its lower limit, the optical power of the first lens unit is so weak that aberrations can be corrected properly, but simultaneously the total length, as well as the diameter of the front-end lens unit, of the zoom lens system becomes unduly large. In contrast, if the value of Condition (1) is equal to or greater than its upper limit, the optical power of the first lens unit is so strong that the total length of the zoom lens system is successfully minimized, but simultaneously the inclination of the image plane toward the over side becomes unduly large. In addition, barrel-shaped distortion becomes unduly large at the wide-angle end.

It is preferable that the zoom lens systems of the embodiments fulfill Condition (2) below.

$$0.35 < \phi 2/\phi W < 0.75 \quad (2)$$

where $\phi 2$ represents the optical power of the second lens unit.

Condition (2) defines, in the form of the optical power of the second lens unit, the condition to be fulfilled to achieve, as in Condition (1), proper correction of aberrations and keep the size of the zoom lens system appropriate. If the value of Condition (2) is equal to or less than its lower limit, the optical power of the second lens unit is so weak that aberrations can be corrected properly, but simultaneously the total length, as well as the diameter of the front-end lens unit, of the zoom lens system becomes unduly large. In contrast, if the value of Condition (2) is equal to or greater than its upper limit, the optical power of the second lens unit is so strong that the total length of the zoom lens system is successfully minimized, but simultaneously spherical aberration appears notably on the under side.

It is preferable that the zoom lens systems of the embodiments fulfill Condition (3) below.

$$-1.2 < \phi Pi/\phi W \times hi < 1.2 \quad (3)$$

where $\phi Pi$ represents the optical power of the ith plastic lens element; and hi represents the height of incidence at which a paraxial ray enters the object-side surface of the ith plastic lens element at the telephoto end, assuming that the initial values of the converted inclination α1 and the height h1, for paraxial tracing, are 0 and 1, respectively.

Condition (3) defines, in the form of the sum of the degrees in which the individual plastic lens elements, by their temperature variation, affect the back focal distance, the condition to be fulfilled to suppress variation in the back focal distance resulting from temperature variation. When a plurality of plastic lens elements are used, it is preferable that positively-powered and negatively-powered lens elements be combined in such a way that the degree in which they affect the back focal distance are canceled out by one another. If the value of Condition (3) is equal to or less than its lower limit, the variation in the back focal distance caused by temperature variation in the negatively-powered plastic lens element becomes unduly great. In contrast, if the value of Condition (3) is equal to or greater than its upper limit, the variation in the back focal distance caused by temperature variation in the positively-powered plastic lens element becomes unduly great. Thus, in either case, the zoom lens system needs to be provided with a mechanism that corrects the back focal distance in accordance with temperature variation.

It is preferable that the zoom lens systems of the embodiments fulfill Condition (4) below.

$$|\phi P/\phi 1| < 1.35 \quad (4)$$

where $\phi P$ represents the optical power of the plastic lens element.

Condition (4) defines, in the form of the optical power of the plastic lens element included in the first lens unit, the condition to be fulfilled to keep the variation of aberrations resulting from temperature variation within an appropriate range. If the value of Condition (4) is equal to or greater than its upper limit curvature of field, in particular, the curvature of field on the wide-angle side varies too greatly with temperature.

It is preferable that the zoom lens systems of the embodiments fulfill Condition (5) below.

$$|\phi P/\phi 2| < 2.15 \quad (5)$$

Condition (5) defines, in the form of the optical power of the plastic lens element included in the second lens unit, the condition to be fulfilled to keep, as in Condition (4), the variation of aberrations resulting from temperature variation within an appropriate range. If the value of Condition (5) is equal to or greater than its upper limit, spherical aberration, in particular, the spherical aberration on the telephoto side, varies too greatly with temperature.

No lower limit is given for Conditions (4) and (5). This is because, as the value of either of the conditions decreases, the optical power of the plastic lens element becomes weaker, and this is desirable in terms of suppression of the variation of aberrations resulting from temperature variation. This, however, has no effect on correction of aberrations under normal temperature, and accordingly makes the use of plastic lenses meaningless. To avoid this, where the plastic lens element fulfills Condition (6) below, it is essential to use an aspherical surface.

$$0 \leq |\phi P/\phi A| < 0.45 \quad (6)$$

where $\phi A$ represents the optical power of the lens unit including the plastic lens element.

Note however that this is not to discourage providing an aspherical surface on the lens surface of a plastic lens element having an optical power that makes the value of Condition (6) equal to or greater than its upper limit.

As described above, if an aspherical surface is used, it is preferable that the following conditions be fulfilled. First, where an aspherical surface is used in the first lens unit, it is preferable that Condition (7) below be fulfilled.

$$-0.85 < (|X|-|X_0|)/\{C_0(N'-N)f1\} < -0.05 \quad (7)$$

where $C_0$ represents the curvature of the reference spherical surface of the aspherical surface;

N represents the refractive index of the image-side medium of the aspherical surface for the d line;

N' represents the refractive index of the object-side medium of the aspherical surface for the d line;

X represents the deviation of the aspherical surface along the optical axis at the height in a direction perpendicular to the optical axis (the direction pointing to the object side is negative);

$X_0$ represents the deviation of the reference spherical surface of the aspherical surface along the optical axis at the height in a direction perpendicular to the optical axis (the direction pointing to the object side is negative); and f1 represents the focal length of the first lens unit.

Condition (7) defines the surface shape of the aspherical surface and assumes that the aspherical surface is so shaped as to weaken the optical power of the first lens unit. Fulfillment of Condition (7) makes it possible to achieve proper correction of the distortion and the image plane on the wide-angle side, in particular. If the value of Condition (7) is equal to or less than its lower limit, positive distortion becomes unduly large on the wide-angle side, in particular, in a close-shooting condition, and simultaneously the inclination of the image plane toward the over side becomes unduly large. In contrast, if the value of Condition (7) is equal to or greater than its upper limit, negative distortion becomes unduly large on the wide-angle side, in particular, in a close-shooting condition, and simultaneously the inclination of the image plane toward the under side becomes unduly large. Note that, in a case where the first lens unit includes a plurality of aspherical surfaces, at least one of those aspherical surfaces needs to fulfill Condition (7) above; that is, the other aspherical surfaces do not necessarily have to fulfill Condition (7) above, if that is advantageous for the correction of other aberrations.

In a case where an aspherical surface is used in the second lens unit, it is preferable that Condition (8) below be fulfilled.

$$-0.95<(|X|-|X_0|)/\{C_0(N'-N)f2\}<-0.05 \tag{8}$$

where f2 represents the focal length of the second lens unit.

Condition (8) defines the surface shape of the aspherical surface and assumes that the aspherical surface is so shaped as to weaken the optical power of the second lens unit. Fulfillment of Condition (8) makes it possible to achieve proper correction of spherical aberration, in particular. If the value of Condition (8) is equal to or less than its lower limit, in particular, spherical aberration appears notably on the over side at the telephoto end. In contrast, if the value of Condition (8) is equal to or greater than its upper limit, spherical aberration appears notably on the under side at the telephoto end. Note that, in a case where the second lens unit includes a plurality of aspherical surfaces, at least one of those aspherical surfaces needs to fulfill Condition (8) above; that is, the other aspherical surfaces do not necessarily have to fulfill Condition (8) above, if that is advantageous for the correction of other aberrations.

Embodiments 6 to 15

FIGS. 11 to 19 and 29 are lens arrangement diagrams of the zoom lens systems of a sixth, a seventh, an eighth, a ninth, a tenth, an eleventh, a twelfth, a thirteenth, a fourteenth and a fifteenth embodiment, respectively. In each diagram, the left-hand side corresponds to the object side, and the right-hand side corresponds to the image side. In addition, in each diagram, arrows schematically indicate the movement of the lens units during zooming from the wide-angle end to the telephoto end. Note that arrows with a broken line indicate that the lens unit is kept in a fixed position during zooming. Moreover, each diagram shows the lens arrangement of the zoom lens system during zooming, as observed at the wide-angle end. As shown in these diagrams, the zoom lens systems of the embodiments are each built as a three-unit zoom lens system of a negative-positive-positive configuration that is composed of, from the object side, a first lens unit Gr1, a second lens unit Gr2, and a third lens unit Gr3. In this zoom lens system, at least two lens units are moved during zooming.

The first lens unit Gr1 has a negative optical power as a whole. The second and third lens units (Gr2 and Gr3) have a positive optical power as a whole. In the zoom lens system, the first to eighth lens elements counted from the object side are represented as G1 to G8, respectively. The lens units provided in the zoom lens system of each embodiment are each realized by the use of a plurality of lens elements out of those lens elements G1 to G8. The second lens unit Gr2 includes an aperture stop S. Note that a flat plate disposed at the image-side end of the zoom lens system is a low-pass filter LPF.

Figure 11:
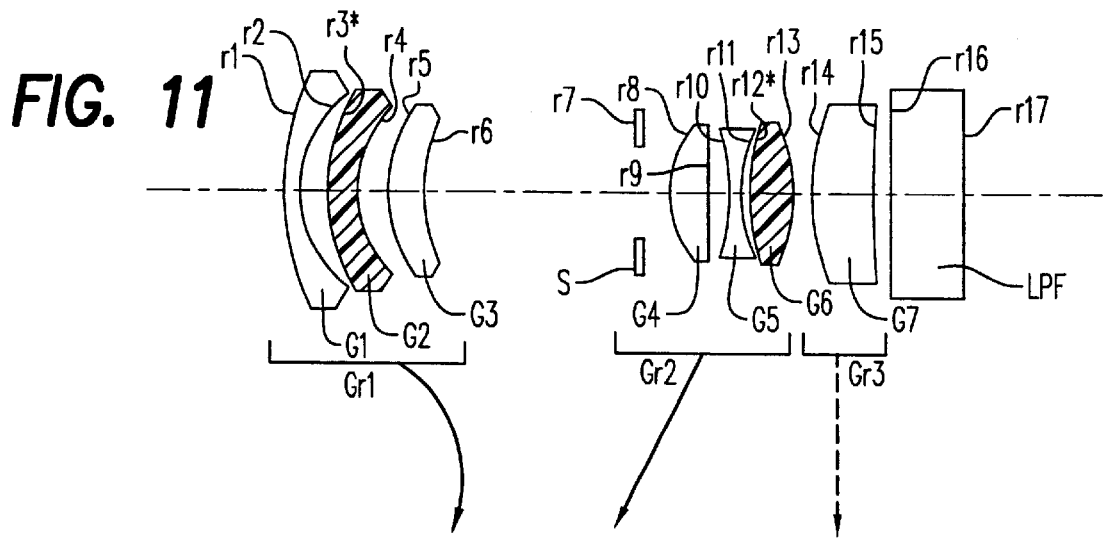
FIG. 11 is a lens arrangement diagram of the zoom lens system of a sixth embodiment (Example 6) of the present invention.
Figure 12:
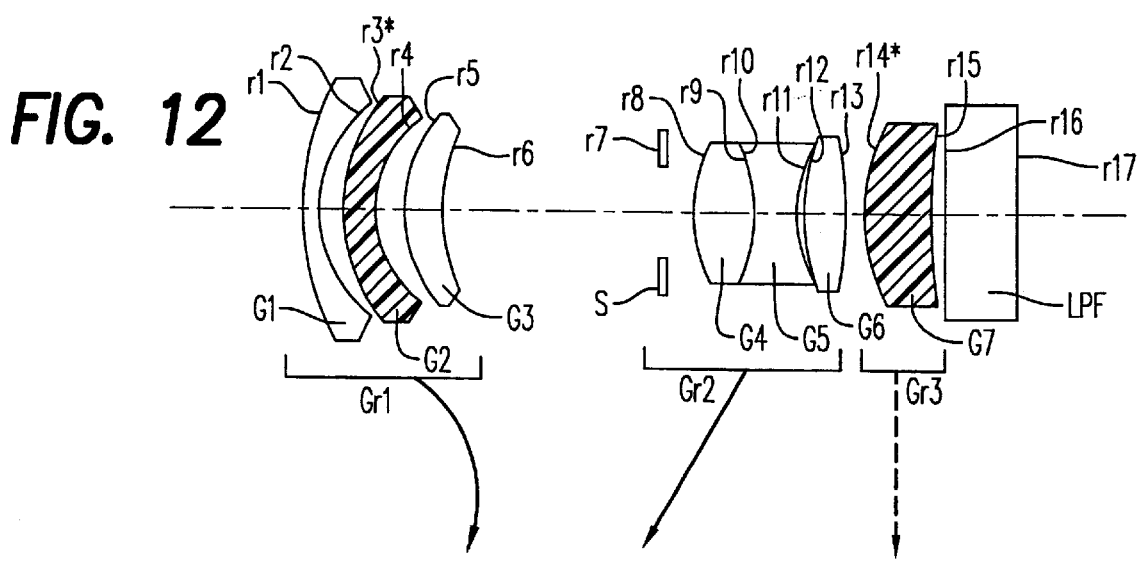
FIG. 12 is a lens arrangement diagram of the zoom lens system of a seventh embodiment (Example 7) of the present invention.

As shown in FIG. 11, in the sixth embodiment, the second and sixth lens elements (G2 and G6) counted from the object side (hatched in the figure) are plastic lens elements. Moreover, as shown in FIG. 12, in the seventh embodiment, the second and seventh lens elements (G2 and G7) counted from the object side (hatched in the figure) are plastic lens elements.

Figure 13:
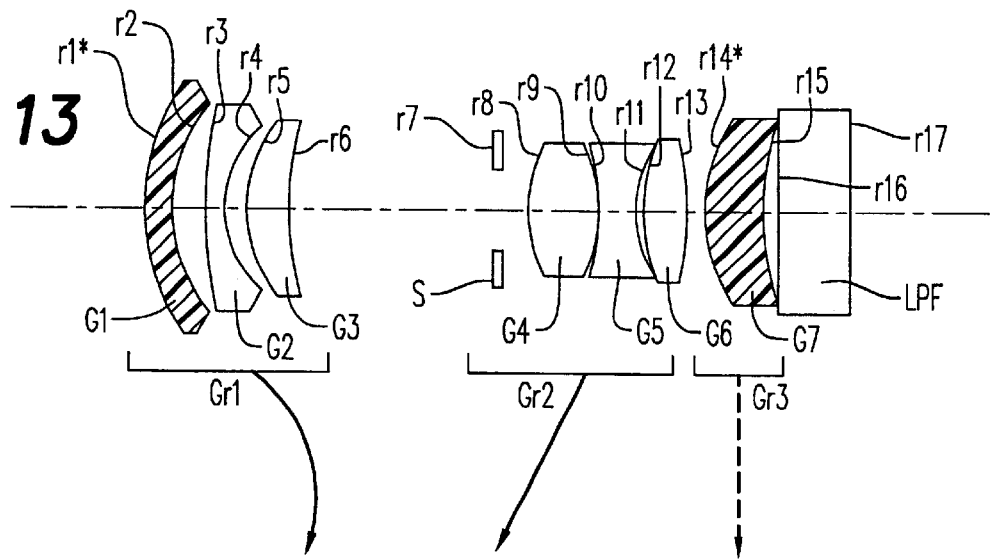
FIG. 13 is a lens arrangement diagram of the zoom lens system of an eighth embodiment (Example 8) of the present invention.
Figure 14:
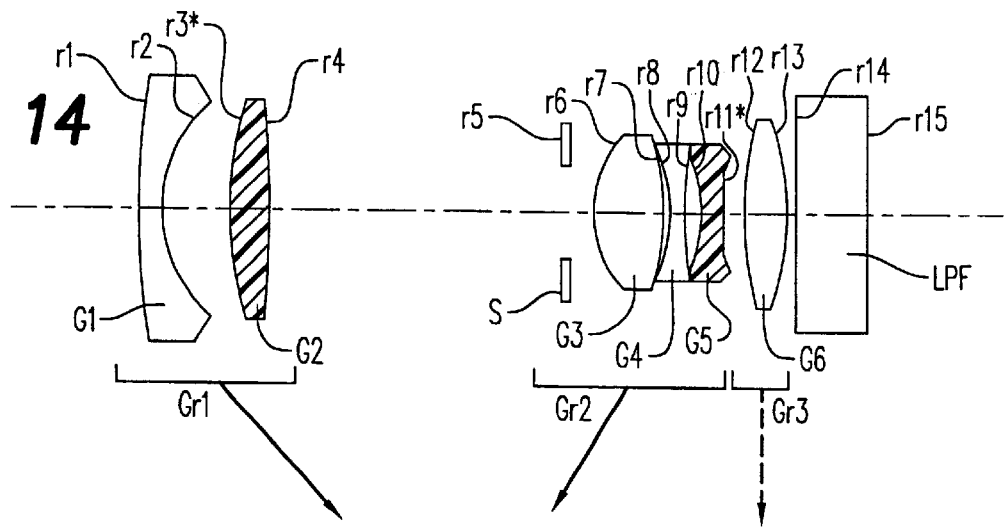
FIG. 14 is a lens arrangement diagram of the zoom lens system of a ninth embodiment (Example 9) of the present invention.
Figure 15:
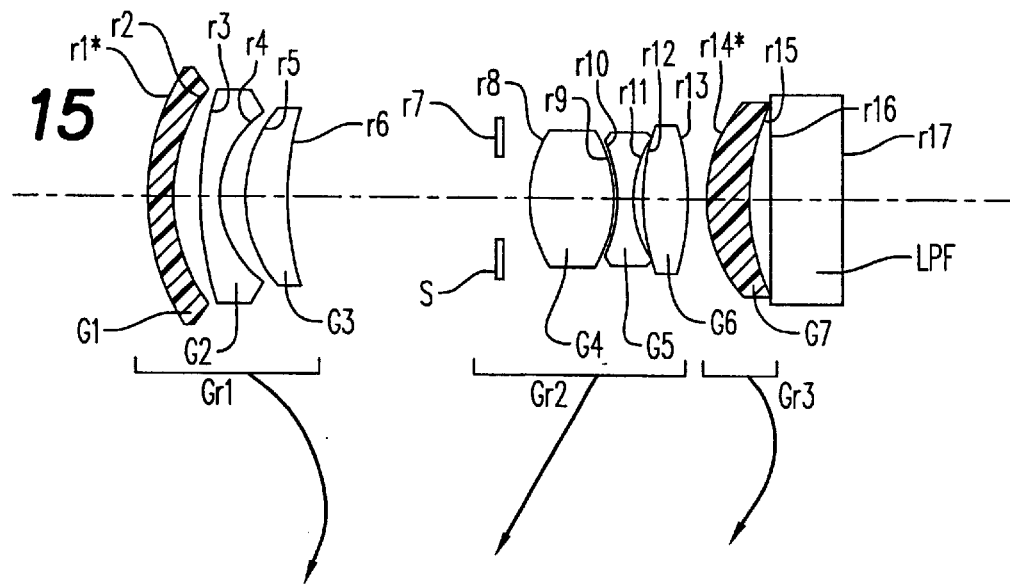
FIG. 15 is a lens arrangement diagram of the zoom lens system of a tenth embodiment (Example 10) of the present invention.

As shown in FIG. 13, in the eighth embodiment, the first and seventh lens elements (G1 and G7) counted from the object side (hatched in the figure) are plastic lens elements. Moreover, as shown in FIG. 14, in the ninth embodiment, the second and fifth lens elements (G2 and G5) counted from the object side (hatched in the figure) are plastic lens elements. Furthermore, as shown in FIG. 15, in the tenth embodiment, the first and seventh lens elements (G1 and G7) counted from the object side (hatched in the figure) are plastic lens elements.

Figure 16:
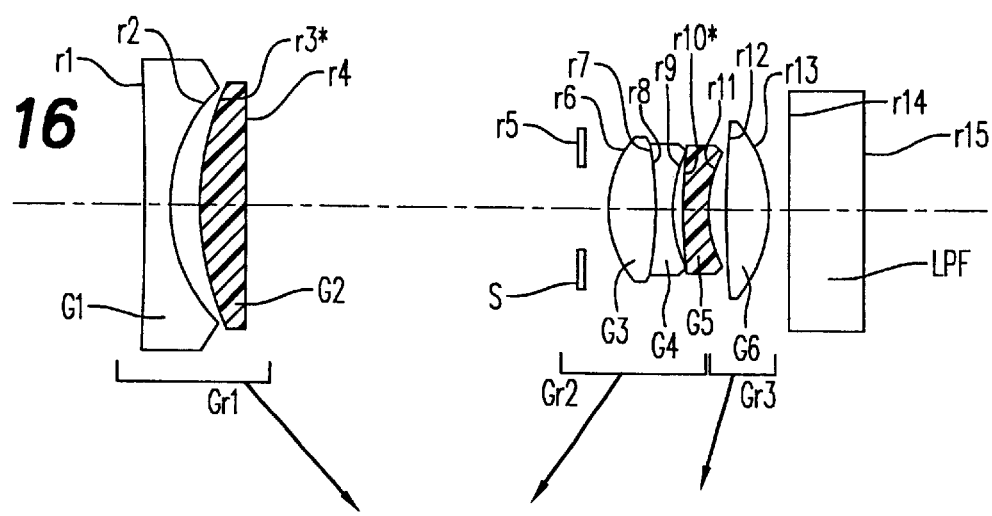
FIG. 16 is a lens arrangement diagram of the zoom lens system of an eleventh embodiment (Example 11) of the present invention.
Figure 17:
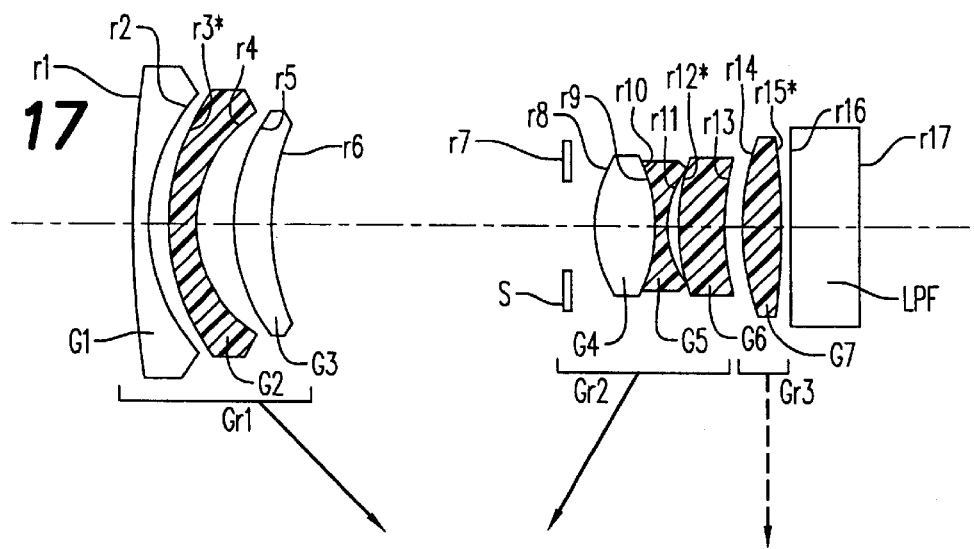
FIG. 17 is a lens arrangement diagram of the zoom lens system of a twelfth embodiment (Example 12) of the present invention.

As shown in FIG. 16, in the eleventh embodiment, the second and fifth lens elements (G2 and G5) counted from the object side (hatched in the figure) are plastic lens elements. Moreover, as shown in FIG. 17, in the twelfth embodiment, the second, fifth, sixth, and seventh lens elements (G2, G5, G6, and G7) counted from the object side (hatched in the figure) are plastic lens elements.

Figure 18:
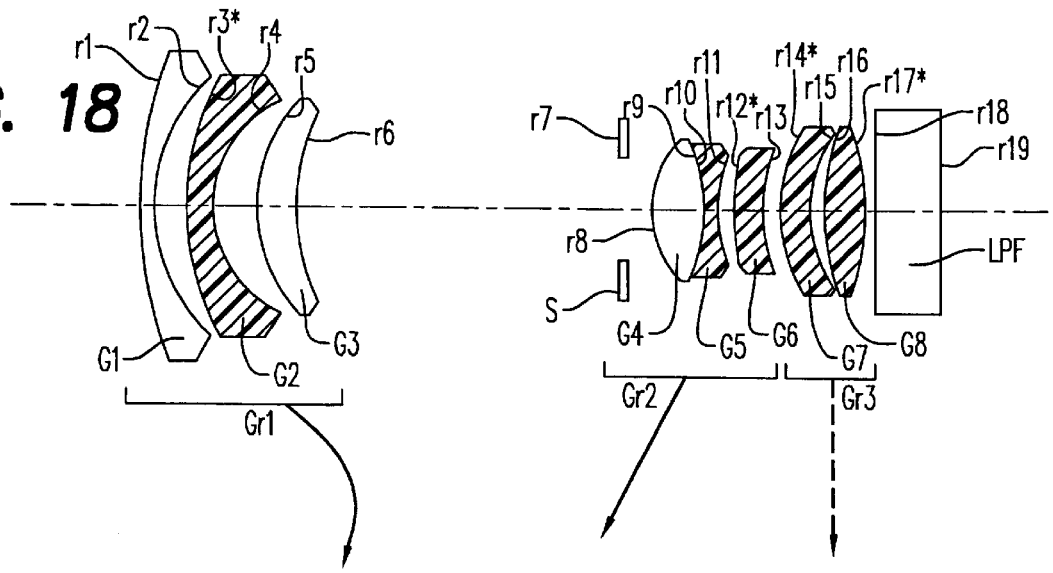
FIG. 18 is a lens arrangement diagram of the zoom lens system of a thirteenth embodiment (Example 13) of the present invention.
Figure 19:
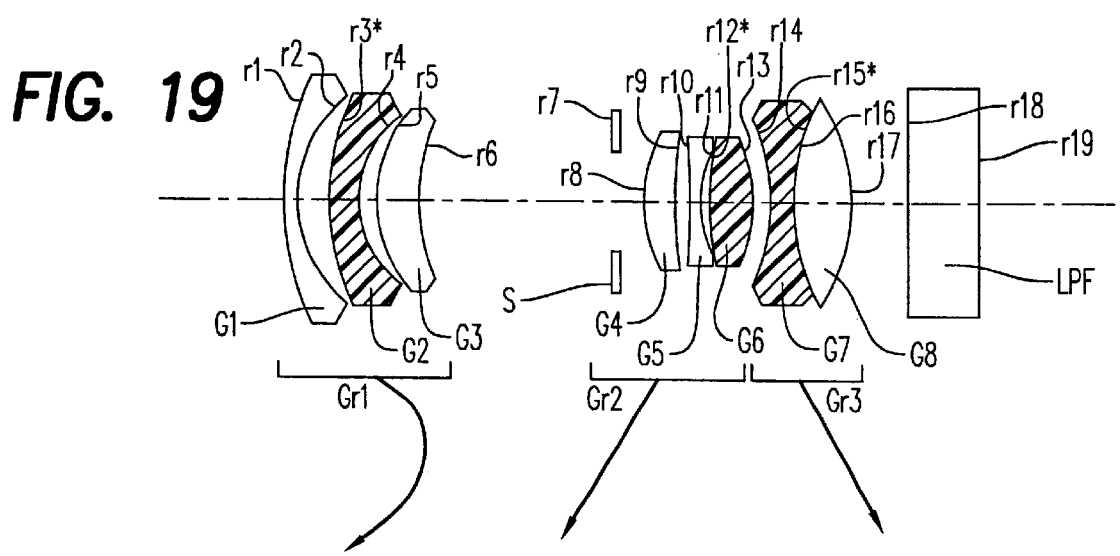
FIG. 19 is a lens arrangement diagram of the zoom lens system of a fourteenth embodiment (Example 14) of the present invention.
Figure 21A:
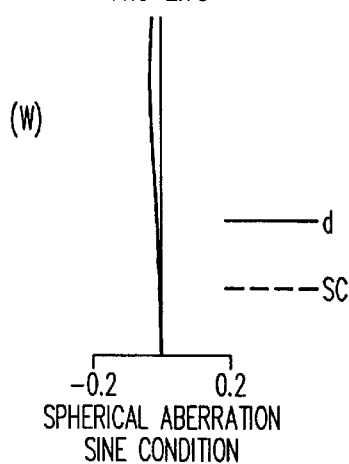
FIGS. 21A to 21I are graphic representations of the aberrations observed in an infinite-distance shooting condition in the zoom lens system of Example 7.
Figure 21B:
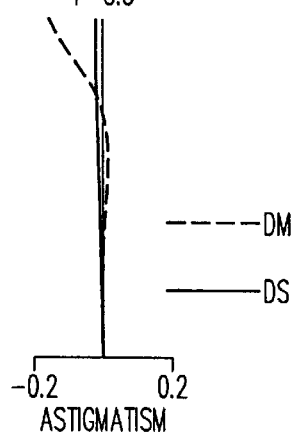
Figure 21C:
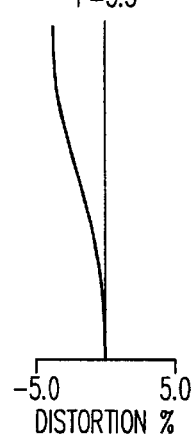
Figure 21D:
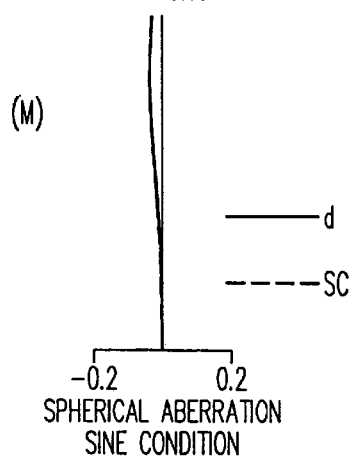
Figure 21E:
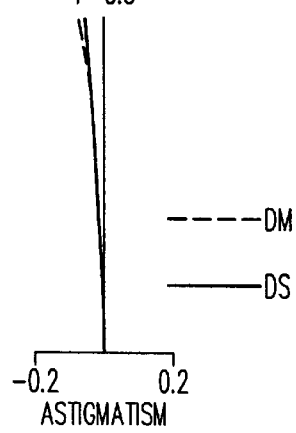
Figure 21F:
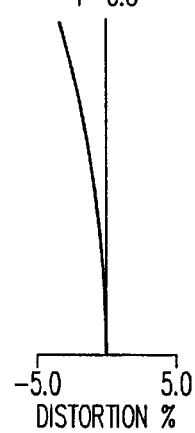
Figure 21G:
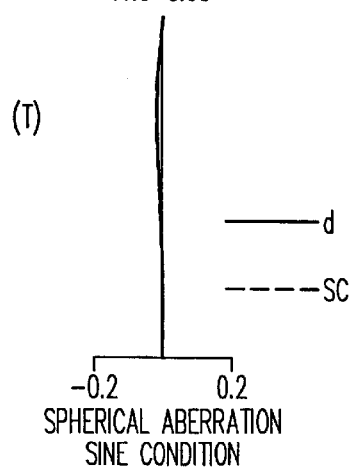
Figure 21H:
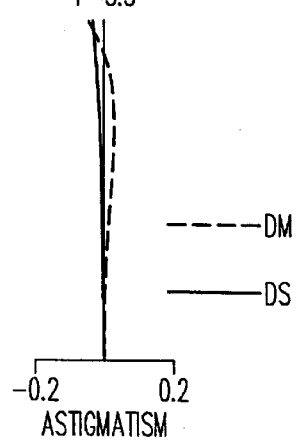
Figure 21I:
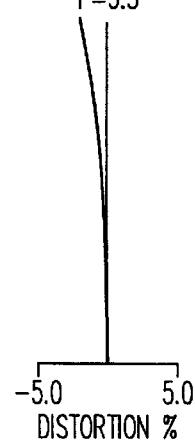
Figure 22A:
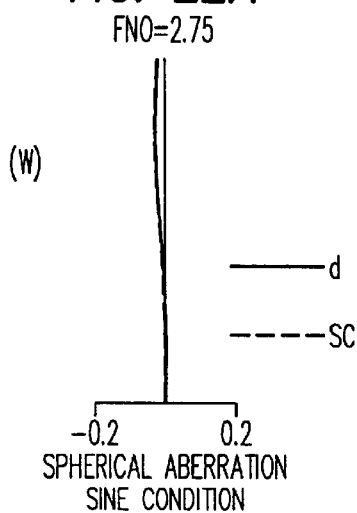
FIGS. 22A to 22I are graphic representations of the aberrations observed in an infinite-distance shooting condition in the zoom lens system of Example 8.
Figure 22B:
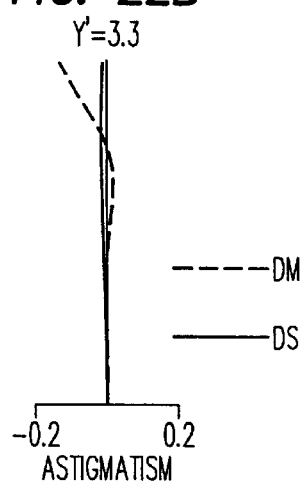
Figure 22C:
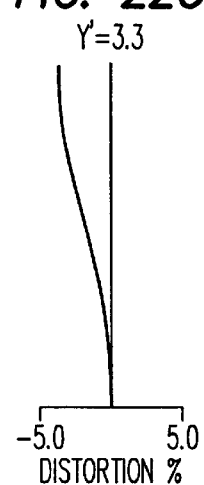
Figure 22D:
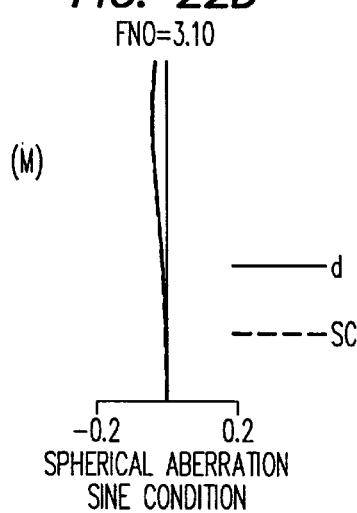
Figure 22E:
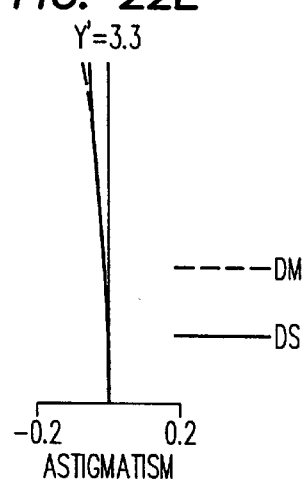
Figure 22F:
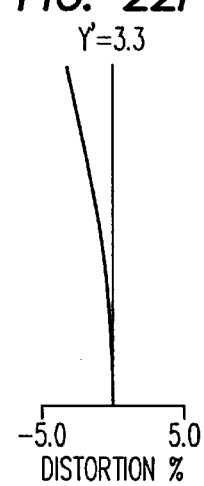
Figure 22G:
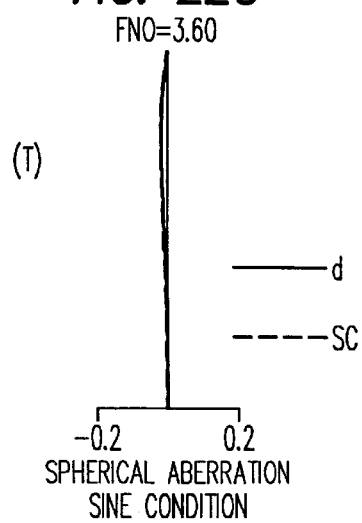
Figure 22H:
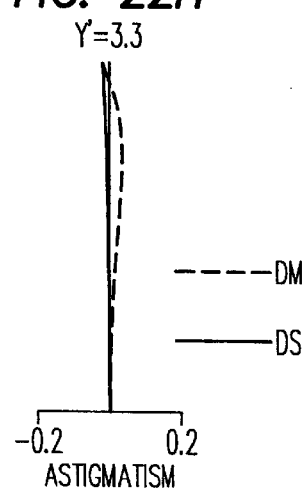
Figure 22I:
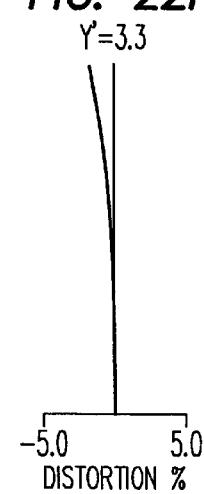
Figure 23A:
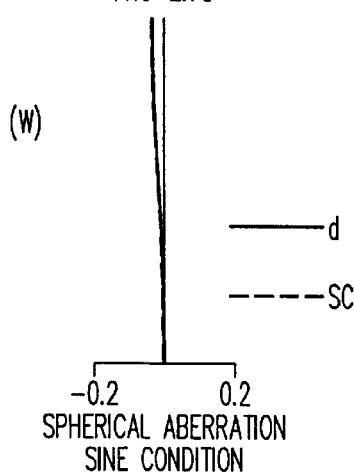
FIGS. 23A to 23I are graphic representations of the aberrations observed in an infinite-distance shooting condition in the zoom lens system of Example 9.
Figure 23B:
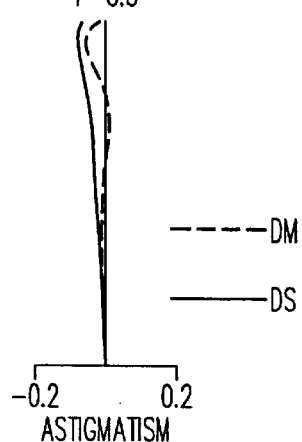
Figure 23C:
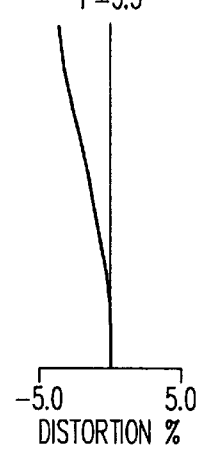
Figure 23D:
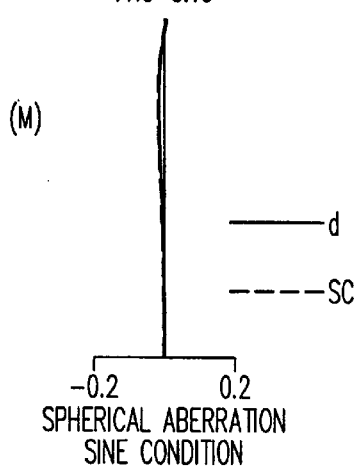
Figure 23E:
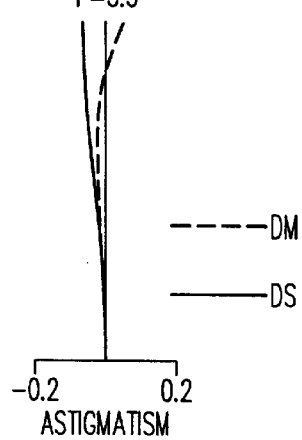
Figure 23F:
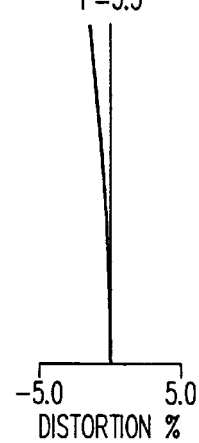
Figure 23G:
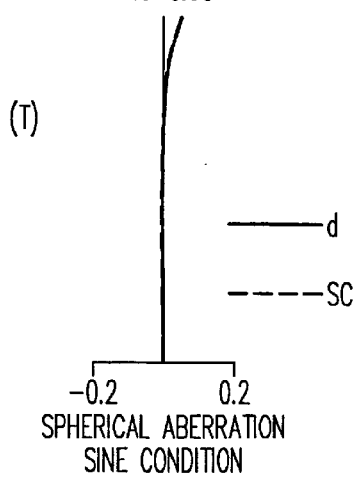
Figure 23H:
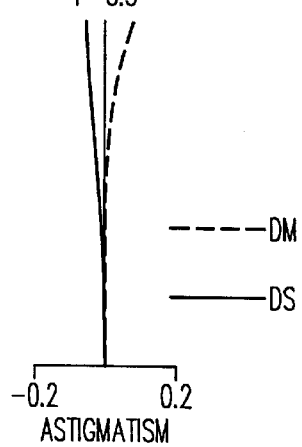
Figure 23I:
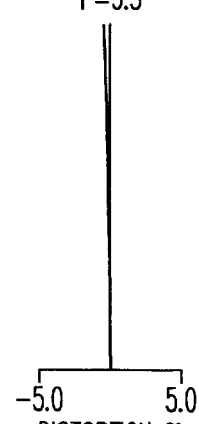
Figure 24A:
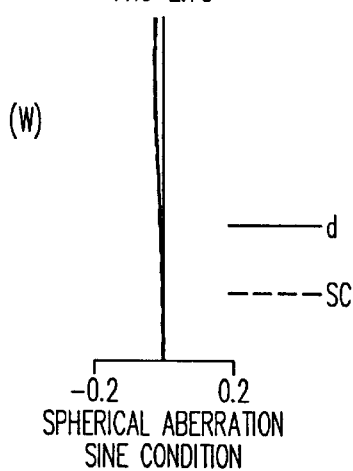
FIGS. 24A to 24I are graphic representations of the aberrations observed in an infinite-distance shooting condition in the zoom lens system of Example 10.
Figure 24B:
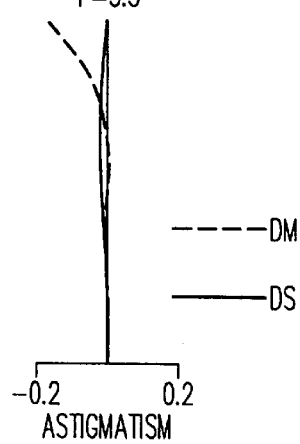
Figure 24C:
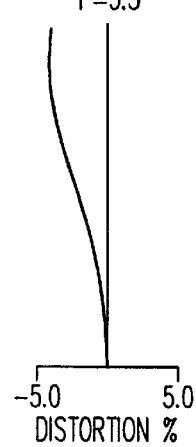
Figure 24D:
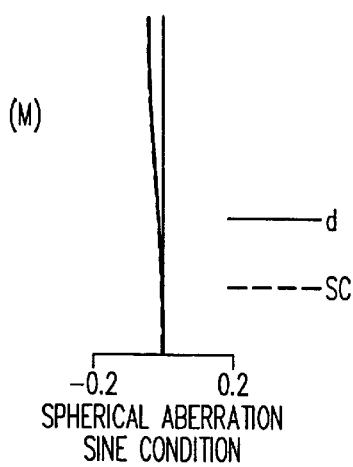
Figure 24E:
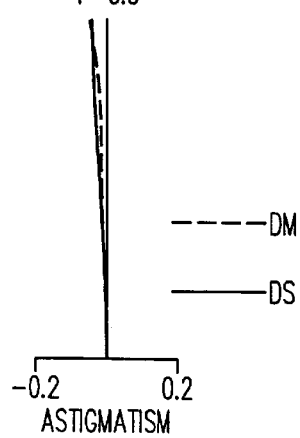
Figure 24F:
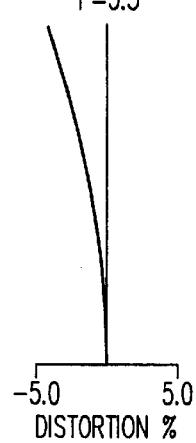
Figure 24G:
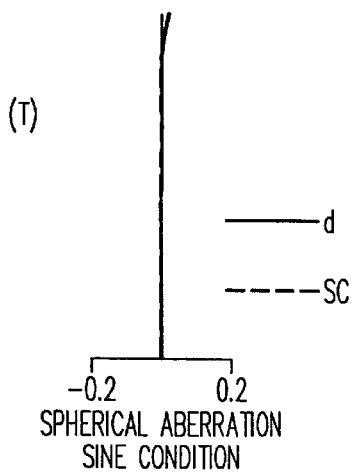
Figure 24H:
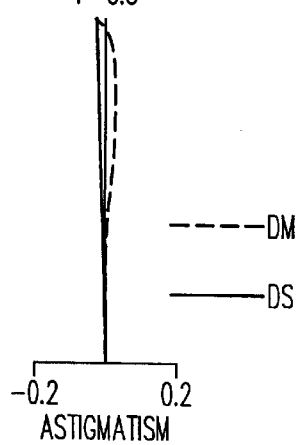
Figure 24I:
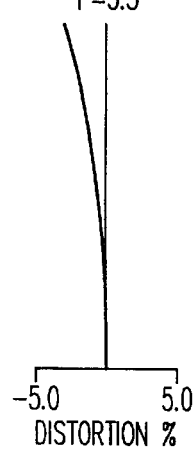
Figure 25A:
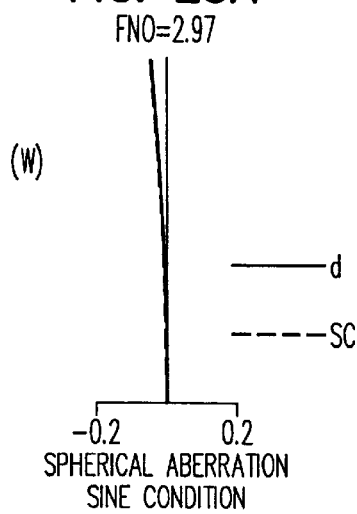
FIGS. 25A to 25I are graphic representations of the aberrations observed in an infinite-distance shooting condition in the zoom lens system of Example 11.
Figure 25B:
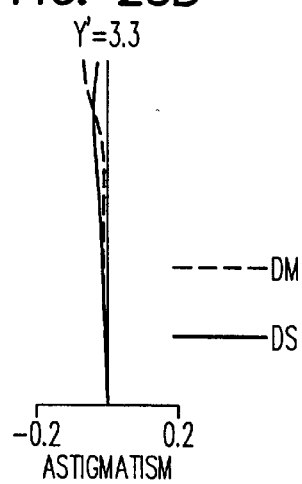
Figure 25C:
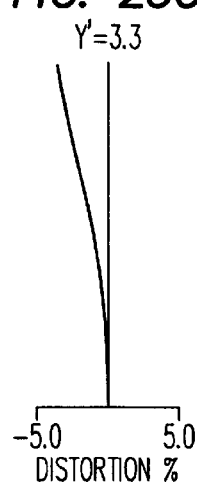
Figure 25D:
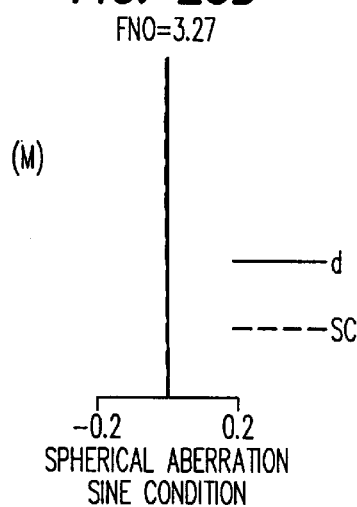
Figure 25E:
Figure 25F:
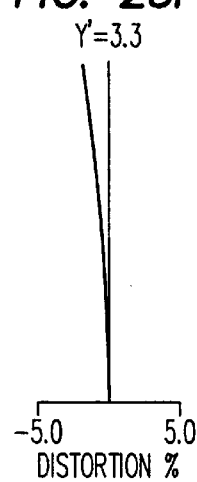
Figure 25G:
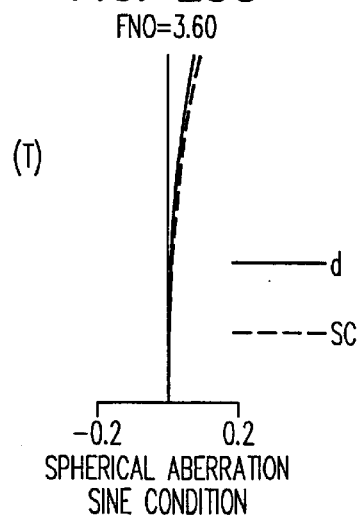
Figure 25H:
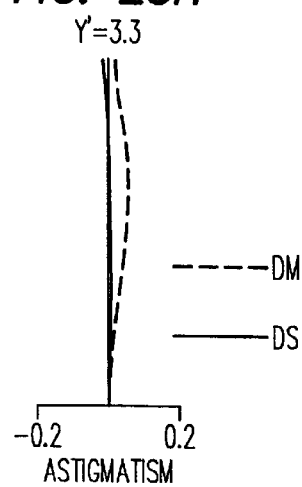
Figure 25I:
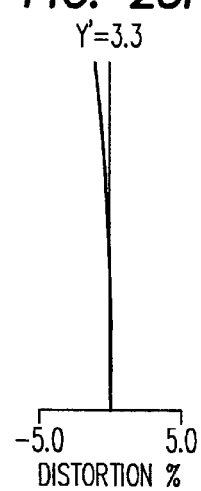
Figure 26A:
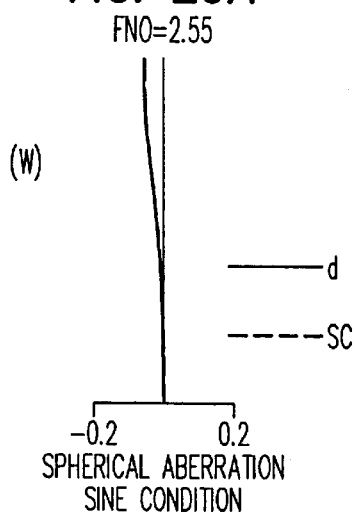
FIGS. 26A to 26I are graphic representations of the aberrations observed in an infinite-distance shooting condition in the zoom lens system of Example 12.
Figure 26B:
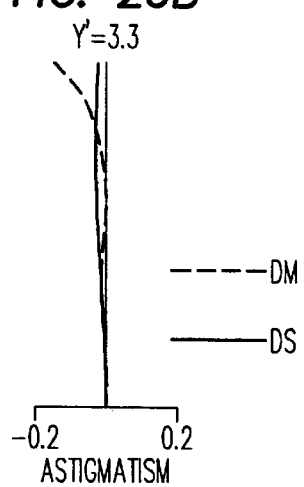
Figure 26C:
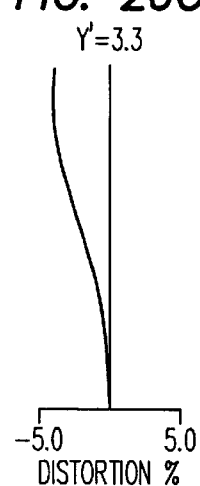
Figure 26D:
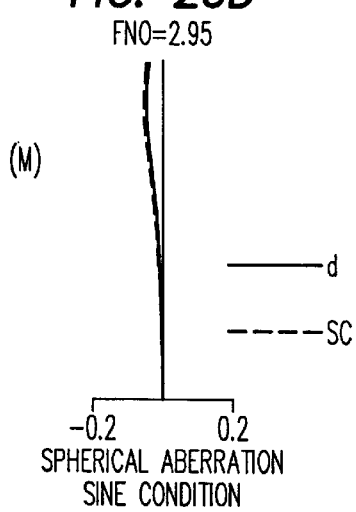
Figure 26E:
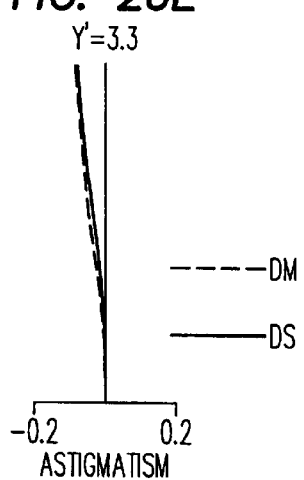
Figure 26F:
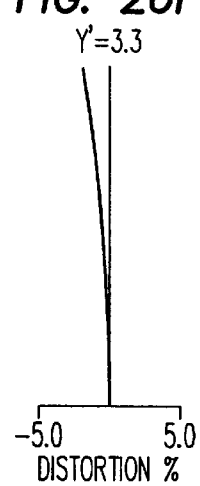
Figure 26G:
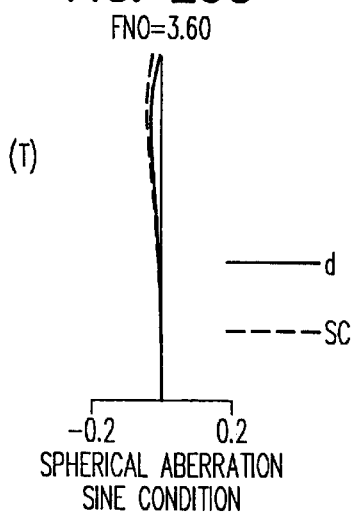
Figure 26H:
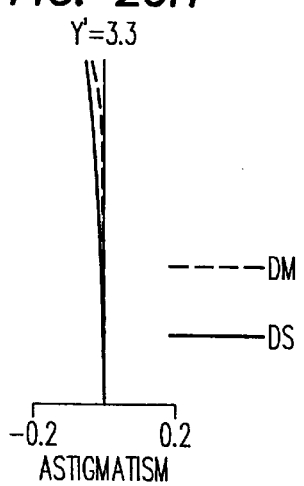
Figure 26I:
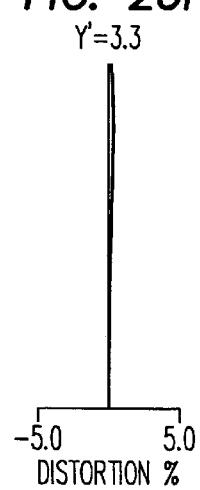
Figure 27A:
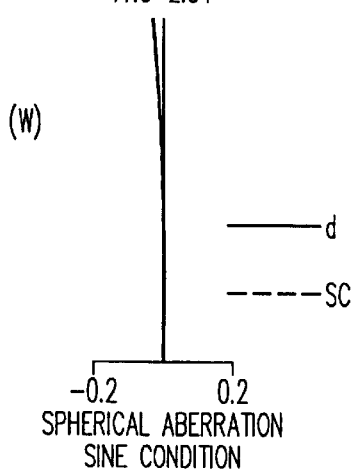
FIGS. 27A to 27I are graphic representations of the aberrations observed in an infinite-distance shooting condition in the zoom lens system of the Example 13.
Figure 27B:
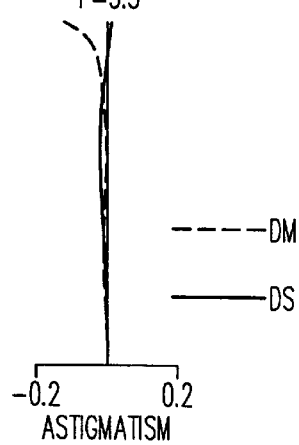
Figure 27C:
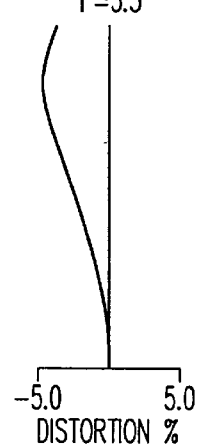
Figure 27D:
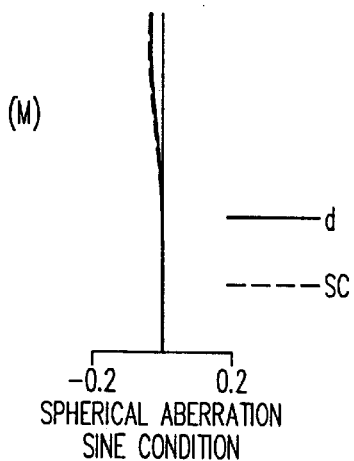
Figure 27E:
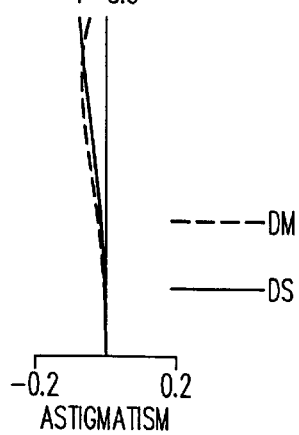
Figure 27F:
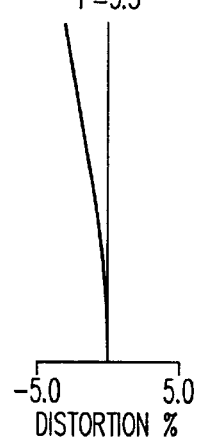
Figure 27G:
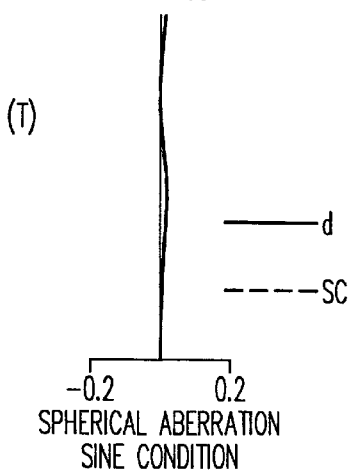
Figure 27H:
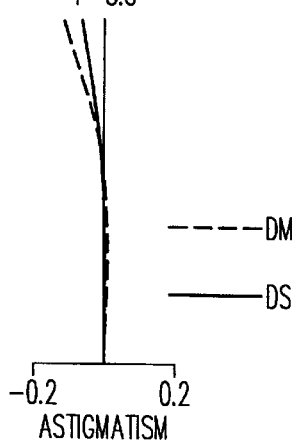
Figure 27I:
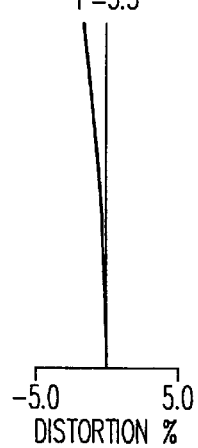
Figure 28A:
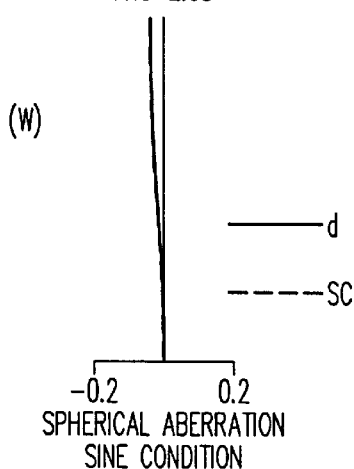
FIGS. 28A to 28I are graphic representations of the aberrations observed in an infinite-distance shooting condition in the zoom lens system of the Example 14.
Figure 28B:
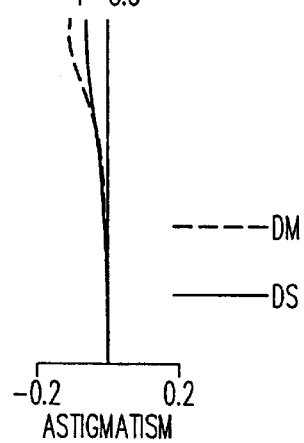
Figure 28C:
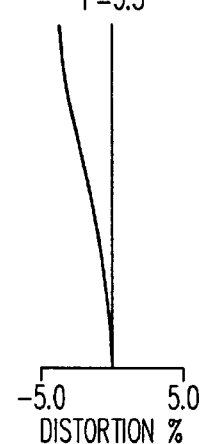
Figure 28D:
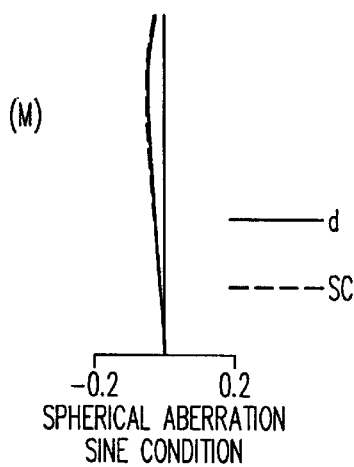
Figure 28E:
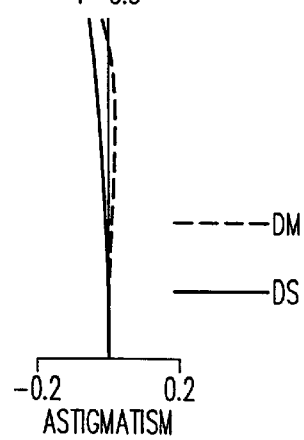
Figure 28F:
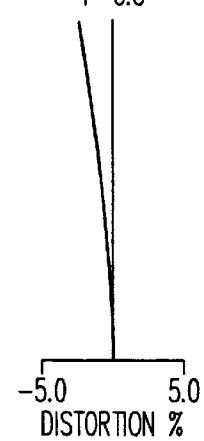
Figure 28G:
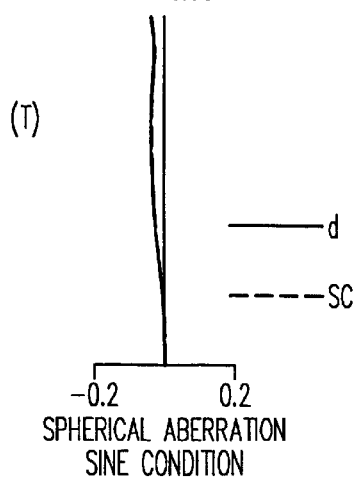
Figure 28H:
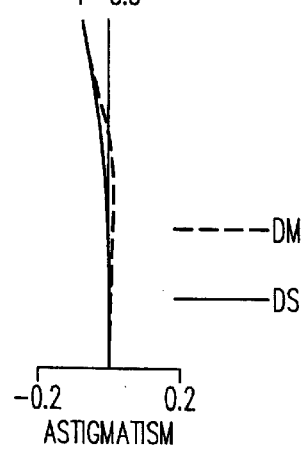
Figure 28I:
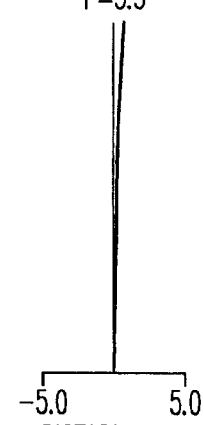
Figure 29:
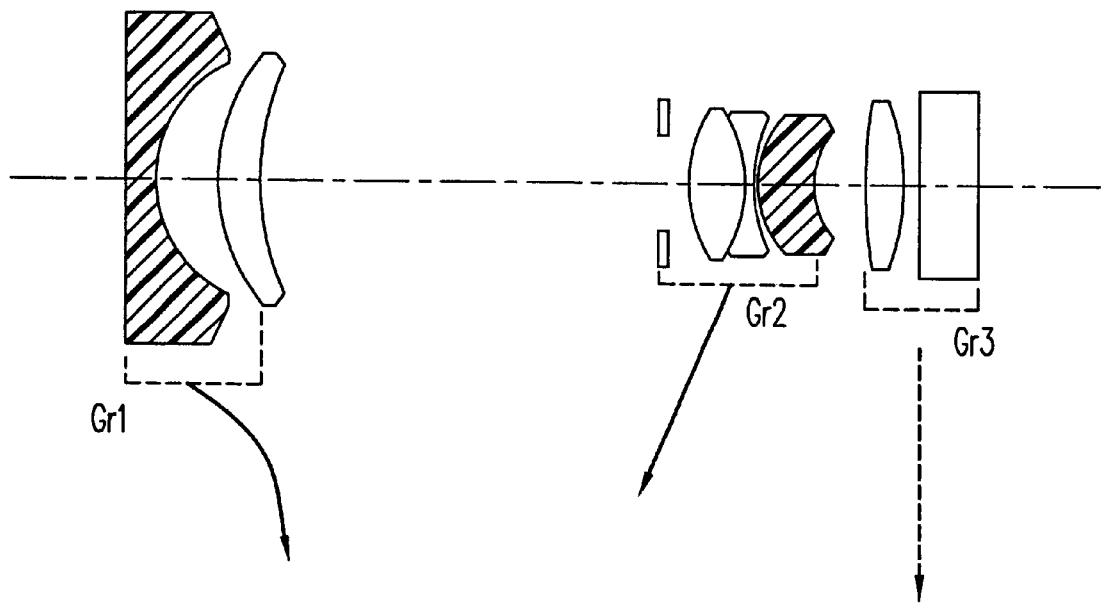
FIG. 29 is a lens arrangement diagram of the zoom lens system of a fifteenth embodiment (Example 15) of the present invention.

As shown in FIG. 18, in the thirteenth embodiment, the second, fifth, sixth, seventh, and eighth lens elements (G2, G5, G6, G7, and G8) counted from the object side (hatched in the figure) are plastic lens elements. As shown in FIG. 19, in the fourteenth embodiment, the second, sixth, and seventh lens elements (G2, G6, and G7) counted from the object side (hatched in the figure) are plastic lens elements. Referring to FIG. 29, in the fifteenth embodiment, the first and fifth lens elements (G1 and G5) are plastic lens elements.

The conditions to be preferably fulfilled by an optical system will be described below. It is preferable that the zoom lens systems of the sixth to fifteenth embodiments fulfill Condition (9) below.

$$-0.8<Cp\times(N'-N)/\phi W<0.8 \tag{9}$$

where

Cp represents the curvature of the plastic lens element;

$\phi W$ represents the optical power of the entire zoom lens system at the wide-angle end;

N' represents the refractive index of the object-side medium of the aspherical surface for the d line; and N represents the refractive index of the image-side medium of the aspherical surface for the d line.

Condition (9) defines the optical power of the lens surface of the plastic lens element. If the optical power of the lens surface is too strong, the surface shape varies with temperature, with the result that various aberrations become unduly large. If the value of Condition (9) is equal to or less than its lower limit, the negative optical power is too strong. In contrast, if the value of Condition (9) is equal to or greater than its upper limit, the positive optical power is too strong. As a result, in the plastic lens element provided in the first lens unit, curvature of field varies too greatly with temperature, in particular; in the plastic lens element provided in the second lens unit, spherical aberration varies too greatly with temperature, in particular; and, in the plastic lens element provided in the third lens unit, spherical aberration and the coma aberration in marginal rays vary greatly with temperature, in particular.

It is preferable that the zoom lens systems of the embodiments fulfill Condition (10) below.

$$-0.45<M3/M2<0.90 \tag{10}$$

where

M3 represents the amount of movement of the third lens unit (the direction pointing to the object side is negative with respect to the wide-angle end); and M2 represents the amount of movement of the second lens unit (the direction pointing to the object side is negative with respect to the wide-angle end).

Condition (10) defines, in the form of the ratio of the amount of movement of the second lens unit to that of the third lens unit, the condition to be fulfilled to keep the amount of movement of the second and third lens units in appropriate ranges in order to achieve zooming efficiently. Thus, in an optical system in which a sufficient zoom ratio needs to be secured, fulfillment of Condition (10) is effective. Moreover, it is more preferable that the following condition be additionally fulfilled.

$$\phi T/\phi W > 1.6$$

where $\phi T$ represents the optical power of the entire zoom lens system at the telephoto end.

If the value of Condition (10) is equal to or less than its lower limit, the responsibility of the third lens unit for zooming is so heavy that spherical aberration and the coma aberration in marginal rays vary too greatly with zooming. In contrast, if the value of Condition (10) is equal to or greater than its upper limit, the amount of the movement of the second lens unit is so large that the diameter of the front-end lens unit needs to be unduly large in order to secure sufficient amount of peripheral light on the wide-angle side, and simultaneously, the responsibility of the second lens unit for zooming is so heavy that spherical aberration varies too greatly with zooming.

Moreover, where a plastic lens element is used in the third lens unit, the ability of the third lens unit to correct aberrations tends to be insufficient. To avoid this, it is preferable to make the range of Condition (10) narrower so as to obtain the following condition:

$$-0.30 < M3/M2 < 0.90 \tag{10}$$

In a case where a plastic lens element is used in the first lens unit, it is preferable that Condition (11) below be fulfilled.

$$|\phi P/\phi 1)\phi 1| < 1.20 \tag{11}$$

where $\phi P$ represents the optical power of the plastic lens element; and $\phi 1$ represents the optical power of the first lens unit.

Condition (11) defines, in the form of the ratio of the optical power of the first lens unit to that of the plastic lens element included in the first lens unit, the condition to be fulfilled to keep the variation of aberrations resulting from temperature variation within an appropriate range. If the value of Condition (11) is equal to or greater than its upper limit, curvature of field, in particular, the curvature of field on the wide-angle side, varies too greatly with temperature. Moreover, to correct the aberrations that occur in the first lens unit, it is preferable to use at least a positive and a negative lens element.

In a case where a plastic lens element is used in the second lens unit, it is preferable that Condition (12) below be fulfilled.

$$|\phi P/\phi 2| < 2.5 \tag{12}$$

where $\phi 2$ represents the optical power of the second lens unit.

Condition (12) defines, in the form of the ratio of the optical power of the second lens unit to that of the plastic lens element included in the second lens unit, the condition to be fulfilled to keep the variation of aberrations resulting from temperature variation within an appropriate range. If the value of Condition (12) is equal to or greater than its upper limit, spherical aberration, in particular, the spherical aberration on the telephoto side, varies too greatly with temperature. Moreover, to correct the aberrations that occur in the second lens unit, it is preferable to use at least a positive and a negative lens element.

In a case where a plastic lens element is used in the third lens unit, it is preferable that Condition (13) below be fulfilled.

$$|\phi P/\phi 3| < 1.70 \tag{13}$$

where $\phi 3$ represents the optical power of the third lens unit.

Condition (13) defines, in the form of the ratio of the optical power of the third lens unit to that of the plastic lens element included in the third lens unit, the condition to be fulfilled to keep the variation of aberrations resulting from temperature variation within an appropriate range. If the value of Condition (13) is equal to or greater than its upper limit, spherical aberration and the coma aberration in marginal rays vary too greatly with temperature. Moreover, to correct the aberrations that occur in the third lens unit, it is preferable to use at least a positive and a negative lens element.

No lower limit is given for Conditions (11) to (13). This is because, as the value of either of the conditions decreases, the optical power of the plastic lens element becomes weaker, and this is desirable in terms of suppression of the variation of aberrations resulting from temperature variation. This, however, has no effect on correction of aberrations under normal temperature, and accordingly makes the use of plastic lenses meaningless. To avoid this, where the plastic lens element fulfills Condition (14) below, it is essential to use an aspherical surface.

$$0 \leq |\phi P/\phi A| < 0.45 \tag{14}$$

where $\phi A$ represents the optical power of the lens unit including the plastic lens element.

Note however that this is not to discourage providing an aspherical surface on the lens surface of a plastic lens element having an optical power that makes the value of Condition (14) equal to or greater than its upper limit.

As described above, if an aspherical surface is used, it is preferable that the following conditions be fulfilled. First, where an aspherical surface is provided on the lens surface of the plastic lens element of the first lens unit, it is preferable that Condition (15) below be fulfilled.

$$-1.10 < (|X|-|X_0|)/\{C_0(N'-N)\phi 1\} < -0.10 \tag{15}$$

where $C_0$ represents the curvature of the reference spherical surface of the aspherical surface;

N represents the refractive index of the image-side medium of the aspherical surface for the d line;

N' represents the refractive index of the object-side medium of the aspherical surface for the d line;

X represents the deviation of the aspherical surface along the optical axis at the height in a direction perpendicular to the optical axis (the direction pointing to the object side is negative);

$X_0$ represents the deviation of the reference spherical surface of the aspherical surface along the optical axis at the height in a direction perpendicular to the optical axis (the direction pointing to the object side is negative); and f1 represents the focal length of the first lens unit.

If the value of Condition (15) is equal to or less than its lower limit, positive distortion becomes unduly large on the wide-angle side, in particular, in a close-shooting condition, and simultaneously the inclination of the image plane toward the over side becomes unduly large. In contrast, if the value of Condition (15) is equal to or greater than its upper limit, it is impossible to make efficient use of the aspherical surface, which makes the use of an aspherical surface meaningless. As a result, the negative distortion on the wide-angle side, in particular, in a close-shooting condition, and the inclination of the image plane toward the under side are undercorrected. Note that, in a case where the first lens unit includes a plurality of aspherical surfaces, at least one of those aspherical surfaces needs to fulfill Condition (15) above; that is, the other aspherical surfaces do not necessarily have to fulfill Condition (15) above, if that is advantageous for the correction of other aberrations.

In a case where an aspherical surface is provided on the lens surface of the plastic lens element of the second lens unit, it is preferable that Condition (16) below be fulfilled.

$$-0.35<(|X|-|X_0|)/\{C_0(N'-N)f2\}<-0.03 \tag{16}$$

where f2 represents the focal length of the second lens unit.

Condition (16) assumes that the aspherical surface is so shaped as to weaken the positive optical power of the second lens unit. Fulfillment of Condition (16) makes it possible to achieve proper correction of spherical aberration, in particular. If the value of Condition (16) is equal to or less than its lower limit, in particular, spherical aberration appears notably on the over side at the telephoto end. In contrast, if the value of Condition (16) is equal to or greater than its upper limit, it is impossible to make efficient use of the aspherical surface, which makes the use of an aspherical surface meaningless. As a result, spherical aberration is undercorrected on the telephoto side, in particular. Note that, in a case where the second lens unit includes a plurality of aspherical surfaces, at least one of those aspherical surfaces needs to fulfill Condition (16) above; that is, the other aspherical surfaces do not necessarily have to fulfill Condition (16) above, if that is advantageous for the correction of other aberrations.

In a case where an aspherical surface is provided on the lens surface of the plastic lens element of the third lens unit, it is preferable that Condition (17) below be fulfilled.

$$-0.70<(|X|-|X_0|)/\{C_0(N'-N)f3\}<-0.01 \tag{17}$$

where f3 represents the focal length of the third lens unit.

Condition (17) assumes that the aspherical surface is so shaped as to weaken the positive optical power of the third lens unit. Fulfillment of Condition (17) makes it possible to achieve proper correction of spherical aberration and the coma aberration in marginal rays. If the value of Condition (17) is equal to or less than its lower limit, spherical aberration appears notably on the over side, and simultaneously the coma aberration in marginal rays becomes unduly large. In contrast, if the value of Condition (17) is equal to or greater than its upper limit, it is impossible to make efficient use of the aspherical surface, which makes the use of an aspherical surface meaningless. As a result, spherical aberration and the coma aberration in marginal rays are undercorrected. Note that, in a case where the third lens unit includes a plurality of aspherical surfaces, at least one of those aspherical surfaces needs to fulfill Condition (17) above; that is, the other aspherical surfaces do not necessarily have to fulfill Condition (17) above, if that is advantageous for the correction of other aberrations.

It is preferable that the zoom lens systems of the embodiments fulfill Condition (18) below.

$$0.20<|\phi 1/\phi W|<0.70 \tag{18}$$

Condition (18) defines, in the form of the optical power of the first lens unit, the condition to be fulfilled to achieve proper correction of aberrations and keep the size of the zoom lens system appropriate. If the value of Condition (18) is equal to or less than its lower limit, the optical power of the first lens unit is so weak that aberrations can be corrected properly, but simultaneously the total length, as well as the diameter of the front-end lens unit, of the zoom lens system becomes unduly large. In contrast, if the value of Condition (18) is equal to or greater than its upper limit, the optical power of the first lens unit is so strong that aberrations become unduly large, in particular, the inclination of the image plane toward the over side becomes unduly large, and simultaneously barrel-shaped distortion becomes unduly large on the wide-angle side. In this case, the use of a plastic lens element, which offers a relatively low refractive index and a strictly restricted range of dispersion, makes it difficult to correct aberrations properly and thus requires more lens elements in the zoom lens system.

It is preferable that the zoom lens systems of the embodiments fulfill Condition (19) below.

$$0.25<\phi 2/\phi W<0.75 \tag{19}$$

Condition (19) defines, in the form of the optical power of the second lens unit, the condition to be fulfilled to achieve proper correction of aberrations and keep the size of the zoom lens system appropriate. If the value of Condition (19) is equal to or less than its lower limit, the optical power of the second lens unit is so weak that aberrations can be corrected properly, but simultaneously the total length, as well as the diameter of the front-end lens unit, of the zoom lens system becomes unduly large. In contrast, if the value of Condition (19) is equal to or greater than its upper limit, the optical power of the second lens unit is so strong that aberrations become unduly large, in particular, spherical aberration appears notably on the under side. In this case, the use of a plastic lens element, which offers a relatively low refractive index and a strictly restricted range of dispersion, makes it difficult to correct aberrations properly and thus requires more lens elements in the zoom lens system.

It is preferable that the zoom lens systems of the embodiments fulfill Condition (20) below.

$$0.1<\phi 3/\phi W<0.60 \tag{20}$$

Condition (20) defines, in the form of the optical power of the third lens unit, the condition to be fulfilled to achieve proper correction of aberrations and keep the size of the zoom lens system appropriate. If the value of Condition (20) is equal to or less than its lower limit, the optical power of the third lens unit is so weak that aberrations can be corrected properly, but simultaneously the total length, as well as the diameter of the front-end lens unit, of the zoom lens system becomes unduly large. In contrast, if the value of Condition (20) is equal to or greater than its upper limit, the optical power of the third lens unit is so strong that aberrations become unduly large, in particular, spherical aberration appears notably on the under side. In this case, the use of a plastic lens element, which offers a relatively low refractive index and a strictly restricted range of dispersion, makes it difficult to correct aberrations properly and thus requires more lens elements in the zoom lens system.

Moreover, if the values of Conditions (18) to (20) are equal to or greater than their upper limits, the optical power of the plastic lens element tends to be unduly strong. Thus, it is preferable that Conditions (11) and (18); (12) and (19); and (13) and (20) be fulfilled at the same time, respectively.

It is preferable that the zoom lens systems of the embodiments fulfill Condition (21) below.

$$-1.4 < \phi Pi/\phi W \times hi < 1.4 \quad (21)$$

where $\phi Pi$ represents the optical power of the ith plastic lens element; and hi represents the height of incidence at which a paraxial ray enters the object-side surface of the ith plastic lens element at the telephoto end, assuming that the initial values of the converted inclination α1 and the height h1, for paraxial tracing, are 0 and 1, respectively.

Condition (21) defines, in the form of the sum of the degrees in which the individual plastic lens elements, by their temperature variation, affect the back focal distance, the condition to be fulfilled to suppress variation in the back focal distance resulting from temperature variation. When a plurality of plastic lens elements are used, it is preferable that positively-powered and negatively-powered lens elements be combined in such a way that the degree in which they affect the back focal distance are canceled out by one another. If the value of Condition (21) is equal to or less than its lower limit, the variation in the back focal distance caused by temperature variation in the negatively-powered plastic lens element becomes unduly great. In contrast, if the value of Condition (21) is equal to or greater than its upper limit, the variation in the back focal distance caused by temperature variation in the positively-powered plastic lens element becomes unduly great. Thus, in either case, the zoom lens system needs to be provided with a mechanism that corrects the back focal distance in accordance with temperature variation.

It is preferable that the zoom lens systems of the embodiments fulfill Condition (22) below.

$$0.5 < \log(\beta 2T/\beta 2W)/\log Z < 2.2 \quad (22)$$

where $\beta 2W$ represents the lateral magnification of the second lens unit at the wide-angle end;

$\beta 2T$ represents the lateral magnification of the second lens unit at the telephoto end;

Z represents the zoom ratio; and log represents a natural logarithm (since the condition defines a proportion, the base does not matter).

In a zoom lens system of the types like those of the present invention, the responsibility of the second lens unit for zooming is heavier than that of any other lens unit. The heavier the responsibility for zooming, the larger the aberrations that accompany zooming. Thus, in order to achieve proper correction of aberrations, it is preferable to distribute the responsibility for zooming among a plurality of lens units. Condition (22) defines the responsibility for zooming of the second lens unit, to which the heaviest responsibility for zooming is distributed in a zoom lens system of the types like those of the present invention.

If the value of Condition (22) is equal to or less than its lower limit, the responsibility of the second lens unit for zooming is so light that the aberrations occurring in the second lens unit can be corrected properly. This, however, affects the responsibility of the other lens units for correcting aberrations, and thus requires more lens elements in those other lens units, with the result that the entire optical system needs to have an unduly large size. In contrast, if the value of Condition (22) is equal to or greater than its upper limit, the responsibility of the second lens unit for zooming is so heavy that spherical aberration varies too greatly with zooming, in particular.

It is preferable that the zoom lens systems of the embodiments fulfill Condition (23) below.

$$-1.2 < \log(\beta 3T/\beta 3W)/\log Z < 0.5 \quad (23)$$

where $\beta 3W$ represents the lateral magnification of the third lens unit at the wide-angle end; and $\beta 3T$ represents the lateral magnification of the third lens unit at the telephoto end.

Condition (23) defines the responsibility of the third lens unit for zooming. If the value of Condition (23) is negative, the third lens unit reduces its magnification during zooming. This is disadvantageous from the viewpoint of zooming. In this case, however, by moving the third lens unit during zooming, it is possible to correct the aberrations occurring in the other lens units during zooming. If the value of Condition (23) is equal to or less than its lower limit, the third lens unit reduces its magnification at an unduly high rate during zooming, and thus the resulting loss in magnification needs to be compensated by the other lens units. This requires an unduly large number of lens elements in those other lens units and thus makes the entire optical system unduly long. In contrast, if the value of Condition (23) is equal to or greater than its upper limit, the responsibility of the third lens unit for zooming is so heavy that spherical aberration and coma aberration vary too greatly with zooming.

Moreover, it is preferable that the zoom lens systems of the embodiments fulfill Condition (24) below.

$$-0.75 < \log(\beta 3T/B3W)/\log(\beta 2T/\beta 2W) < 0.65 \quad (24)$$

Condition (24) defines the preferable ratio of the responsibility of the second lens unit for zooming to the responsibility of the third lens unit for zooming. If the value of Condition (24) is equal to or less than its lower limit, the third lens unit reduces its magnification, and thus the responsibility of the second lens unit for zooming is excessively heavy. As a result, spherical aberration varies too greatly with zooming. In contrast, if the value of Condition (24) is equal to or greater than its upper limit, the responsibility of the third lens unit for zooming is so heavy that spherical aberration and coma aberration vary too greatly with zooming.

Hereinafter, examples of zoom lens systems embodying the present invention will be presented with reference to their construction data, graphic representations of aberrations, and other data. Tables 1 to 5 list the construction data of Examples 1 to 5, which respectively correspond to the first to fifth embodiments described above and have lens arrangements as shown in FIGS. 1 to 5. Tables 6 to 15 list the construction data of Examples 6 to 15, which respectively correspond to the sixth to fifteenth embodiments described above and have lens arrangements as shown in FIGS. 11 to 19 and 29.

In the construction data of each example, ri (i =1, 2, 3, . . . ) represents the ith surface counted from the object side and its radius of curvature, di (i=1, 2, 3, . . . ) represents the ith axial distance counted from the object side, and Ni (i=1, 2, 3, . . . ) and ni (i=1, 2, 3, . . . ) respectively represent the refractive index for the d line and the Abbe number of the ith lens element counted from the object side. The values listed for the focal length f and the F number FNO of the, entire zoom lens system in Examples 1 to 5; the distance between the first and second lens units; and the distance between the second lens unit and the low-pass filter LPF are the values at, from left, the wide-angle end (W), the middle-focal-length position (M), and the telephoto end (T).

Moreover, the values listed for the focal length f and the F number FNO of the entire zoom lens system in Examples 6 to 15; the distance between the first and second lens units; the distance between the second and third lens units; and the distance between the third lens unit and the low-pass filter LPF are the values at, from left, the wide-angle end (W), the middle-focal-length position (M), and the telephoto end (T). Note that, in all of Examples, a surface whose radius of curvature ri is marked with an asterisk (*) is an aspherical surface, whose surface shape is defined by the following formulae.

$$X = X_0 + \Sigma S A_i Y^i \quad (a)$$

$$X_0 = CY^2 / \{1 + (1 - \epsilon C^2 Y^2)^{1/2}\} \quad (b)$$

where
X represents the displacement from the reference surface in the optical axis direction;
Y represents the height in a direction perpendicular to the optical axis;
C represents the paraxial curvature;
$\epsilon$ represents the quadric surface parameter; and
$A_i$ represents the aspherical coefficient of the ith order.

FIGS. 6A to 6I, 7A to 7I, 8A to 8I, 9A to 9I, and 10A to 10I show the aberrations observed in the infinite-distance shooting condition in Examples 1 to 5, respectively. Of these diagrams, FIGS. 6A to 6C, 7A to 7C, 8A to 8C, 9A to 9C, and 10A to 10C show the aberrations observed at the wide-angle end [W]; FIGS. 6D to 6F, 7D to 7F, 8D to 8F, 9D to 9F, and 10D to 10F show the aberrations observed at the middle focal length [M]; and FIGS. 6G to 6I, 7G to 7I, 8G to 8I, 9G to 9I, and 10G to 10I show the aberrations observed at the telephoto end [T]. In the spherical aberration diagrams, the solid line (d) represents the d line and the broken line (SC) represents the sine condition. In the astigmatism diagrams, the solid line (DS) and the broken line (DM) represent the astigmatism on the sagittal plane and on the meridional plane, respectively. In Examples 1 to 5, Conditions (1) to (5) mentioned above are fulfilled.

FIGS. 20A to 20I, 21A to 21I, 22A to 22I, 23A to 23I, 24A to 24I, 25A to 25I, 26A to 26I, 27A to 27I, 28A to 28I, and 30A to 30I show the aberrations observed in the infinite-distance shooting condition in Examples 6 to 15, respectively. Of these diagrams, FIGS. 20A to 20C, 21A to 21C, 22A to 22C, 23A to 23C, 24A to 24C, 25A to 25C, 26A to 26C, 27A to 27C, 28A to 28C, and 30A to 30C show the aberrations observed at the wide-angle end [W]; FIGS. 20D to 20F, 21D to 21F, 22D to 22F, 23D to 23F, 24D to 24F, 25D to 25F, 26D to 26F, 27D to 27F, 28D to 28F, and 30D and 30F show the aberrations observed at the middle focal length [M]; and FIGS. 20G to 20I, 21G to 21I, 22G to 22I, 23G to 23I, 24G to 24I, 25G to 25I, 26G to 26I, 27G to 27I, 28G to 28I, and 30G to 30I show the aberrations observed at the telephoto end [T]. In the spherical aberration diagrams, the solid line (d) represents the d line and the broken line (SC) represents the sine condition. In the astigmatism diagrams, the solid line (DS) and the broken line (DM) represent the astigmatism on the sagittal plane and on the meridional plane, respectively. In Examples 6 to 15, the conditions mentioned above are fulfilled.

The variables used in Conditions (1) to (5) in Examples 1 to 5 are listed in Table 16.

The values corresponding to Conditions (1) to (5) in Examples 1 to 5 are listed in Table 17.

The values corresponding to Conditions (9) to (13) and (18) to (24) in Examples 6 to 15 are listed in Table 18.

The values corresponding to Conditions (7) and (8) to be fulfilled by the aspherical surface in Examples 1 to 5 are listed in Table 19. Note that Y represents the maximum height of the optical path on the aspherical surface.

The values corresponding to Conditions (15) to (17) to be fulfilled by the aspherical surface in Examples 6 to 15 are listed in Table 20. Note that Y represents the maximum height of the optical path on the aspherical surface.

TABLE 1

Construction Data of Example 1
f = 5.4 mm 7.5 mm 10.5 mm (Focal Length of the Entire Optical System)
FNO = 2.96 mm 3.24 mm 3.6 mm (F numbers)

| Radius of Curvature | Axial Distance | Refractive Index (Nd) | Abbe Number (d) |
|---|---|---|---|
| r1 = 11.333 | | | |
| | d1 = 0.779 | N1 = 1.85000 | v1 = 40.04 |
| r2 = 6.007 | | | |
| | d2 = 1.940 | | |
| r3* = 17.418 | | | |
| | d3 = 1.400 | N2 = 1.52510 | v2 = 56.38 |
| r4 = 6.396 | | | |
| | d4 = 1.895 | | |
| r5 = 7.432 | | | |
| | d5 = 1.763 | N3 = 1.84666 | v3 = 23.82 |
| r6 = 10.246 | | | |
| | d6 = 13.009 6.374 1.500 | | |
| r7 = ∞ (Aperture Stop) | | | |
| | d7 = 1.500 | | |
| r8 = 5.989 | | | |
| | d8 = 1.829 | N4 = 1.75450 | v4 = 51.57 |
| r9 = −125.715 | | | |
| | d9 = 1.268 | | |
| r10 = −12.153 | | | |
| | d10 = 0.635 | N5 = 1.75000 | v5 = 25.14 |
| r11 = 9.023 | | | |
| | d11 = 0.447 | | |
| r12* = 13.010 | | | |
| | d12 = 2.293 | N6 = 1.52510 | v6 = 56.38 |
| r13 = −6.778 | | | |
| | d13 = 1.000 2.559 4.786 | | |
| r14 = ∞ | | | |
| | d14 = 3.400 | N7 = 1.54426 | v7 = 69.60 |
| r15 = ∞ | | | |

[Aspherical Coefficients of 3rd Surface (r3)]
$\epsilon = 0.10000 \times 10$
$A4 = 0.21447 \times 10^{-3}$
$A6 = 0.50169 \times 10^{-5}$
$A8 = 0.14584 \times 10^{-6}$

[Aspherical Coefficients of 12th Surface (r12)]
$\epsilon = 0.10000 \times 10$
$A4 = -0.20572 \times 10^{-2}$
$A6 = -0.42994 \times 10^{-5}$
$A8 = -0.32617 \times 10^{-5}$

TABLE 2

Construction Data of Example 2
f = 5.4 mm 7.5 mm 10.5 mm (Focal Length of the Entire Optical System)
FNO = 2.96 mm 3.24 mm 3.6 mm (F numbers)

| Radius of Curvature | Axial Distance | Refractive Index (Nd) | Abbe Number (d) |
|---|---|---|---|
| r1 = 14.260 | | | |
| | d1 = 0.650 | N1 = 1.53359 | ν1 = 64.66 |
| r2 = 6.334 | | | |
| | d2 = 2.341 | | |
| r3* = 24.115 | | | |
| | d3 = 1.400 | N2 = 1.52510 | ν2 = 56.38 |
| r4 = 5.871 | | | |
| | d4 = 1.561 | | |
| r5 = 6.894 | | | |
| | d5 = 2.091 | N3 = 1.58340 | ν3 = 30.23 |
| r6 = 13.124 | | | |
| | d6 = 14.102 6.837 1.500 | | |
| r7 = ∞ (Aperture Stop) | | | |
| | d7 = 1.500 | | |
| r8 = 5.164 | | | |
| | d8 = 2.262 | N4 = 1.61555 | ν4 = 57.97 |
| r9 = −9.593 | | | |
| | d9 = 0.479 | | |
| r10* = −5.666 | | | |
| | d10 = 1.472 | N5 = 1.58340 | ν5 = 30.23 |
| r11 = 9.833 | | | |
| | d11 = 0.604 | | |
| r12* = 22.822 | | | |
| | d12 = 1.943 | N6 = 1.52510 | ν6 = 56.38 |
| r13 = −8.802 | | | |
| | d13 = 1.000 2.422 4.454 | | |
| r14 = ∞ | | | |
| | d14 = 3.400 | N7 = 1.54426 | ν7 = 69.60 |
| r15 = ∞ | | | |

[Aspherical Coefficients of 3rd Surface (r3)]
$\epsilon = 0.10000 \times 10$
$A4 = 0.16907 \times 10^{-3}$
$A6 = 0.35415 \times 10^{-5}$
$A8 = 0.80238 \times 10^{-7}$
[Aspherical Coefficients of 10th Surface (r10)]
$\epsilon = 0.10000 \times 10$
$A4 = 0.79103 \times 10^{-3}$
$A6 = 0.24186 \times 10^{-4}$
$A8 = 0.30525 \times 10^{-5}$
[Aspherical Coefficients of 12th Surface (r12)]
$\epsilon = 0.10000 \times 10$
$A4 = -0.25573 \times 10^{-2}$
$A6 = -0.15034 \times 10^{-5}$
$A8 = -0.18614 \times 10^{-4}$

TABLE 3

Construction Data of Example 3
f = 5.4 mm 7.5 mm 10.5 mm (Focal Length of the Entire Optical System)
FNO = 2.96 mm 3.24 mm 3.6 mm (F numbers)

| Radius of Curvature | Axial Distance | Refractive Index (Nd) | Abbe Number (d) |
|---|---|---|---|
| r1 = 11.551 | | | |
| | d1 = 1.213 | N1 = 1.75450 | ν1 = 51.57 |
| r2 = 6.152 | | | |
| | d2 = 2.230 | | |
| r3* = 21.819 | | | |
| | d3 = 1.400 | N2 = 1.52510 | ν2 = 56.38 |
| r4 = 6.113 | | | |
| | d4 = 1.835 | | |
| r5 = 7.256 | | | |
| | d5 = 2.216 | N3 = 1.69961 | ν3 = 26.60 |
| r6 = 11.287 | | | |
| | d6 = 13.126 6.424 1.500 | | |
| r7 = ∞ (Aperture Stop) | | | |
| | d7 = 1.500 | | |
| r8 = 5.207 | | | |
| | d8 = 2.259 | N4 = 1.61213 | ν4 = 58.19 |
| r9 = −9.240 | | | |
| | d9 = 0.467 | | |
| r10* = −5.774 | | | |
| | d10 = 1.430 | N5 = 1.58340 | ν5 = 30.23 |
| r11 = 9.548 | | | |
| | d11 = 0.601 | | |
| r12* = 22.409 | | | |
| | d12 = 1.984 | N6 = 1.52510 | ν6 = 56.38 |
| r13 = −8.485 | | | |
| | d13 = 1.000 2.495 4.630 | | |
| r14 = ∞ | | | |
| | d14 = 3.400 | N7 = 1.54426 | ν7 = 69.60 |
| r15 = ∞ | | | |

[Aspherical Coefficients of 3rd Surface (r3)]
$\epsilon = 0.10000 \times 10$
$A4 = 0.19262 \times 10^{-3}$
$A6 = 0.34894 \times 10^{-5}$
$A8 = 0.12515 \times 10^{-6}$
[Aspherical Coefficients of 10th Surface (r10)]
$\epsilon = 0.10000 \times 10$
$A4 = 0.43913 \times 10^{-3}$
$A6 = 0.33312 \times 10^{-4}$
$A8 = 0.24577 \times 10^{-5}$
[Aspherical Coefficients of 12th Surface (r12)]
$\epsilon = 0.10000 \times 10$
$A4 = -0.22305 \times 10^{-2}$
$A6 = -0.11486 \times 10^{-4}$
$A8 = -0.15332 \times 10^{-4}$

TABLE 4

Construction Data of Example 4
f = 5.4 mm 7.5 mm 10.5 mm (Focal Length of the Entire Optical System)
FNO = 2.9 mm 3.25 mm 3.6 mm (F numbers)

| Radius of Curvature | Axial Distance | Refractive Index (Nd) | Abbe Number (d) |
|---|---|---|---|
| r1 = 13.912 | | | |
| | d1 = 1.500 | N1 = 1.75450 | ν1 = 51.57 |
| r2 = 6.626 | | | |
| | d2 = 2.111 | | |
| r3 = 25.350 | | | |
| | d3 = 1.000 | N2 = 1.75450 | ν2 = 51.57 |
| r4 = 7.001 | | | |
| | d4 = 0.893 | | |
| r5* = 14.283 | | | |
| | d5 = 4.843 | N3 = 1.58340 | ν3 = 30.23 |
| r6* = −45.283 | | | |
| | d6 = 15.765 7.542 1.500 | | |
| r7 = ∞ (Aperture Stop) | | | |
| | d7 = 1.500 | | |
| r8 = 5.964 | | | |
| | d8 = 4.216 | N4 = 1.65656 | ν4 = 55.63 |
| r9 = −7.373 | | | |
| | d9 = 0.208 | | |
| r10 = −6.131 | | | |
| | d10 = 1.300 | N5 = 1.58340 | ν5 = 30.23 |
| r11* = 9.768 | | | |
| | d11 = 2.852 | | |
| r12 = −77.516 | | | |
| | d12 = 1.708 | N6 = 1.52200 | ν6 = 65.93 |
| r13 = −8.818 | | | |
| | d13 = 1.000 2.668 5.052 | | |
| r14 = ∞ | | | |
| | d14 = 3.400 | N7 = 1.54426 | ν7 = 69.60 |
| r15 = ∞ | | | |

[Aspherical Coefficients of 5th Surface (r5)]
$\epsilon = 0.10000 \times 10$
$A4 = 0.90348 \times 10^{-4}$

TABLE 4-continued

Construction Data of Example 4
f = 5.4 mm 7.5 mm 10.5 mm (Focal Length of the Entire Optical System)
FNO = 2.9 mm 3.25 mm 3.6 mm (F numbers)

A6 = 0.13458 × 10$^{-5}$
A8 = 0.14476 × 10$^{-6}$
[Aspherical Coefficients of 6th Surface (r6)]
$\epsilon$ = 0.10000 × 10
A4 = −0.32219 × 10$^{-3}$
A6 = −0.25483 × 10$^{-5}$
A8 = −0.86784 × 10$^{-7}$
[Aspherical Coefficients of 11th Surface (r11)]
$\epsilon$ = 0.10000 × 10
A4 = 0.20489 × 10$^{-2}$
A6 = 0.27321 × 10$^{-4}$
A8 = 0.40971 × 10$^{-5}$
A10 = −0.20451 × 10$^{-6}$

TABLE 5

Construction Data of Example 5
f = 5.4 mm 7.5 mm 10.5 mm (Focal Length of the Entire Optical System)
FNO = 3.18 mm 3.55 mm 4.08 mm (F numbers)

| Radius of Curvature | Axial Distance | Refractive Index (Nd) | Abbe Number (d) |
|---|---|---|---|
| r1 = 10.456 | | | |
| | d1 = 2.128 | N1 = 1.85000 | ν1 = 40.04 |
| r2 = 3.870 | | | |
| | d2 = 2.166 | | |
| r3* = 16.226 | | | |
| | d3 = 1.400 | N2 = 1.52510 | ν2 = 56.38 |
| r4 = 6.827 | | | |
| | d4 = 1.322 | | |
| r5 = 8.144 | | | |
| | d5 = 1.514 | N3 = 1.83350 | ν3 = 21.00 |
| r6 = 13.791 | | | |
| | d6 = 8.994 4.674 1.500 | | |
| r7 = ∞ (Aperture Stop) | | | |
| | d7 = 1.500 | | |
| r8 = 5.950 | | | |
| | d8 = 1.897 | N4 = 1.74989 | ν4 = 51.73 |
| r9 = −43.969 | | | |
| | d9 = 1.242 | | |
| r10 = −11.144 | | | |
| | d10 = 0.753 | N5 = 1.84714 | ν5 = 25.28 |
| r11 = 10.245 | | | |
| | d11 = 0.400 | | |
| r12* = 12.590 | | | |
| | d12 = 2.297 | N6 = 1.52510 | ν6 = 56.38 |
| r13 = −6.634 | | | |
| | d13 = 1.000 3.314 6.620 | | |
| r14 = ∞ | | | |
| | d14 = 3.400 | N7 = 1.54426 | ν7 = 69.60 |
| r15 = ∞ | | | |

[Aspherical Coefficients of 3rd Surface (r3)]
$\epsilon$ = 0.10000 × 10
A4 = 0.13045 × 10$^{-2}$
A6 = 0.11643 × 10$^{-4}$
A8 = 0.51406 × 10$^{-5}$
[Aspherical Coefficients of 12th Surface (r12)]
$\epsilon$ = 0.10000 × 10
A4 = −0.22747 × 10$^{-2}$
A6 = −0.36716 × 10$^{-5}$
A8 = −0.32887 × 10$^{-6}$

TABLE 6

Construction Data of Example 6
f = 5.4 mm 7.5 mm 10.5 mm (Focal Length of the Entire Optical System)
FNO = 2.74 3.11 3.60 (F numbers)

| Radius of Curvature | Axial Distance | Refractive Index (Nd) | Abbe Number (d) |
|---|---|---|---|
| r1 = 13.380 | | | |
| | d1 = 0.650 | N1 = 1.75450 | ν1 = 51.57 |
| r2 = 5.890 | | | |
| | d2 = 1.499 | | |
| r3* = 12.328 | | | |
| | d3 = 1.400 | N2 = 1.52510 | ν2 = 56.38 |
| r4 = 5.632 | | | |
| | d4 = 1.632 | | |
| r5 = 7.068 | | | |
| | d5 = 1.753 | N3 = 1.84777 | ν3 = 27.54 |
| r6 = 10.246 | | | |
| | d6 = 10.406 5.264 1.500 | | |
| r7 = ∞ (Aperture Stop) | | | |
| | d7 = 1.500 | | |
| r8 = 5.643 | | | |
| | d8 = 1.901 | N4 = 1.79073 | ν4 = 46.15 |
| r9 = −74.805 | | | |
| | d9 = 0.921 | | |
| r10 = −12.842 | | | |
| | d10 = 0.600 | N5 = 1.72145 | ν5 = 25.50 |
| r11 = 5.928 | | | |
| | d11 = 0.400 | | |
| r12* = 11.144 | | | |
| | d12 = 2.170 | N6 = 1.52510 | ν6 = 56.38 |
| r13 = −9.099 | | | |
| | d13 = 1.000 3.519 7.154 | | |
| r14 = 11.107 | | | |
| | d14 = 3.164 | N7 = 1.51680 | ν7 = 64.20 |
| r15 = 56.703 | | | |
| | d15 = 0.796 | | |
| r16 = ∞ | | | |
| | d16 = 3.400 | N8 = 1.54426 | ν8 = 69.60 |
| r17 = ∞ | | | |

[Aspherical Coefficients of 3rd Surface (r3)]
$\epsilon$ = 0.10000 × 10
A4 = 0.38905 × 10$^{-3}$
A6 = 0.24379 × 10$^{-5}$
A8 = 0.38282 × 10$^{-6}$
[Aspherical Coefficients of 12th Surface (r12)]
$\epsilon$ = 0.10000 × 10
A4 = −0.13386 × 10$^{-2}$
A6 = −0.11975 × 10$^{-4}$
A8 = −0.53773 × 10$^{-5}$

TABLE 7

Construction Data of Example 7
f = 5.4 mm 7.5 mm 10.5 mm (Focal Length of the Entire Optical System)
FNO = 2.73 3.10 3.60 (F numbers)

| Radius of Curvature | Axial Distance | Refractive Index (Nd) | Abbe Number (d) |
|---|---|---|---|
| r1 = 14.718 | | | |
| | d1 = 0.650 | N1 = 1.75450 | ν1 = 51.57 |
| r2 = 6.639 | | | |
| | d2 = 1.307 | | |
| r3* = 11.594 | | | |
| | d3 = 1.400 | N2 = 1.52510 | ν2 = 56.38 |
| r4 = 5.294 | | | |
| | d4 = 1.465 | | |
| r5 = 6.937 | | | |
| | d5 = 1.858 | N3 = 1.84759 | ν3 = 26.85 |
| r6 = 10.034 | | | |
| | d6 = 10.621 5.340 1.500 | | |
| r7 = ∞ (Aperture Stop) | | | |
| | d7 = 1.500 | | |
| r8 = 6.969 | | | |
| | d8 = 2.905 | N4 = 1.85000 | ν4 = 40.04 |

TABLE 7-continued

Construction Data of Example 7
f = 5.4 mm 7.5 mm 10.5 mm (Focal Length of the Entire Optical System)
FNO = 2.73 3.10 3.60 (F numbers)

| Radius of Curvature | Axial Distance | Refractive Index (Nd) | Abbe Number (d) |
|---|---|---|---|
| r9 = −11.743 | | | |
| | d9 = 0.210 | | |
| r10 = −8.399 | | | |
| | d10 = 1.855 | N5 = 1.72131 | ν5 = 25.51 |
| r11 = 5.522 | | | |
| | d11 = 0.400 | | |
| r12 = 11.032 | | | |
| | d12 = 2.012 | N6 = 1.75450 | ν6 = 51.57 |
| r13 = −21.657 | | | |
| | d13 = 1.000 3.398 6.919 | | |
| r14* = 8.536 | | | |
| | d14 = 3.241 | N7 = 1.52510 | ν7 = 56.38 |
| r15 = 29.006 | | | |
| | d15 = 0.676 | | |
| r16 = ∞ | | | |
| | d16 = 3.400 | N8 = 1.54426 | ν8 = 69.60 |
| r17 = ∞ | | | |

[Aspherical Coefficients of 3rd Surface (r3)]
$\epsilon = 0.10000 \times 10$
$A4 = 0.35342 \times 10^{-3}$
$A6 = 0.71258 \times 10^{-6}$
$A8 = 0.33647 \times 10^{-6}$
[Aspherical Coefficients of 14th Surface (r14)]
$\epsilon = 0.10000 \times 10$
$A4 = -0.23473 \times 10^{-3}$
$A6 = 0.43912 \times 10^{-5}$
$A8 = 0.10409 \times 10^{-6}$

TABLE 8

Construction Data of Example 8
f = 5.4 mm 7.5 mm 10.5 mm (Focal Length of the Entire Optical System)
FNO = 2.75 3.10 3.60 (F numbers)

| Radius of Curvature | Axial Distance | Refractive Index (Nd) | Abbe Number (d) |
|---|---|---|---|
| r1* = 14.652 | | | |
| | d1 = 1.200 | N1 = 1.58340 | ν1 = 30.23 |
| r2 = 8.289 | | | |
| | d2 = 1.623 | | |
| r3 = 26.068 | | | |
| | d3 = 0.900 | N2 = 1.79271 | ν2 = 45.90 |
| r4 = 5.496 | | | |
| | d4 = 1.179 | | |
| r5 = 7.356 | | | |
| | d5 = 1.921 | N3 = 1.84666 | ν3 = 23.82 |
| r6 = 15.373 | | | |
| | d6 = 10.224 5.176 1.500 | | |
| r7 = ∞ (Aperture Stop) | | | |
| | d7 = 1.500 | | |
| r8 = 7.124 | | | |
| | d8 = 3.411 | N4 = 1.85000 | ν4 = 40.04 |
| r9 = −11.538 | | | |
| | d9 = 0.154 | | |
| r10 = −8.339 | | | |
| | d10 = 1.713 | N5 = 1.72418 | ν5 = 25.37 |
| r11 = 5.686 | | | |
| | d11 = 0.401 | | |
| r12 = 10.731 | | | |
| | d12 = 2.078 | N6 = 1.75450 | ν6 = 51.57 |
| r13 = −18.326 | | | |
| | d13 = 1.000 3.307 6.708 | | |
| r14* = 8.148 | | | |
| | d14 = 3.002 | N7 = 1.52510 | ν7 = 56.38 |
| r15 = 16.995 | | | |
| | d15 = 0.795 | | |
| r16 = ∞ | | | |
| | d16 = 3.400 | N8 = 1.54426 | ν8 = 69.60 |
| r17 = ∞ | | | |

[Aspherical Coefficients of 1st Surface (r1)]
$\epsilon = 0.10000 \times 10$

TABLE 8-continued

Construction Data of Example 8
f = 5.4 mm 7.5 mm 10.5 mm (Focal Length of the Entire Optical System)
FNO = 2.75 3.10 3.60 (F numbers)

$A4 = 0.15951 \times 10^{-3}$
$A6 = 0.14779 \times 10^{-6}$
$A8 = 0.56026 \times 10^{-7}$
[Aspherical Coefficients of 14th Surface (r14)]
$\epsilon = 0.10000 \times 10$
$A4 = -0.27776 \times 10^{-3}$
$A6 = 0.23365 \times 10^{-5}$
$A8 = 0.19731 \times 10^{-6}$

TABLE 9

Construction Data of Example 9
f = 5.4 mm 7.5 mm 10.5 mm (Focal Length of tile Entire Optical System)
FNO = 2.73 3.10 3.60 (F numbers)

| Radius of Curvature | Axial Distance | Refractive Index (Nd) | Abbe Number (d) |
|---|---|---|---|
| r1 = 52.355 | | | |
| | d1 = 1.100 | N1 = 1.72677 | ν1 = 52.55 |
| r2 = 6.927 | | | |
| | d2 = 3.324 | | |
| r3* = 23.902 | | | |
| | d3 = 1.940 | N2 = 1.58340 | ν2 = 30.23 |
| r4 = −100.448 | | | |
| | d4 = 14.827 7.138 1.500 | | |
| r5 = ∞ (Aperture Stop) | | | |
| | d5 = 1.500 | | |
| r6 = 5.036 | | | |
| | d6 = 3.339 | N3 = 1.77742 | ν3 = 47.95 |
| r7 = −12.586 | | | |
| | d7 = 0.234 | | |
| r8 = −10.396 | | | |
| | d8 = 0.800 | N4 = 1.79850 | ν4 = 22.60 |
| r9 = 16.524 | | | |
| | d9 = 0.740 | | |
| r10 = −7.142 | | | |
| | d10 = 1.200 | N5 = 1.58340 | ν5 = 30.23 |
| r11* = −26.834 | | | |
| | d11 = 1.000 2.921 5.663 | | |
| r12 = 15.086 | | | |
| | d12 = 2.096 | N6 = 1.48749 | ν6 = 70.44 |
| r13 = −14.941 | | | |
| | d13 = 0.500 | | |
| r14 = ∞ | | | |
| | d14 = 3.400 | N7 = 1.54426 | ν7 = 69.60 |
| r15 = ∞ | | | |

[Aspherical Coefficients of 3rd Surface (r3)]
$\epsilon = 0.10000 \times 10$
$A4 = 0.24908 \times 10^{-3}$
$A6 = -0.62198 \times 10^{-7}$
$A8 = 0.10295 \times 10^{-6}$
[Aspherical Coefficients of 11th Surface (r11)]
$\epsilon = 0.10000 \times 10$
$A4 = 0.39625 \times 10^{-2}$
$A6 = 0.16585 \times 10^{-3}$
$A8 = 0.13563 \times 10^{-4}$

TABLE 10

Construction Data of Example 10
f = 5.4 mm 7.5 mm 10.5 mm (Focal Length of the Entire Optical System)
FNO = 2.75 3.11 3.60 (F numbers)

| Radius of Curvature | Axial Distance | Refractive Index (Nd) | Abbe Number (d) |
|---|---|---|---|
| r1* = 17.928 | | | |
| | d1 = 1.200 | N1 = 1.58340 | ν1 = 30.23 |

TABLE 10-continued

Construction Data of Example 10
f = 5.4 mm 7.5 mm 10.5 mm (Focal Length of the Entire Optical System)
FNO = 2.75 3.11 3.60 (F numbers)

| | | | |
|---|---|---|---|
| r2 = 9.608 | | | |
| | d2 = 1.325 | | |
| r3 = 19.410 | | | |
| | d3 = 0.900 | N2 = 1.80280 | ν2 = 44.68 |
| r4 = 5.204 | | | |
| | d4 = 1.288 | | |
| r5 = 7.294 | | | |
| | d5 = 1.940 | N3 = 1.84666 | ν3 = 23.82 |
| r6 = 14.586 | | | |
| | d6 = 10.102 5.348 1.500 | | |
| r7 = ∞ (Aperture Stop) | | | |
| | d7 = 1.500 | | |
| r8 = 6.594 | | | |
| | d8 = 4.206 | N4 = 1.81063 | ν4 = 43.80 |
| r9 = −10.411 | | | |
| | d9 = 0.208 | | |
| r10 = −7.270 | | | |
| | d10 = 0.600 | N5 = 1.70098 | ν5 = 26.53 |
| r11 = 5.447 | | | |
| | d11 = 0.504 | | |
| r12 = 10.684 | | | |
| | d12 = 2.062 | N6 = 1.75450 | ν6 = 51.57 |
| r13 = −20.769 | | | |
| | d13 = 1.000 3.880 6.996 | | |
| r14* = 6.351 | | | |
| | d14 = 2.209 | N7 = 1.52510 | ν7 = 56.38 |
| r15 = 12.184 | | | |
| | d15 = 1.055 0.800 1.067 | | |
| r16 = ∞ | | | |
| | d16 = 3.400 | N8 = 1.54426 | ν8 = 69.60 |
| r17 = ∞ | | | |

[Aspherical Coefficients of 1st Surface (r1)]
ε = 0.10000 × 10
A4 = 0.19398 × 10$^{-3}$
A6 = 0.47895 × 10$^{-6}$
A8 = 0.46069 × 10$^{-7}$
[Aspherical Coefficients of 14th Surface (r14)]
ε = 0.10000 × 10
A4 = −0.37579 × 10$^{-3}$
A6 = −0.11089 × 10$^{-5}$
A8 = 0.87379 × 10$^{-7}$

TABLE 11

Construction Data of Example 11
f = 5.4 mm 7.5 mm 10.5 mm (Focal Length of the Entire Optical System)
FNO = 2.97 3.27 3.60 (F numbers)

| Radius of Curvature | Axial Distance | Refractive Index (Nd) | Abbe Number (d) |
|---|---|---|---|
| r1 = −112.214 | | | |
| | d1 = 1.200 | N1 = 1.63347 | ν1 = 56.87 |
| r2 = 7.682 | | | |
| | d2 = 1.473 | | |
| r3* = 17.799 | | | |
| | d3 = 2.175 | N2 = 1.58340 | ν2 = 30.23 |
| r4 = 274.206 | | | |
| | d4 = 16.482 8.078 1.500 | | |
| r5 = ∞(Aperture Stop) | | | |
| | d5 = 1.500 | | |
| r6 = 5.066 | | | |
| | d6 = 2.164 | N3 = 1.84746 | ν4 = 40.25 |
| r7 = −15.255 | | | |
| | d7 = 0.208 | | |
| r8 = −13.752 | | | |
| | d8 = 0.800 | N4 = 1.79850 | ν5 = 22.60 |
| r9 = 7.640 | | | |
| | d9 = 0.352 | | |
| r10* = 8.419 | | | |
| | d10 = 1.200 | N5 = 1.58340 | ν6 = 30.23 |

TABLE 11-continued

Construction Data of Example 11
f = 5.4 mm 7.5 mm 10.5 mm (Focal Length of the Entire Optical System)
FNO = 2.97 3.27 3.60 (F numbers)

| | | | |
|---|---|---|---|
| r11 = 4.700 | | | |
| | d11 = 1.000 1.802 2.808 | | |
| r12 = 40.534 | | | |
| | d12 = 2.262 | N6 = 1.51838 | ν7 = 66.35 |
| r13 * = −6.756 | | | |
| | d13 = 1.131 2.007 3.472 | | |
| r14 = ∞ | | | |
| | d14 = 3.400 | N7 = 1.54426 | ν8 = 69.60 |
| r15 = ∞ | | | |

[Aspherical Coefficients of 3rd Surface (r3)]
ε = 0.10000 × 10
A4 = 0.24372 × 10$^{-3}$
A6 = −0.10309 × 10$^{-6}$
A8 = 0.84837 × 10$^{-7}$
[Aspherical Coefficients of 10th Surface (r10)]
ε = 0.10000 × 10
A4 = −0.35107 × 10$^{-2}$
A6 = −0.17279 × 10$^{-3}$
A8 = −0.80824 × 10$^{-5}$
[Aspherical Coefficients of 13th Surface (r13)]
ε = 0.10000 × 10
A4 = 0.11613 × 10$^{-3}$
A6 = −0.34635 × 10$^{-4}$
A8 = 0.66386 × 10$^{-6}$

TABLE 12

Construction Data of Example 12
f = 5.4 mm 8.0 mm 12.0 mm (Focal Length of the Entire Optical System)
FNO = 2.55 2.95 3.60 (F numbers)

| Radius of Curvature | Axial Distance | Refractive Index (Nd) | Abbe Number (d) |
|---|---|---|---|
| r1 = 64.355 | | | |
| | d1 = 0.650 | N1 = 1.48749 | ν1 = 70.44 |
| r2 = 9.616 | | | |
| | d2 = 1.136 | | |
| r3* = 15.072 | | | |
| | d3 = 1.400 | N2 = 1.52510 | ν2 = 56.38 |
| r4 = 6.352 | | | |
| | d4 = 1.939 | | |
| r5 = 8.584 | | | |
| | d5 = 2.060 | N3 = 1.84877 | ν3 = 32.01 |
| r6 = 12.547 | | | |
| | d6 = 15.531 7.207 1.500 | | |
| r7 = ∞Aperture Stop) | | | |
| | d7 = 1.500 | | |
| r8 = 5.666 | | | |
| | d8 = 3.346 | N4 = 1.75450 | ν4 = 51.57 |
| r9 = −8.847 | | | |
| | d9 = 0.100 | | |
| r10 = −7.390 | | | |
| | d10 = 0.600 | N5 = 1.58340 | ν5 = 30.23 |
| r11 = 4.818 | | | |
| | d11 = 0.400 | | |
| r12* = 6.048 | | | |
| | d12 = 2.459 | N6 = 1.52510 | ν6 = 56.38 |
| r13 = 9.906 | | | |
| | d13 = 1.000 3.334 6.995 | | |
| r14 = 11.941 | | | |
| | d14 = 1.979 | N7 = 1.52510 | ν7 = 56.38 |
| r15* = −29.235 | | | |
| | d15 = 0.500 | | |
| r16 = ∞ | | | |
| | d16 = 3.400 | N8 = 1.54426 | ν8 = 69.60 |
| r17 = ∞ | | | |

TABLE 12-continued

Construction Data of Example 12
f = 5.4 mm 8.0 mm 12.0 mm (Focal Length of the Entire Optical System)
FNO = 2.55 2.95 3.60 (F numbers)

[Aspherical Coefficients of 3rd Surface (r3)]

$\epsilon = 0.10000 \times 10$
$A4 = 0.17978 \times 10^{-3}$
$A6 = -0.30828 \times 10^{-6}$
$A8 = 0.71904 \times 10^{-7}$

[Aspherical Coefficients of 12th Surface (r12)]

$\epsilon$ $0.10000 \times 10$
$A4 = -0.18066 \times 10^{-2}$
$A6 = -0.54257 \times 10^{-4}$
$A8 = -0.76508 \times 10^{-5}$

[Aspherical Coefficients of 15th Surface (r15)]

$\epsilon = 0.10000 \times 10$
$A4 = 0.29756 \times 10^{-3}$
$A6 = -0.62953 \times 10^{-5}$
$A8 = -0.77785 \times 10^{-7}$

TABLE 13

Construction Data of Example 13
f = 5.4 mm 8.8 mm 14.0mm (Focal Length of the Entire Optical System)
FNO = 2.34 2.84 3.60 (F numbers)

| Radius of Curvature | Axial Distance | Refractive Index (Nd) | Abbe Number (d) |
|---|---|---|---|
| r1 = 25.623 | | | |
| | d1 = 0.650 | N1 = 1.48749 | ν1 = 70.44 |
| r2 = 9.290 | | | |
| | d2 = 1.626 | | |
| r3* = 19.577 | | | |
| | d3 = 1.400 | N2 = 1.52510 | ν2 = 56.38 |
| r4 = 5.973 | | | |
| | d4 = 2.273 | | |
| r5 = 7.949 | | | |
| | d5 = 2.008 | N3 = 1.84807 | ν3 = 28.75 |
| r6 = 10.541 | | | |
| | d6 = 16.801 7.154 1.500 | | |
| r7 = ∞(Aperture Stop) | | | |
| | d7 = 1.500 | | |
| r8 = 5.107 | | | |
| | d8 = 2.743 | N4 = 1.64626 | ν4 = 56.17 |
| r9 = −9.178 | | | |
| | d9 = 0.100 | | |
| r10 = −8.533 | | | |
| | d10 = 0.600 | N5 = 1.58340 | ν5 = 30.23 |
| r11 = 7.962 | | | |
| | d11 = 0.849 | | |
| r12* = 7.572 | | | |
| | d12 = 1.401 | N6 = 1.52510 | ν6 = 56.38 |
| r13 = 8.290 | | | |
| | d13 = 1.000 4.278 9.371 | | |
| r14* = 9.062 | | | |
| | d14 = 1.423 | N7 = 1.58340 | ν7 = 30.23 |
| r15 = 6.924 | | | |
| | d15 = 0.747 | | |
| r16 = 11.941 | | | |
| | d16 = 1.979 | N8 = 1.52510 | ν8 = 56.38 |
| r17* = −29.488 | | | |
| | d17 = 0.500 | | |
| r18 = ∞ | | | |
| | d18 = 3.400 | N9 = 1.54426 | ν9 = 69.60 |
| r19 = ∞ | | | |

[Aspherical Coefficients of 3rd Surface (r3)]

$\epsilon = 0.10000 \times 10$
$A4 = 0.16055 \times 10^{-3}$
$A6 = 0.48397 \times 10^{-7}$
$A8 = 0.67121 \times 10^{-7}$

TABLE 13-continued

Construction Data of Example 13
f = 5.4 mm 8.8 mm 14.0mm (Focal Length of the Entire Optical System)
FNO = 2.34 2.84 3.60 (F numbers)

[Aspherical Coefficients of 12th Surface (r12)]

$\epsilon = 0.10000 \times 10$
$A4 = -0.25048 \times 10^{-2}$
$A6 = -0.87701 \times 10^{-4}$
$A8 = -0.12082 \times 10^{-4}$

[Aspherical Coefficients of 14th Surface (r14)]

$\epsilon = 0.10000 \times 10$
$A4 = -0.52484 \times 10^{-3}$
$A6 = 0.58442 \times 10^{-5}$
$A8 = 0.87159 \times 10^{-8}$

[Aspherical Coefficients of 17th Surface (r17)]

$\epsilon = 0.10000 \times 10$
$A4 = -0.91828 \times 10^{-3}$
$A6 = -0.59033 \times 10^{-5}$
$A8 = 0.27335 \times 10^{-6}$

TABLE 14

Construction Data of Example 14
f = 5.4 mm 7.5 mm 13.5 mm (Focal Length of the Entire Optical System)
FNO = 2.08 2.48 3.60 (F numbers)

| Radius of Curvature | Axial Distance | Refractive Index (Nd) | Abbe Number (d) |
|---|---|---|---|
| r1 = 14.018 | | | |
| | d1 = 0.650 | N1 = 1.74388 | ν1 = 51.93 |
| r2 = 6.286 | | | |
| | d2 = 1.790 | | |
| r3* = 17.191 | | | |
| | d3 = 1.400 | N2 = 1.52510 | ν2 = 56.38 |
| r4 = 5.770 | | | |
| | d4 = 0.907 | | |
| r5 = 6.726 | | | |
| | d5 = 1.953 | N3 = 1.84666 | ν3 = 23.82 |
| r6 = 10.531 | | | |
| | d6 = 9.731 5.843 1.500 | | |
| r7 = ∞(Aperture Stop) | | | |
| | d7 = 1.500 | | |
| r8 = 6.489 | | | |
| | d8 = 1.774 | N4 = 1.85000 | ν4 = 40.04 |
| r9 = 52.968 | | | |
| | d9 = 0.665 | | |
| r10 = −31.304 | | | |
| | d10 = 0.600 | N5 = 1.77185 | ν5 = 23.46 |
| r11 = 6.642 | | | |
| | d11 = 0.400 | | |
| r12* = 11.190 | | | |
| | d12 = 2.101 | N6 = 1.52510 | ν6 = 56.38 |
| r13 = −9.334 | | | |
| | d13 = 1.000 5.310 15.247 | | |
| r14 = −10.861 | | | |
| | d14 = 1.200 | N7 = 1.58340 | ν7 = 30.23 |
| r15* = 16.708 | | | |
| | d15 = 0.100 | | |
| r16 = 12.354 | | | |
| | d16 = 2.934 | N8 = 1.84353 | ν8 = 40.59 |
| r17 = −10.876 | | | |
| | d17 = 2.914 2.385 0.717 | | |
| r18 = ∞ | | | |
| | d18 = 3.400 | N9 = 1.54426 | ν9 = 69.60 |
| r19 = ∞ | | | |

[Aspherical Coefficients of 3rd Surface (r3)]

$\epsilon = 0.10000 \times 10$
$A4 = 0.28799 \times 10^{-3}$
$A6 = 0.40089 \times 10^{-5}$
$A8 = 0.14823 \times 10^{-6}$ TABLE 14-continued Construction Data of Example 14
f = 5.4 mm 7.5 mm 13.5 mm (Focal Length of the Entire Optical System)
FNO = 2.08 2.48 3.60 (F numbers)

[Aspherical Coefficients of 12th Surface (r12)]

$\epsilon = 0.10000 \times 10$
$A4 = -0.62816 \times 10^{-3}$
$A6 = -0.22891 \times 10^{-4}$
$A8 = 0.42945 \times 10^{-6}$

[Aspherical Coefficients of 15th Surface (r15)]

$\epsilon = 0.10000 \times 10$
$A4 = 0.60130 \times 10^{-3}$
$A6 = -0.42374 \times 10^{-5}$
$A8 = 0.11268 \times 10^{-7}$

TABLE 15

Construction Data of Example 15
f = 5.4 mm 8.4 mm 15.6 mm (Focal Length of the Entire Optical System)
FNO = 2.57 3.04 4.20 (F numbers)

| Radius of Curvature | Axial Distance | Refractive Index (Nd) | Abbe Number (d) |
|---|---|---|---|
| r1 = 34.564 | | | |
| | d1 = 1.600 | N1 = 1.52510 | ν1 = 56.38 |
| r2 = 7.185 | | | |
| | d2 = 3.500 | | |
| r3* = 10.666 | | | |
| | d3 = 2.344 | N2 = 1.75000 | ν2 = 25.14 |
| r4 = 17.516 | | | |
| | d4 = 22.572 11.179 1.713 | | |
| r5 = ∞ | | | |
| | d5 = 1.500 | | |
| r6 = 8.000 | | | |
| | d6 = 2.941 | N3 = 1.80420 | ν3 = 46.50 |
| r7 = -8.598 | | | |
| | d7 = 0.010 | N4 = 1.51400 | ν4 = 42.83 |
| r8 = -8.598 | | | |
| | d8 = 0.600 | N5 = 1.70055 | ν5 = 30.11 |
| r9 = 8.182 | | | |
| | d9 = 0.200 | | |
| r10* = 5.244 | | | |
| | d10 = 3.249 | N6 = 1.52510 | ν6 = 56.38 |
| r11* = 6.000 | | | |
| | d11 = 2.740 5.844 13.277 | | |
| r12 = 21.195 | | | |
| | d12 = 2.000 | N7 = 1.48749 | ν7 = 70.44 |
| r13 = -16.672 | | | |
| | d13 = 1.086 | | |
| r14 = ∞ | | | |
| | d14 = 3.400 | N8 = 1.51680 | ν8 = 64.20 |
| r15 = ∞ | | | |

[Aspherical Coefficients of 3rd Surface (r1)]

$\epsilon = 0.10000 \times 10$
$A4 = 0.43400 \times 10^{-3}$
$A6 = -0.55461 \times 10^{-5}$
$A8 = 0.27915 \times 10^{-7}$

[Aspherical Coefficients of 12th Surface (r2)]

$\epsilon = 0.10000 \times 10$
$A4 = 0.26861 \times 10^{-3}$
$A6 = 0.25040 \times 10^{-5}$
$A8 = 0.23353 \times 10^{-6}$

[Aspherical Coefficients of 15th Surface (r10)]

$\epsilon = 0.10000 \times 10$
$A4 = -0.30306 \times 10^{-3}$
$A6 = -0.13415 \times 10^{-4}$
$A8 = -0.19911 \times 10^{-5}$ TABLE 15-continued Construction Data of Example 15
f = 5.4 mm 8.4 mm 15.6 mm (Focal Length of the Entire Optical System)
FNO = 2.57 3.04 4.20 (F numbers)

[Aspherical Coefficients of 15th Surface (r11)]

$\epsilon = 0.10000 \times 10$
$A4 = 0.19342 \times 10^{-2}$
$A6 = 0.59893 \times 10^{-4}$
$A8 = -0.42081 \times 10^{-5}$

TABLE 16

The variables used in Conditions (1) to (5) in Examples 1 to 5

| | φ1 | φ2 | φW | | |
|---|---|---|---|---|---|
| Example 1 | 0.076171 | 0.102604 | 0.185185 | | |
| | φPi | hi | φPi/φW × hi | Sum |
| Example 1 G2: | -0.04968 | 1.088763 | -0.292107 | |
| G6: | 0.11313 | 1.264821 | 0.7726821 | 0.480575 |
| | φ1 | φ2 | φW | | |
| Example 2 | 0.069512 | 0.102665 | 0.185162 | | |
| | φPi | hi | φPi/φW × hi | Sum |
| Example 2 G2: | -0.06587 | 1.090648 | -0.387944 | |
| G3: | 0.045137 | 1.299594 | 0.3167591 | |
| G5: | -0.16797 | 1.270288 | -1.152222 | |
| G6: | 0.080916 | 1.2079 | 0.5277862 | -0.69562 |
| | φ1 | φ2 | φW | | |
| Example 3 | 0.07421 | 0.104252 | 0.185186 | | |
| | φPi | hi | φPi/φW × hi | Sum |
| Example 3 G2: | -0.05994 | 1.070319 | -0.346422 | |
| G3: | -0.16771 | 1.288669 | -1.167062 | |
| G5: | 0.083429 | 1.23342 | 0.555676 | -0.95781 |
| | φ1 | φ2 | | | |
| Example 4 | 0.070779 | 0.089085 | 0.185184 | | |
| | φPi | hi | φPi/φW × hi | Sum |
| Example 4 G3: | 0.05212 | 1.068396 | 0.3006979 | |
| G5: | -0.15954 | 1.348671 | -1.161906 | -0.86121 |
| | φ1 | φ2 | φW | | |
| Example 5 | 0.115 | 0.104369 | 0.185185 | | |
| | φPi | hi | φPi/φW × hi | Sum |
| Example 5 G2: | -0.04227 | 1.161585 | -0.265113 | |
| G6: | 0.11589 | 1.553375 | 0.9721086 | 0.706996 |

TABLE 17

The values corresponding to Conditions (1) to (5) in Examples 1 to 5

| | |φ1/φW| | φ2/φW | |φP/φ1| | |φP/φ2| | ΣφPi/φW × hi |
|---|---|---|---|---|---|
| Example 1 | 0.41 | 0.55 | G2: 0.65 | G6: 1.10 | 0.48 |
| Example 2 | 0.38 | 0.55 | G2: 0.95 | G5: 1.64 | -0.70 |
| | | | G3: 0.65 | G6: 0.79 | |
| Example 3 | 0.40 | 0.56 | G2: 0.81 | G5: 1.61 | -0.96 |
| | | | | G6: 0.80 | |
| Example 4 | 0.38 | 0.48 | G3: 0.74 | G5: 1.79 | -0.86 |
| Example 5 | 0.62 | 0.56 | G2: 0.37 | G6: 1.11 | 0.71 |

TABLE 18

The values corresponding to Conditions (9) to (13) and (18) to (2φ in Examples 6 to 15

| | | |φP/φW| | |φP/φ1| | |φP/φ2| | |φP/φ3| | M3/M2 |
|---|---|---|---|---|---|---|
| Example 6 | G2: | 0.25 | 0.63 | | | 0.00 |
| | G6: | 0.55 | | 1.10 | | |
| Example 7 | G2: | 0.27 | 0.72 | | | 0.00 |
| | G7: | 0.25 | | | 1.00 | |
| Example 8 | G1: | 0.15 | 0.39 | | | 0.00 |
| | G7: | 0.20 | | | 1.00 | |

TABLE 18-continued

The values corresponding to Conditions (9) to (13) and (18) to (2φin Examples 6 to 15

| | | | | | |
|---|---|---|---|---|---|
| Example 9 | G2: | 0.16 | 0.59 | | 0.00 |
| | G5: | 0.32 | | 0.68 | |
| Example 10 | G1: | 0.14 | 0.38 | | 0.00 |
| | G7: | 0.24 | | 0.47 | 1.00 |
| Example 11 | G2: | 0.17 | 0.57 | | 0.56 |
| | G5: | 0.26 | | 0.65 | |
| Example 12 | G2: | 0.24 | 0.86 | | 0.00 |
| | G5: | 1.10 | | 2.27 | |
| | G6: | 0.22 | | 0.46 | |
| | G7: | 0.33 | | | 1.00 |
| Example 13 | G2: | 0.32 | 0.97 | | 0.00 |
| | G5: | 0.78 | | 1.64 | |
| | G6: | 0.05 | | 0.11 | |
| | G7: | 0.08 | | 0.35 | |
| | G8: | 0.33 | | 1.40 | |
| Example 14 | G2: | 0.31271 | 0.79 | | −0.18 |
| | G6: | 0.5375 | | 1.19 | |
| | G7: | 0.48626 | | 1.38 | |

| | | log(β2T/β2W)/logZ | log(β3T/β3W)/logZ |
|---|---|---|---|
| Example 6 | G2: | 1.00 | 0.00 |
| Example 7 | G2: | 1.00 | 0.00 |
| Example 8 | G1: | 1.00 | 0.00 |
| Example 9 | G2: | 0.99 | 0.01 |
| Example 10 | G1: | 1.00 | 0.00 |
| Example 11 | G2: | 1.87 | −0.87 |
| Example 12 | G2: | 0.99 | 0.01 |
| Example 13 | G2: | 1.00 | 0.00 |
| Example 14 | G2: | 0.75 | 0.25 |

| | | log(β3T/β3W)/log(β2T/β2W) |
|---|---|---|
| Example 6 | G2: | 0.00 |
| Example 7 | G2: | 0.00 |
| Example 8 | G1: | 0.00 |
| Example 9 | G2: | 0.01 |
| Example 10 | G1: | 0.00 |
| Example 11 | G2: | −0.46 |
| Example 12 | G2: | 0.01 |
| Example 13 | G2: | 0.00 |
| Example 14 | G2: | 0.34 |

| | | φP/φW × h | ΣφPi/φW × hi |
|---|---|---|---|
| Example 6 | G2: | −0.27 | |
| | G6: | 0.66 | 0.39 |
| Example 7 | G2: | −0.28 | |
| | G7: | 0.17 | −0.12 |
| Example 8 | G1: | −0.15 | |
| | G7: | 0.14 | −0.01 |
| Example 9 | G2: | 0.21 | |
| | G5: | −0.30 | −0.09 |
| Example 10 | G1: | −0.14 | |
| | G7: | 0.16 | 0.02 |
| Example 11 | G2: | 0.19 | |
| | G5: | −0.26 | −0.08 |
| Example 12 | G2: | −0.26 | |
| | G5: | −1.20 | |
| | G6: | 0.23 | |
| | G7: | 0.16 | −1.06 |
| Example 13 | G2: | −0.33 | |
| | G5: | −0.93 | |
| | G6: | 0.06 | |
| | G7: | −0.04 | |
| | G8: | 0.14 | −1.10 |
| Example 14 | G2: | −0.34 | |
| | G6: | 0.68 | |
| | G7: | −0.25 | 0.09 |

| | | \|φ1/φW\| | φ2/φW | φ3/φW |
|---|---|---|---|---|
| Example 6 | G2: | 0.40 | 0.50 | 0.21 |
| Example 7 | G2: | 0.37 | 0.50 | 0.25 |
| Example 8 | G1: | 0.40 | 0.52 | 0.20 |
| Example 9 | G2: | 0.27 | 0.47 | 0.34 |
| Example 10 | G1: | 0.38 | 0.51 | 0.24 |
| Example 11 | G2: | 0.29 | 0.40 | 0.48 |
| Example 12 | G2: | 0.29 | 0.48 | 0.33 |
| Example 13 | G2: | 0.33 | 0.47 | 0.23 |
| Example 14 | G2: | 0.39 | 0.45 | 0.35 |

| | | Cp × (N'−N)/φW | |
|---|---|---|---|
| | | Object side | Image side |
| Example 6 | G2: | 0.23 | −0.50 |
| | G6: | 0.25 | 0.31 |
| Example 7 | G2: | 0.25 | −0.54 |
| | G7: | 0.33 | −0.10 |
| Example 8 | G1: | 0.22 | −0.38 |
| | G7: | 0.35 | −0.17 |
| Example 9 | G2: | 0.13 | 0.031 |
| | G5: | −0.44 | 0.12 |
| Example 10 | G1: | 0.18 | −0.33 |
| | G7: | 0.45 | −0.23 |
| Example 11 | G2: | 0.18 | −0.01 |
| | G5: | 0.37 | −0.67 |
| Example 12 | G2: | 0.19 | −0.45 |
| | G5: | −0.43 | −0.65 |
| | G6: | 0.47 | −0.29 |
| | G7: | 0.24 | 0.10 |
| Example 13 | G2: | 0.15 | −0.48 |
| | G5: | −0.37 | −0.40 |
| | G6: | 0.37 | −0.34 |
| | G7: | 0.35 | −0.46 |
| | G8: | 0.24 | 0.10 |
| Example 14 | G2: | 0.17 | −0.49 |
| | G6: | 0.25 | 0.30 |
| | G7: | −0.29 | −0.19 |

TABLE 19

The values corresponding to Conditions (7) and (8) in Examples 1 to 5

Example 1
[3rd Surface (r3)]

| Height | $(\|X\| - \|X0\|)/\{C0(N'-N) \cdot f1\}$ |
|---|---|
| 0.00 Y | −0.00000 |
| 0.20 Y | −0.00037 |
| 0.40 Y | −0.00634 |
| 0.60 Y | −0.03585 |
| 0.80 Y | −0.13341 |
| 1.00 Y | −0.40394 |

[12th Surface (r12)]

| Height | $(\|X\| - \|X0\|)/\{C0(N'-N) \cdot f2\}$ |
|---|---|
| 0.00 Y | −0.00000 |
| 0.20 Y | −0.00037 |
| 0.40 Y | −0.00598 |
| 0.60 Y | −0.03057 |
| 0.80 Y | −0.09885 |
| 1.00 Y | −0.25219 |

Example 2
[3rd Surface (r3)]

| Height | $(\|X\| - \|X0\|)/\{C0(N'-N) \cdot f1\}$ |
|---|---|
| 0.00 Y | −0.00000 |
| 0.20 Y | −0.00051 |
| 0.40 Y | −0.00870 |
| 0.60 Y | −0.04931 |

TABLE 19-continued

| Height | $(|X| - |X0|)/\{C0(N'-N) \cdot f2\}$ |
|---|---|
| 0.80 Y | −0.18376 |
| 1.00 Y | −0.55608 |

[10th Surface (r10)]

| Height | $(|X| - |X0|)/\{C0(N'-N) \cdot f2\}$ |
|---|---|
| 0.00 Y | −0.00000 |
| 0.20 Y | 0.00005 |
| 0.40 Y | 0.00077 |
| 0.60 Y | 0.00408 |
| 0.80 Y | 0.01399 |
| 1.00 Y | 0.03852 |

[12th Surface (r12)]

| Height | $(|X| - |X0|)/\{C0(N'-N) \cdot f2\}$ |
|---|---|
| 0.00 Y | 0.00000 |
| 0.20 Y | −0.00072 |
| 0.40 Y | −0.01169 |
| 0.60 Y | −0.06096 |
| 0.80 Y | −0.20787 |
| 1.00 Y | −0.58532 |

Example 3
[3rd Surface (r3)]

| Height | $(|X| - |X0|)/\{C0(N'-N) \cdot f1\}$ |
|---|---|
| 0.00 Y | −0.00000 |
| 0.20 Y | −0.00050 |
| 0.40 Y | −0.00851 |
| 0.60 Y | −0.04778 |
| 0.80 Y | −0.17765 |
| 1.00 Y | −0.54143 |

[10th Surface (r10)]

| Height | $(|X| - |X0|)/\{C0(N'-N) \cdot f2\}$ |
|---|---|
| 0.00 Y | −0.00000 |
| 0.20 Y | 0.00003 |
| 0.40 Y | 0.00046 |
| 0.60 Y | 0.00259 |
| 0.80 Y | 0.00945 |
| 1.00 Y | 0.02790 |

[12th Surface (r12)]

| Height | $(|X| - |X0|)/\{C0(N'-N) \cdot f2\}$ |
|---|---|
| 0.00 Y | 0.00000 |
| 0.20 Y | −0.00065 |
| 0.40 Y | −0.01058 |
| 0.60 Y | −0.05546 |
| 0.80 Y | −0.19007 |
| 1.00 Y | −0.53702 |

Example 4
[5th Surface (r5)]

| Height | $(|X| - |X0|)/\{C0(N'-N) \cdot f1\}$ |
|---|---|
| 0.00 Y | −0.00000 |
| 0.20 Y | −0.00008 |
| 0.40 Y | −0.00129 |
| 0.60 Y | −0.00719 |
| 0.80 Y | −0.02684 |
| 1.00 Y | −0.08390 |

[6th Surface (r6)]

| Height | $(|X| - |X0|)/\{C0(N'-N) \cdot f1\}$ |
|---|---|
| 0.00 Y | −0.00000 |
| 0.20 Y | −0.00066 |
| 0.40 Y | −0.01070 |
| 0.60 Y | −0.05580 |

TABLE 19-continued

| | |
|---|---|
| 0.80 Y | −0.18492 |
| 1.00 Y | −0.48426 |

[11th Surface (r11)]

| Height | $(|X| - |X0|)/\{C0(N'-N) \cdot f2\}$ |
|---|---|
| 0.00 Y | −0.00000 |
| 0.20 Y | −0.00017 |
| 0.40 Y | −0.00282 |
| 0.60 Y | −0.01457 |
| 0.80 Y | −0.04772 |
| 1.00 Y | −0.12247 |

Example 5
[3rd Surface (r3)]

| Height | $(|X| - |X0|)/\{C0(N'-N) \cdot f1\}$ |
|---|---|
| 0.00 Y | −0.00000 |
| 0.20 Y | −0.00058 |
| 0.40 Y | −0.00938 |
| 0.60 Y | −0.04968 |
| 0.80 Y | −0.17281 |
| 1.00 Y | −0.49672 |

[12th Surface (n12)]

| Height | $(|X| - |X0|)/\{C0(N'-N) \cdot f2\}$ |
|---|---|
| 0.00 Y | 0.00000 |
| 0.20 Y | −0.00039 |
| 0.40 Y | −0.00630 |
| 0.60 Y | −0.03215 |
| 0.80 Y | −0.10366 |
| 1.00 Y | −0.26303 |

The values corresponding to Conditions (15) and (17) in Examples 6 to 15

Example 6
[3rd Surface (r3)]

| Height | $(|X| - |X0|)/\{C0(N'-N) \cdot f1\}$ |
|---|---|
| 0.00 Y | −0.00000 |
| 0.20 Y | −0.00036 |
| 0.40 Y | −0.00585 |
| 0.60 Y | −0.03124 |
| 0.80 Y | −0.10983 |
| 1.00 Y | −0.31946 |

[12th Surface (r12)]

| Height | $(|X| - |X0|)/\{C0(N'-N) \cdot f2\}$ |
|---|---|
| 0.00 Y | 0.00000 |
| 0.20 Y | −0.00016 |
| 0.40 Y | −0.00266 |
| 0.60 Y | −0.01382 |
| 0.80 Y | −0.04620 |
| 1.00 Y | −0.12441 |

Example 7
[3rd Surface (r3)]

| Height | $(|X| - |X0|)/\{C0(N'-N) \cdot f1\}$ |
|---|---|
| 0.00 Y | −0.00000 |
| 0.20 Y | −0.00040 |
| 0.40 Y | −0.00645 |
| 0.60 Y | −0.03442 |
| 0.80 Y | −0.12249 |
| 1.00 Y | −0.36724 |

TABLE 19-continued

[14th Surface (r14)]

| Height | ($|X| - |X0|)/\{C0(N'-N) \cdot f3\}$ |
|---|---|
| 0.00 Y | 0.00000 |
| 0.20 Y | −0.00005 |
| 0.40 Y | −0.00072 |
| 0.60 Y | −0.00343 |
| 0.80 Y | −0.00979 |
| 1.00 Y | −0.02004 |

Example 8
[1st Surface (r1)]

| Height | ($|X| - |X0|)/\{C0(N'-N) \cdot f1\}$ |
|---|---|
| 0.00 Y | −0.00000 |
| 0.20 Y | −0.00047 |
| 0.40 Y | −0.00762 |
| 0.60 Y | −0.04017 |
| 0.80 Y | −0.13975 |
| 1.00 Y | −0.40512 |

[14th Surface (r14)]

| Height | ($|X| - |X0|)/\{C0(N'-N) \cdot f3\}$ |
|---|---|
| 0.00 Y | 0.00000 |
| 0.20 Y | −0.00007 |
| 0.40 Y | −0.00103 |
| 0.60 Y | −0.00497 |
| 0.80 Y | −0.01421 |
| 1.00 Y | −0.02846 |

Example 9
[3rd Surface (r3)]

| Height | ($|X| - |X0|)/\{C0(N'-N) \cdot f1\}$ |
|---|---|
| 0.00 Y | −0.00000 |
| 0.20 Y | −0.00034 |
| 0.40 Y | −0.00549 |
| 0.60 Y | −0.02824 |
| 0.80 Y | −0.09332 |
| 1.00 Y | −0.24896 |

[11th Surface (r11)]

| Height | ($|X| - |X0|)/\{C0(N'-N) \cdot f2\}$ |
|---|---|
| 0.00 Y | 0.00000 |
| 0.20 Y | −0.00086 |
| 0.40 Y | −0.01414 |
| 0.60 Y | −0.07574 |
| 0.80 Y | −0.26114 |
| 1.00 Y | −0.14147 |

Example 10
[1st Surface (r1)]

| Height | ($|X| - |X0|)/\{C0(N'-N) \cdot f1\}$ |
|---|---|
| 0.00 Y | −0.00000 |
| 0.20 Y | −0.00077 |
| 0.40 Y | −0.01256 |
| 0.60 Y | −0.06639 |
| 0.80 Y | −0.22928 |
| 1.00 Y | −0.65070 |

[14th Surface (r14)]

| Height | ($|X| - |X0|)/\{C0(N'-N) \cdot f3\}$ |
|---|---|
| 0.00 Y | 0.00000 |
| 0.20 Y | −0.00008 |
| 0.40 Y | −0.00129 |
| 0.60 Y | −0.00655 |
| 0.80 Y | −0.02065 |
| 1.00 Y | −0.04955 |

Example 11
[3rd Surface (r3)]

| Height | ($|X| - |X0|)/\{C0(N'-N) \cdot f1\}$ |
|---|---|
| 0.00 Y | −0.00000 |
| 0.20 Y | −0.00041 |
| 0.40 Y | −0.00663 |
| 0.60 Y | −0.03428 |
| 0.80 Y | −0.11465 |
| 1.00 Y | −0.31309 |

[10th Surface (r10)]

| Height | ($|X| - |X0|)/\{C0(N'-N) \cdot f2\}$ |
|---|---|
| 0.00 Y | 0.00000 |
| 0.20 Y | −0.00016 |
| 0.40 Y | −0.00260 |
| 0.60 Y | −0.01388 |
| 0.80 Y | −0.04736 |
| 1.00 Y | −0.12790 |

Example 12
[3rd Surface (r3)]

| Height | ($|X| - |X0|)/\{C0(N'-N) \cdot f1\}$ |
|---|---|
| 0.00 Y | −0.00000 |
| 0.20 Y | −0.00058 |
| 0.40 Y | −0.00940 |
| 0.60 Y | −0.04961 |
| 0.80 Y | −0.17667 |
| 1.00 Y | −0.53893 |

[12th Surface (r12)]

| Height | ($|X| - |X0|)/\{C0(N'-N) \cdot f2\}$ |
|---|---|
| 0.00 Y | 0.00000 |
| 0.20 Y | −0.00011 |
| 0.40 Y | −0.00182 |
| 0.60 Y | −0.00969 |
| 0.80 Y | −0.03330 |
| 1.00 Y | −0.09218 |

[15th Surface (r15)]

| Height | ($|X| - |X0|)/\{C0(N'-N) \cdot f3\}$ |
|---|---|
| 0.00 Y | 0.00000 |
| 0.20 Y | −0.00033 |
| 0.40 Y | −0.00502 |
| 0.60 Y | −0.02364 |
| 0.80 Y | −0.06629 |
| 1.00 Y | −0.13286 |

Example 13
[3rd Surface (r3)]

| Height | ($|X| - |X0|)/\{C0(N'-N) \cdot f1\}$ |
|---|---|
| 0.00 Y | −0.00000 |
| 0.20 Y | −0.00082 |
| 0.40 Y | −0.01333 |
| 0.60 Y | −0.07171 |
| 0.80 Y | −0.26196 |
| 1.00 Y | −0.82010 |

[12th Surface (r12)]

| Height | ($|X| - |X0|)/\{C0(N'-N) \cdot f2\}$ |
|---|---|
| 0.00 Y | 0.00000 |
| 0.20 Y | −0.00020 |
| 0.40 Y | −0.00328 |

TABLE 19-continued

| | |
|---|---|
| 0.60 Y | −0.01759 |
| 0.80 Y | −0.06132 |
| 1.00 Y | −0.17301 |

[14th Surface (r14)]

| Height | $(|X| - |X0|)/\{C0(N'-N) \cdot f3\}$ |
|---|---|
| 0.00 Y | 0.00000 |
| 0.20 Y | −0.00020 |
| 0.40 Y | −0.00311 |
| 0.60 Y | −0.01525 |
| 0.80 Y | −0.04605 |
| 1.00 Y | −0.10564 |

[17th Surface (r17)]

| Height | $(|X| - |X0|)/\{C0(N'-N) \cdot f3\}$ |
|---|---|
| 0.00 Y | 0.00000 |
| 0.20 Y | 0.00068 |
| 0.40 Y | 0.01090 |
| 0.60 Y | 0.05583 |
| 0.80 Y | 0.17801 |
| 1.00 Y | 0.43402 |

Example 14
[3rd Surface (r3)]

| Height | $(|X| - |X0|)/\{C0(N'-N) \cdot f1\}$ |
|---|---|
| 0.00 Y | −0.00000 |
| 0.20 Y | −0.00048 |
| 0.40 Y | −0.00802 |
| 0.60 Y | −0.04370 |
| 0.80 Y | −0.15559 |
| 1.00 Y | −0.44995 |

[12th Surface (r12)]

| Height | $(|X| - |X0|)/\{C0(N'-N) \cdot f2\}$ |
|---|---|
| 0.00 Y | 0.00000 |
| 0.20 Y | −0.00007 |
| 0.40 Y | −0.00110 |
| 0.60 Y | −0.00579 |
| 0.80 Y | −0.01922 |
| 1.00 Y | −0.04962 |

[15th Surface (r15)]

| Height | $(|X| - |X0|)/\{C0(N'-N) \cdot f3\}$ |
|---|---|
| 0.00 Y | 0.00000 |
| 0.20 Y | −0.00067 |
| 0.40 Y | −0.01051 |
| 0.60 Y | −0.05178 |
| 0.80 Y | −0.15744 |
| 1.00 Y | −0.36553 |

What is claimed is:

1. A zoom lens apparatus comprising:

a zoom lens system forming an optical image of an object; and an image sensor for receiving the optical image formed by said zoom lens system, wherein said zoom lens system includes, in order from the object side thereof;
a first lens unit having a negative power;
a second lens unite including at least one positive lens element and one negative lens element and having a positive power; and
a third lens unit having a positive power,
wherein zooming is achieved by moving at least two lens units in such a way that a distance between said first and second lens units and a distance between said second and third lens units vary, and
wherein at least one lens element included in said lens units is a plastic lens element, and fulfills the following conditions:

$$-0.8 < Cp \times (N'-N) \phi W < 0.8$$

$$-0.45 < M3/M2 < 0.90 \text{ (where } \phi T/\phi W > 1.6)$$

where

Cp represents a curvature of said at least one plastic lens element;

$\phi W$ represents a power of the entire zoom lens system at a wide-angle end;

N represents a refractive index for a d-line of a medium existing on an object side of an aspherical surface;

N' represents a refractive index for a d-line of a medium existing on an image side of the aspherical surface;

M3 represents an amount of movement of said third lens unit (a negative value representing a movement toward the object side with respect to a position of said third lens unit at the wide-angle end);

M2 represents an amount of movement of said second lens unit (a negative value representing a movement toward the object side with respect to a position of said second lens unit at the wide-angle end); and $\phi T$ represents a power of the entire zoom lens system at a telephoto end.

2. A zoom lens apparatus comprising:

a zoom lens system forming an optical image of an object; and an image sensor for receiving the optical image formed by said zoom lens system, wherein said zoom lens system includes, in order from the object side thereof;
a first lens unit including at least one positive lens element and one negative lens element and having a negative power;
a second lens unit having a positive power; and
a third lens unit having a positive power,
wherein zooming is achieved by moving at least two lens units in such a way that a distance between said first and second lens units and a distance between said second and third lens units vary, and
wherein at least one lens element included in said first lens unit is a plastic lens element, and fulfills the following conditions:

$$|\phi P/\phi 1| < 1.20$$

$$0.20 < |\phi 1/\phi W| < 0.70$$

$$-0.45 < M3/M2 < 0.90 \text{ (where } \phi T/\phi W > 1.6)$$

where $\phi P$ represents a power of said at least one plastic lens element;

$\phi 1$ represents the power of said first lens unit;

$\phi W$ represents a power of the entire zoom lens system at a wide-angle end;

M3 represents an amount of movement of said third lens unit (a negative value representing a movement toward the object side with respect to a position of said third lens unit at the wide-angle end);

M2 represents an amount of movement of said second lens unit (a negative value representing a movement toward the object side with respect to a position of said second lens unit at the wide-angle end); and φT represents a power of the entire zoom lens system at a telephoto end.

3. A zoom lens apparatus as claimed in claim 2, wherein said at least one plastic lens element fulfills the following condition:

$$-1.4<\Sigma\phi Pi/\phi W\times hi<1.4$$

where

φPi represents a power of an i-th plastic lens element; and hi represents a height at which paraxial and axial rays strike the i-th plastic lens element at the telephoto end, assuming that initial conditions for paraxial tracing are set so that a converted inclination angle $\alpha 1=0$ and a height $h1=1$.

4. A zoom lens apparatus comprising:

a zoom lens system forming an optical image of an object; and an image sensor for receiving the optical image formed by said zoom lens system, wherein said zoom lens system includes, in order from the object side thereof;
 a first lens unit having a negative power;
 a second lens unit including at least one positive lens element and one negative lens element and having a positive power; and
 a third lens unit having a positive power,
 wherein zooming is achieved by varying a distance between said first and second lens units and a distance between said second and third lens units, and
 wherein at least one lens element included in said second lens unit is a plastic lens element, and fulfills the following conditions:

$$|\phi P/\phi 2|<2.5$$

$$0.25<\phi 2/\phi W<0.75$$

where

φP represents a power of said at least one plastic lens element;

φ2 represents the power of said second lens unit; and

φW represents a power of the entire zoom lens system at a wide-angle end.

5. A zoom lens apparatus as claimed in claim 4, wherein said at least one plastic lens element fulfills the following condition:

$$-1.4<\Sigma\phi Pi/\phi W\times hi<1.4$$

where

φPi represents a power of an i-th plastic lens element; and hi represents a height at which paraxial rays strike the i-th plastic lens element at the telephoto end, assuming that initial conditions for paraxial tracing are set so that a converted inclination angle $\alpha 1=0$ and a height $h1=1$.

6. A zoom lens apparatus comprising:

a zoom lens system forming an optical image of an object; and an image sensor for receiving the optical image formed by said zoom lens system, wherein said zoom lens system includes, in order from the object side thereof:
 a first lens unit having a negative power;
 a second lens unit having a positive power,
 a third lens unit having a positive power,
 wherein zooming is achieved by moving at least two lens units in such a way that a distance between said first and second lens units and a distance between said second and third lens units vary, and
 wherein at least one lens element included in said third lens unit is a plastic lens element, and fulfills the following conditions:

$$-0.30<M3/M2<0.90$$

$$|\phi P/\phi 3|<1.70$$

$$0.1<\phi 3/\phi W<0.60$$

where

M3 represents an amount of movement of said third lens unit (a negative value representing a movement toward the object side with respect to a position of said third lens unit at the wide-angle end);

M2 represents an amount of movement of said second lens unit (a negative value representing a movement toward the object side with respect to a position of said second lens unit at the wide-angle end);

φP represents a power of said at least one plastic lens element;

φ3 represents the power of said third lens unit; and

φW represents a power of the entire zoom lens system at a wide-angle end.

7. A zoom lens apparatus as claimed in claim 6, wherein said at least one plastic lens element fulfills the following condition:

$$-1.4<\Sigma\phi Pi/\phi W\times hi<1.4$$

where

φPi represents a power of an i-th plastic lens element; and hi represents a height at which paraxial and axial rays strike the i-th plastic lens element at the telephoto end, assuming that initial conditions for paraxial tracing are set so that a converted inclination angle $\alpha 1=0$ and a height $h1=1$.

8. A zoom lens apparatus comprising:

a zoom lens system forming an optical image of an object; and an image sensor for receiving the optical image formed by said zoom lens system, wherein said zoom lens system includes, in order from the object side thereof:
 a first lens unit having a negative power;
 a second lens unit having a positive power; and
 a third lens unit having a positive power,
 wherein zooming is achieved by moving at least two lens units in such a way that a distance between said first and second lens units and a distance between said second and third lens units vary, and
 wherein at least one lens element included in each of said first and second lens units in a plastic lens element, and fulfills the following conditions:

$$-1.4<\Sigma\phi Pi/\phi W\times hi<1.4$$

$$0.5<\log(\beta 2T/\beta 2W)/\log Z<2.2$$

where

φPi represents a power of an i-th plastic lens element;

φW represents a power of the entire zoom lens system at a wide-angle end;

hi represents a height at which paraxial and axial rays strike the i-th plastic lens element at the telephoto end, assuming that initial conditions for paraxial tracing are set so that a converted inclination angle $\alpha 1=0$ and a height $h1=1$;

β2W represents a lateral magnification of said second lens unit at the wide-angle end;

β2T represents a lateral magnification of said second lens unit at a telephoto end;

Z represents a zoom ration; and log represents a natural logarithm.

9. A zoom lens apparatus comprising:

a zoom lens system forming an optical image of an object; and an image sensor for receiving the optical image formed by said zoom lens system, wherein said zoom lens system includes, in order from the object side thereof:
a first lens unit having a negative power;
a second lens unit including at least one positive lens element and one negative lens element and having a positive power; and
a third lens unit having a positive power,
wherein zooming is achieved by moving at least two lens units in such a way that a distance between said first and second lens units and a distance between said second and third lens units vary, and
wherein at least one lens element included in each of said first and third lens units is a plastic lens element, and fulfills the following conditions:

$-1.4<\Sigma\phi Pi/\phi W\times hi<1.4$ $-1.2<\log (\beta 3T/\beta 3W)/\log Z<0.5$ where φPi represents a power of an i-th plastic lens element;

φW represents a power of the entire zoom lens system at a wide-angle end;

hi represents a height at which paraxial and axial rays strike the i-th plastic lens element at the telephoto end, assuming that initial conditions for paraxial tracing are set so that a converted inclination angle $\alpha 1=0$ and a height $h1=1$;

β3W represents a lateral magnification of said third lens unit at the wide-angle end;

β3T represents a lateral magnification of said third lens unit at a telephoto end;

Z represents a zoom ratio; and log represents a natural logarithm.

10. A zoom lens apparatus comprising:

a zoom lens system forming an optical image of an object; and an image sensor for receiving the optical image formed by said zoom lens system, wherein said zoom lens system includes, in order from the object side thereof:
a first lens unit having negative power;
a second lens unit including at least one positive lens element and one negative lens element and having a positive power; and
a third lens unit having a positive power,
wherein zooming is achieved by moving at least two lens units in such a way that a distance between said first and second lens units and a distance between said second and third lens units vary, and
wherein at least one lens element included in each of said second and third lens units is a plastic lens element, and fulfills the following conditions:

$-1.4<\Sigma\phi Pi/\phi W\times hi<1.4$ $-0.75<\log (\beta 3T/\beta 3W)/\log (\beta 2T/\beta 2W)<0.65$ where
where φPi represents a power of an i-th plastic lens elements;

φW represents a power of the entire zoom lens system at a wide-angle end;

hi represents a height at which paraxial and axial rays strike the i-th plastic lens element at the telephoto end, assuming that initial conditions for paraxial tracing are set so that a converted inclination angle $\alpha 1=0$ and a height $h1=1$;

β2W represents a lateral magnification of said second lens unit at the wide-angle end;

β2T represents a lateral magnification of said second lens unit at a telephoto end;

β3W represents a lateral magnification of said third lens unit at the wide-angle end;

β3T represents a lateral magnification of said third lens unit at the telephoto end; and log represents a natural logarithm.

11. A digital camera comprising:

a zoom lens apparatus including a zoom lens system forming an optical image of an object, and an image sensor for receiving the optical image formed by said zoom lens system, wherein said zoom lens system includes, in order from the object side thereof:
a first lens unit having a negative power;
a second lens unit including at least one positive lens element and one negative lens element and having a positive power; and
a third lens unit having a positive power,
wherein zooming is achieved by moving at least two lens units in such a way that a distance between said first and second lens units and a distance between said second and third lens units vary, and
wherein at least one lens element included in said lens units is a plastic lens element, and fulfills the following conditions:

$-0.8<Cp\times(N'-N)/\phi W<0.8$ $-0.45<M3/M2<0.90$ (where $\phi T/\phi W<1.6$)

where

Cp represents a curvature of said at least one plastic lens element;

φW represents a power of the entire zoom lens system at a wide-angle end;

N represents a refractive index for a d-line of a medium existing on an object side of an aspherical surface;

N' represents a refractive index for a d-line of a medium existing on an image side of the aspherical surface;

M3 represents an amount of movement of said third lens unit (a negative value representing a movement toward the object side with respect to a position of said third lens unit at the wide-angle end);

M2 represents an amount of movement of said second lens unit (a negative value representing a movement toward the object side with respect to a position of said second lens unit at the wide-angle end); and φT represents a power of the entire zoom lens system at a telephoto end.

12. A digital camera comprising:

a zoom lens apparatus including a zoom lens system forming an optical image of an object, and an image sensor for receiving the optical image formed by said zoom lens system, wherein said zoom lens system includes, in order from the object side thereof:

a first lens unit including at least one positive lens element and one negative lens element and having a negative power;

a second lens unit having a positive power; and a third lens unit having a positive power, wherein zooming is achieved by moving at least two lens units in such a way that a distance between said first and second lens units and a distance between said second and third lens units vary, and wherein at least one lens element included in said first lens unit is a plastic lens element, and fulfills the following conditions:

$|\phi P/\phi 1|<1.20$ $0.20<|\phi 1/\phi W|<0.70$ $-0.45<M3/M2<0.90$ (where $\phi T/\phi W>1.6$)

where

φP represents a power of said at least one plastic lens element;

φ1 represents the power of said first lens unit;

φW represents a power of the entire zoom lens system at a wide-angle end;

M3 represents an amount of movement of said third lens unit (a negative value representing a movement toward the object side with respect to a position of said third lens unit at the wide-angle end);

M2 represents an amount of movement of said second lens unit (a negative value representing a movement toward the object side with respect to a position of said second lens unit at the wide-angle end); and φT represents a power of the entire zoom lens system at a telephoto end.

13. A digital camera as claimed in claim 12, wherein said at least one plastic lens element fulfills the following condition:

$-1.4<\Sigma\phi Pi/\phi W\times hi<1.4$ where

φPi represents a power of an i-th plastic lens element; and hi represents a height at which paraxial and axial rays strike the i-th plastic lens element at the telephoto end, assuming that initial conditions for paraxial tracing are set so that a converted inclination angle α1=0 and a height h1=1.

14. A digital camera comprising:

a zoom lens apparatus including a zoom lens system forming an optical image of an object, and an image sensor for receiving the optical image formed by said zoom lens system, wherein said zoom lens system includes, in order from the object side thereof:

a first lens unit having a negative power;

a second lens unit including at least one positive lens element and one negative lens element and having a positive power; and a third lens unit having a positive power, wherein zooming is achieved by varying a distance between said first and second lens units and a distance between said second and third lens units, and wherein at least one lens element included in said second lens unit is a plastic lens element, and fulfills the following conditions:

$|\phi P/\phi 2|<2.5$ $0.25<\phi 2/\phi W<0.75$ where

φP represents a power of said at least one plastic lens element;

φ2 represents the power of said second lens unit; and

φW represents a power of the entire zoom lens system at a wide-angle end.

15. A digital camera as claimed in claim 14, wherein said at least one plastic lens element fulfills the following condition:

$-1.4<\Sigma\phi Pi/\phi W\times hi<1.4$ where

φPi represents a power of an i-th plastic lens element; and hi represents a height at which paraxial and axial rays strike the i-th plastic lens element at the telephoto end, assuming that initial conditions for paraxial tracing are set so that a converted inclination angle α1=0 and a height h1=1.

16. A digital camera comprising:

a zoom lens apparatus including a zoom lens system forming an optical image of an object, and an image sensor for receiving the optical image formed by said zoom lens system, wherein said zoom lens system includes, in order from the object side thereof:

a first lens unit having a negative power;

a second lens unit having a positive power; and a third lens unit having a positive power, wherein zooming is achieved by moving at least two lens units in such a way that a distance between said first and second lens units and a distance between said second and third lens units vary, and wherein at least one lens element included in said third lens unit is a plastic lens element, and fulfills the following conditions:

$-0.30<M3/M2<0.90$ $|\phi P/\phi 3|<1.70$ $0.1<\phi 3/\phi W<0.60$ where

M3 represents an amount of movement of said third lens unit (a negative value representing a movement toward the object side with respect to a position of said third lens unit at the wide-angle end);

M2 represents an amount of movement of said second lens unit (a negative value representing a movement toward the object side with respect to a position of said second lens unit at the wide-angle end);

φP represents a power of said at least one plastic lens element;

φ3 represents the power of said third lens unit; and

φW represents a power of the entire zoom lens system at a wide-angle end.

17. A digital camera as claimed in claim 16, wherein said at least one plastic lens element fulfills the following condition:

$$-1.4 < \Sigma \phi Pi/\phi W \times hi < 1.4$$

where

φPi represents a power of an i-th plastic lens element; and hi represents a height at which paraxial and axial rays strike the i-th plastic lens element at the telephoto end, assuming that initial conditions for paraxial tracing are set so that a converted inclination angle α1=0 and a height h1=1.

18. A digital camera comprising:

a zoom lens apparatus including a zoom lens system forming an optical image of an object, and an image sensor for receiving the optical image formed by said zoom lens system, wherein said zoom lens system includes, in order from the object side thereof:
 a first lens unit having a negative power;
 a second lens unit having a positive power; and
 a third lens unit having a positive power,
 wherein zooming is achieved by moving at least two lens units in such a way that a distance between said first and second lens units and a distance between said second and third lens units vary, and
 wherein at least one lens element included in each of said first and second lens units is a plastic lens element, and fulfills the following conditions:

$$-1.4 < \Sigma \phi Pi/\phi W \times hi < 1.4$$

$$0.5 < \log(\beta 2T/\beta 2W)/\log Z < 2.2$$

where

φPi represents a power of an i-th plastic lens element;

φW represents a power of the entire zoom lens system at a wide-angle end;

hi represents a height at which paraxial and axial rays strike the i-th plastic lens element at the telephoto end, assuming that initial conditions for paraxial tracing are set so that a converted inclination angle α1=0 and a height h1=1;

β2W represents a lateral magnification of said second lens unit at the wide-angle end;

β2T represents a lateral magnification of said second lens unit at a telephoto end;

Z represents a zoom ratio; and log represents a natural logarithm.

19. A digital camera comprising:

a zoom lens apparatus including a zoom lens system forming an optical image of an object, and an image sensor for receiving the optical image formed by said zoom lens system, wherein said zoom lens system includes, in order from the object side thereof:
 a first lens unit having a negative power;
 a second lens unit including at least one positive lens element and one negative lens element and having a positive power; and
 a third lens unit having a positive power,
 wherein zooming is achieved by moving at least two lens units in such a way that a distance between said first and second lens units and a distance between said second and third lens units vary, and
 wherein at least one lens element included in each of said first and third lens units is a plastic lens element, and fulfills the following conditions:

$$-1.4 < \Sigma \phi Pi/\phi W \times hi < 1.4$$

$$-1.2 < \log(\beta 3T/\beta 3W)/\log Z < 0.5$$

where

φPi represents a power of an i-th plastic lens element;

φW represents a power of the entire zoom lens system at a wide-angle end;

hi represents a height at which paraxial and axial rays strike the i-th plastic lens element at the telephoto end, assuming that initial conditions for paraxial tracing are set so that a converted inclination angle α1=0 and a height h1=1;

β3W represents a lateral magnification of said third lens unit at the wide-angle end;

β3T represents a lateral magnification of said third lens unit at a telephoto end;

Z represents a zoom ratio; and log represents a natural logarithm.

20. A digital camera comprising:

a zoom lens apparatus including a zoom lens system forming an optical image of an object, and an image sensor for receiving the optical image formed by said zoom lens system, wherein said zoom lens system includes in order from the object side thereof:
 a first lens unit having a negative power;
 a second lens unit including at least one positive lens element and one negative lens element and having a positive power; and
 a third lens unit having a positive power,
 wherein zooming is achieved by moving at least two lens units in such a way that a distance between said first and second lens units and a distance between said second and third lens units vary, and
 wherein at least one lens element included in each of said second and third lens units is a plastic element, and fulfills the following conditions:

$$-1.4 < \Sigma \phi Pi/\phi W \times hi < 1.4$$

$$-0.75 < \log(\beta 3T/\beta 3W)/\log(\beta 2T/\beta 2W) < 0.65$$

where

φPi represents a power of an i-th plastic lens element;

φW represents a power of the entire zoom lens system at a wide-angle end;

hi represents a height at which paraxial and axial rays strike the i-th plastic lens element at the telephoto end, assuming that initial conditions for paraxial tracing are set so that a converted inclination angle $\alpha 1=0$ and a height $h1=1$;

$\beta 2W$ represents a lateral magnification of said second lens unit at the wide-angle end;

$\beta 2T$ represents a lateral magnification of said second lens unit at a telephoto end;

$\beta 3W$ represents a lateral magnification of said third lens unit at the wide-angle end;

$\beta 3T$ represents a lateral magnification of said third lens unit at the telephoto end; and log represents a natural logarithm.

* * * * *